(12) United States Patent
Miyamoto

(10) Patent No.: US 9,146,632 B2
(45) Date of Patent: Sep. 29, 2015

(54) LINEAR DEVICE VALUE ESTIMATING METHOD, CAPACITANCE DETECTING METHOD, INTEGRATED CIRCUIT, TOUCH SENSOR SYSTEM, AND ELECTRONIC DEVICE

(75) Inventor: Masayuki Miyamoto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 133 days.

(21) Appl. No.: 14/129,253

(22) PCT Filed: May 30, 2012

(86) PCT No.: PCT/JP2012/064489
§ 371 (c)(1),
(2), (4) Date: Dec. 24, 2013

(87) PCT Pub. No.: WO2013/001996
PCT Pub. Date: Jan. 3, 2013

(65) Prior Publication Data
US 2014/0118287 A1   May 1, 2014

(30) Foreign Application Priority Data

Jun. 29, 2011  (JP) ..................... PCT/JP2011/065419
Sep. 9, 2011   (JP) ................................. 2011-196820
Oct. 25, 2011  (JP) ................................. 2011-234333
Apr. 4, 2012   (JP) ..................... PCT/JP2012/059824

(51) Int. Cl.
*G06F 3/041*   (2006.01)
*G06F 3/044*   (2006.01)

(52) U.S. Cl.
CPC ............... *G06F 3/041* (2013.01); *G06F 3/044* (2013.01); *G06F 3/0412* (2013.01)

(58) Field of Classification Search
CPC ....... G06F 3/041; G06F 3/0412; G06F 3/044; G06F 3/047

USPC ......................................................... 345/173
See application file for complete search history.

(56) References Cited

U.S. PATENT DOCUMENTS

| 4,639,720 A | 1/1987 | Rympalski et al. |
| 5,905,489 A | 5/1999 | Takahama et al. |

(Continued)

FOREIGN PATENT DOCUMENTS

| CN | 101751193 A | 6/2010 |
| JP | 9-44293 A   | 2/1997 |

(Continued)

OTHER PUBLICATIONS

U.S. Office Action for U.S. Appl. No. 14/127,455 dated Oct. 9, 2014.

(Continued)

*Primary Examiner* — Larry Sternbane
(74) *Attorney, Agent, or Firm* — Birch, Stewart, Kolasch & Birch, LLP

(57) ABSTRACT

A touch sensor panel includes vertical & horizontal electrodes each respectively including a repeat of first & second basic shapes connected to one another in a vertical & horizontal directions, the first & second basic shapes each including a fine wire, respectively provided on vertical & horizontal electrode surfaces, and arranged at intervals; and a plurality of linear devices at respective intersections of the electrodes. A method includes driving the vertical electrodes in parallel on a basis of code sequences di for each of the linear devices so as to output, along the horizontal electrodes, linear sums of respective outputs corresponding to the linear devices; and estimating respective values of the linear devices along the horizontal electrodes on a basis of an inner product operation of (i) the linear sums outputted along the horizontal electrodes and (ii) the code sequences di.

7 Claims, 44 Drawing Sheets

(56) References Cited

U.S. PATENT DOCUMENTS

| | | |
|---|---|---|
| 6,452,514 B1 | 9/2002 | Philipp |
| 6,730,863 B1 | 5/2004 | Gerpheide et al. |
| 7,129,935 B2 | 10/2006 | Mackey |
| 7,812,827 B2 | 10/2010 | Hotelling et al. |
| 7,812,828 B2 | 10/2010 | Westerman et al. |
| 2005/0024065 A1 | 2/2005 | Umeda et al. |
| 2005/0073324 A1 | 4/2005 | Umeda et al. |
| 2005/0141263 A1 | 6/2005 | Umeda et al. |
| 2006/0158202 A1 | 7/2006 | Umeda et al. |
| 2007/0109274 A1 | 5/2007 | Reynolds |
| 2007/0242053 A1 | 10/2007 | Muranaka |
| 2009/0032312 A1 | 2/2009 | Huang et al. |
| 2009/0219258 A1 | 9/2009 | Geaghan et al. |
| 2010/0060591 A1 | 3/2010 | Yousefpor et al. |
| 2010/0085324 A1 | 4/2010 | Noguchi et al. |
| 2011/0037724 A1* | 2/2011 | Paulsen et al. .............. 345/174 |
| 2011/0043478 A1 | 2/2011 | Matsushima |
| 2011/0055305 A1 | 3/2011 | Matsushima |
| 2011/0084936 A1 | 4/2011 | Chang et al. |
| 2011/0102370 A1* | 5/2011 | Kono et al. ................. 345/174 |
| 2011/0279391 A1 | 11/2011 | Nakai et al. |
| 2012/0223906 A1 | 9/2012 | Zhou |
| 2013/0271426 A1 | 10/2013 | Yumoto et al. |

FOREIGN PATENT DOCUMENTS

| | | |
|---|---|---|
| JP | 2001-125744 A | 5/2001 |
| JP | 2005-114362 A | 4/2005 |
| JP | 2005-134240 A | 5/2005 |
| JP | 2007-286814 A | 11/2007 |
| JP | 2008-134836 A | 6/2008 |
| JP | 4364609 B2 | 11/2009 |
| JP | 4387773 B2 | 12/2009 |
| JP | 2010-39537 A | 2/2010 |
| JP | 2010-92275 A | 4/2010 |
| JP | 2011-47774 A | 3/2011 |
| JP | 2011-113149 A | 6/2011 |
| JP | 2011-175412 A | 9/2011 |
| WO | WO 2009/107415 A1 | 9/2009 |
| WO | WO 2010/064983 A2 | 6/2010 |
| WO | WO 2010/090033 A1 | 8/2010 |
| WO | WO 2011/065249 A1 | 6/2011 |
| WO | WO 2012/090537 A1 | 7/2012 |

OTHER PUBLICATIONS

U.S. Office Action for U.S. Appl. No. 14/343,207 dated Sep. 24, 2014.

U.S. Final Office Action for co-pending U.S. Appl. No. 14/343,207 dated Jan. 26, 2015.

US Advisory Action for co-pending U.S. Appl. No. 14/343,207, dated Apr. 3, 2015.

US Office Action for co-pending U.S. Appl. No. 14/128,910, dated Mar. 27, 2015.

US Office Action for co-pending U.S. Appl. No. 14/129,061 dated Apr. 2, 2015.

U.S. Office Action for U.S. Appl. No. 14/127,455 dated Jul. 31, 2014.

Office Action for U.S. Appl. No. 14/127,455 dated Apr. 17, 2014.

Office Action for U.S. Appl. No. 14/128,907 dated May 8, 2014.

Notice of Panel Decision dated Jun. 3, 2015 issued in U.S. Appl. No 14/343,207.

* cited by examiner

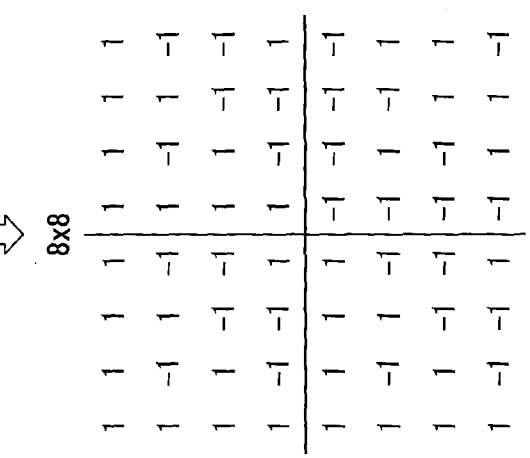
FIG. 5

FIG. 6

|  | 12x12 | | | | | | | | | | |
|---|---|---|---|---|---|---|---|---|---|---|---|
| 1 | -1 | -1 | -1 | -1 | -1 | -1 | -1 | -1 | -1 | -1 | -1 |
| 1 | 1 | -1 | 1 | -1 | -1 | -1 | 1 | 1 | 1 | -1 | 1 |
| 1 | 1 | 1 | -1 | 1 | -1 | -1 | -1 | 1 | 1 | 1 | -1 |
| 1 | -1 | 1 | 1 | -1 | 1 | -1 | -1 | -1 | 1 | 1 | 1 |
| 1 | 1 | -1 | 1 | 1 | -1 | 1 | -1 | -1 | -1 | 1 | 1 |
| 1 | 1 | 1 | -1 | 1 | 1 | -1 | 1 | -1 | -1 | -1 | 1 |
| 1 | 1 | 1 | 1 | -1 | 1 | 1 | -1 | 1 | -1 | -1 | -1 |
| 1 | -1 | 1 | 1 | 1 | -1 | 1 | 1 | -1 | 1 | -1 | -1 |
| 1 | -1 | -1 | 1 | 1 | 1 | -1 | 1 | 1 | -1 | 1 | -1 |
| 1 | -1 | -1 | -1 | 1 | 1 | 1 | -1 | 1 | 1 | -1 | 1 |
| 1 | 1 | -1 | -1 | -1 | 1 | 1 | 1 | -1 | 1 | 1 | -1 |
| 1 | -1 | 1 | -1 | -1 | -1 | 1 | 1 | 1 | -1 | 1 | 1 |

FIG. 7

| | | | | | | | | | 20x20 | | | | | | | | | | |
|---|---|---|---|---|---|---|---|---|---|---|---|---|---|---|---|---|---|---|---|
| 1 | -1 | -1 | -1 | -1 | -1 | -1 | -1 | -1 | -1 | -1 | -1 | -1 | -1 | -1 | -1 | -1 | -1 | -1 | -1 |
| 1 | 1 | -1 | 1 | 1 | -1 | -1 | -1 | -1 | 1 | -1 | 1 | -1 | 1 | 1 | 1 | 1 | -1 | -1 | 1 |
| 1 | 1 | 1 | -1 | 1 | 1 | -1 | -1 | -1 | -1 | 1 | -1 | 1 | -1 | 1 | 1 | 1 | 1 | -1 | -1 |
| 1 | -1 | 1 | 1 | -1 | 1 | 1 | -1 | -1 | -1 | -1 | 1 | -1 | 1 | -1 | 1 | 1 | 1 | 1 | -1 |
| 1 | -1 | -1 | 1 | 1 | -1 | 1 | 1 | -1 | -1 | -1 | -1 | 1 | -1 | 1 | -1 | 1 | 1 | 1 | 1 |
| 1 | 1 | -1 | -1 | 1 | 1 | -1 | 1 | 1 | -1 | -1 | -1 | -1 | 1 | -1 | 1 | -1 | 1 | 1 | 1 |
| 1 | 1 | 1 | -1 | -1 | 1 | 1 | -1 | 1 | 1 | -1 | -1 | -1 | -1 | 1 | -1 | 1 | -1 | 1 | 1 |
| 1 | 1 | 1 | 1 | -1 | -1 | 1 | 1 | -1 | 1 | 1 | -1 | -1 | -1 | -1 | 1 | -1 | 1 | -1 | 1 |
| 1 | 1 | 1 | 1 | 1 | -1 | -1 | 1 | 1 | -1 | 1 | 1 | -1 | -1 | -1 | -1 | 1 | -1 | 1 | -1 |
| 1 | -1 | 1 | 1 | 1 | 1 | -1 | -1 | 1 | 1 | -1 | 1 | 1 | -1 | -1 | -1 | -1 | 1 | -1 | 1 |
| 1 | 1 | -1 | 1 | 1 | 1 | 1 | -1 | -1 | 1 | 1 | -1 | 1 | 1 | -1 | -1 | -1 | -1 | 1 | -1 |
| 1 | -1 | 1 | -1 | 1 | 1 | 1 | 1 | -1 | -1 | 1 | 1 | -1 | 1 | 1 | -1 | -1 | -1 | -1 | 1 |
| 1 | 1 | -1 | 1 | -1 | 1 | 1 | 1 | 1 | -1 | -1 | 1 | 1 | -1 | 1 | 1 | -1 | -1 | -1 | -1 |
| 1 | -1 | 1 | -1 | 1 | -1 | 1 | 1 | 1 | 1 | -1 | -1 | 1 | 1 | -1 | 1 | 1 | -1 | -1 | -1 |
| 1 | -1 | -1 | 1 | -1 | 1 | -1 | 1 | 1 | 1 | 1 | -1 | -1 | 1 | 1 | -1 | 1 | 1 | -1 | -1 |
| 1 | -1 | -1 | -1 | 1 | -1 | 1 | -1 | 1 | 1 | 1 | 1 | -1 | -1 | 1 | 1 | -1 | 1 | 1 | -1 |
| 1 | -1 | -1 | -1 | -1 | 1 | -1 | 1 | -1 | 1 | 1 | 1 | 1 | -1 | -1 | 1 | 1 | -1 | 1 | 1 |
| 1 | 1 | -1 | -1 | -1 | -1 | 1 | -1 | 1 | -1 | 1 | 1 | 1 | 1 | -1 | -1 | 1 | 1 | -1 | 1 |
| 1 | 1 | 1 | -1 | -1 | -1 | -1 | 1 | -1 | 1 | -1 | 1 | 1 | 1 | 1 | -1 | -1 | 1 | 1 | -1 |
| 1 | -1 | 1 | 1 | -1 | -1 | -1 | -1 | 1 | -1 | 1 | -1 | 1 | 1 | 1 | 1 | -1 | -1 | 1 | 1 |

$d1 = (\ 1,\ \ 1,\ \ 1,\ \ 1\ )$
$d2 = (\ 1,\ -1,\ \ 1,\ -1\ )$
$d3 = (\ 1,\ \ 1,\ -1,\ -1\ )$
$d4 = (\ 1,\ -1,\ -1,\ \ 1\ )$
$\sum_{k=1}^{4} dik \quad 4,\ \ 0,\ \ 0,\ \ 0$ (b)

$d1 = (\ 1,\ 0,\ \ 1,\ \ 1,\ \ 1\ )$
$d2 = (\ 1,\ 0,\ -1,\ \ 1,\ -1\ )$
$d3 = (\ 0,\ 1,\ \ 1,\ -1,\ -1\ )$
$d4 = (\ 0,\ 1,\ -1,\ -1,\ \ 1\ )$
$\sum_{k=1}^{4} dik \quad 2,\ 2,\ 0,\ 0,\ 0$

(a)
$$\left.\begin{array}{l}d_1 = (d_{11}, d_{12}, \ldots, d_{1N}) \\ d_2 = (d_{21}, d_{22}, \ldots, d_{2N}) \\ \vdots \\ d_M = (d_{M1}, d_{M2}, \ldots, d_{MN})\end{array}\right\}$$ (Formula 7)

$$\left.\begin{array}{l} d_i \cdot d_j = \sum_{k=1}^{N} d_{ik} \times d_{jk} = N \times \delta_{ij} \\ \text{Where} \\ \delta_{ij} = 1 \quad \text{if} \quad i = j \\ \delta_{ij} = -1/N \quad \text{if} \quad i \neq j \end{array}\right\}$$ (Formula 8)

(b)

FIG. 38
(a)
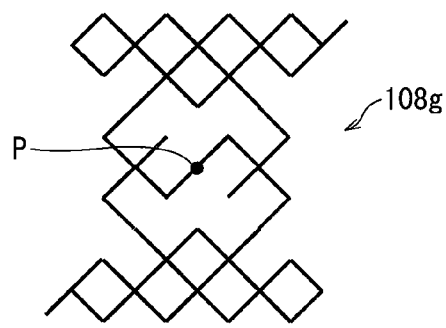
(b)
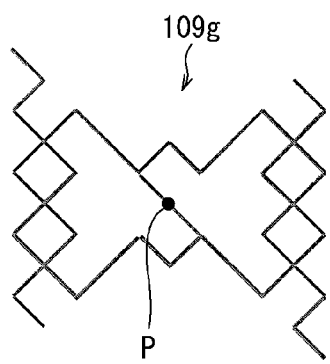

LINEAR DEVICE VALUE ESTIMATING METHOD, CAPACITANCE DETECTING METHOD, INTEGRATED CIRCUIT, TOUCH SENSOR SYSTEM, AND ELECTRONIC DEVICE

TECHNICAL FIELD

The present invention relates to a method for estimating or detecting a coefficient, a device value, or a capacitance in a linear system configured in a matrix. The present invention further relates to an integrated circuit, a touch sensor system, and an electronic device each operating in accordance with the method.

BACKGROUND ART

There has been known a device for detecting linear device values distributed in a matrix. Patent Literature 1, for example, discloses a touch sensor device (contact detecting device) for detecting distribution of capacitance values of a capacitance matrix Cij (i=1, ..., M and j=1, ..., L) formed between M drive lines and L sense lines. The touch sensor device operates in accordance with a scanning detection method; specifically, the touch sensor device sequentially selects one of the drive lines and thus detects respective values of linear devices connected to the drive line selected.

Patent Literature 2 discloses a capacitance detecting circuit which (i) in driving a plurality of drive lines, switches between a first drive line group and a second drive line group on the basis of a time series code sequence, (ii) outputs a measured voltage obtained by converting, into an electric signal, a sum total of respective currents across capacitances, connected to sense lines, at a plurality of intersections of driven drive lines with the sense lines, and (iii) performs a product-sum operation of such a measured voltage and the code sequence for each sense line so as to find a voltage value corresponding to a capacitance at each intersection.

The description below deals with an arrangement of vertical electrodes and horizontal electrodes in a conventional capacitive touch sensor panel. FIG. 41 is a diagram illustrating an arrangement of vertical electrodes 91 and horizontal electrodes 92 in a conventional capacitive touch sensor panel. FIG. 41 corresponds to FIG. 3 of Patent Literature 1.

This conventional capacitive touch sensor panel disclosed in Patent Literature 1 includes (i) a plurality of vertical electrodes 91 provided on a vertical electrode surface and arranged at predetermined intervals in a horizontal direction and (ii) a plurality of horizontal electrodes 92 provided on a horizontal electrode surface, which is parallel to the vertical electrode surface, and arranged at predetermined intervals in a vertical direction.

Each vertical electrode 91 includes a sequence of a repeat of diamond-shaped quadrangular sections 93 and 94 connected to each other in the vertical direction. Each horizontal electrode 92 includes a sequence of a repeat of diamond-shaped quadrangular sections 95 and 96 connected to each other in the horizontal direction.

The vertical electrodes 91 and the horizontal electrodes 92, each including diamond-shaped sections, are so provided that the vertical electrodes 91 cross the horizontal electrodes 92 to constitute a capacitive touch sensor panel. In the case where such a capacitive touch sensor panel is to be placed on a display device for use, the vertical electrodes 91 and the horizontal electrodes 92 are normally each formed of a transparent conductive film made of, for example, ITO (indium tin oxide). Recent years have also witnessed research on the use of graphene as a substitute for ITO.

In the case where the diamond-shaped sections as illustrated in FIG. 41 are made of, for example, ITO and arranged on a plane, each diamond-shaped section, having both centerline symmetry and center-point symmetry, exhibits a similarly symmetric capacitance change when touched by an object, such as a pen, that has a small touch area. Utilizing this symmetry in a capacitance change allows a symmetric position correction to be carried out during a touch-position detection, and thus increases the position detection precision.

FIG. 42 is a diagram illustrating an arrangement of vertical electrodes 81 and horizontal electrodes 82 in another conventional capacitive touch sensor panel, which is disclosed in Patent Literature 2. Both the vertical electrodes and the horizontal electrodes 82 are arranged at predetermined intervals. The vertical electrodes 81 extend in a direction orthogonal to the direction in which the horizontal electrodes 82 extend. The vertical electrodes 81 and the horizontal electrodes 82 are arranged in the shape of a grid. The vertical electrodes 81 and horizontal electrodes 82 themselves individually include fine wires, which form a mesh.

(a) of FIG. 43 is a diagram illustrating an arrangement of vertical electrodes 71 in yet another conventional capacitive touch sensor panel, which is disclosed in Patent Literature 3. (b) of FIG. 43 is a diagram illustrating an arrangement of horizontal electrodes 72 in that capacitive touch sensor panel.

(a) of FIG. 43 illustrates an array of vertical electrodes 71 each including sections that each have a shape similar to a diamond shape and that are connected to one another in a vertical direction. (b) of FIG. 43 similarly illustrates an array of horizontal electrodes 72 each including sections that each have a shape similar to a diamond shape and that are connected to one another in a horizontal direction.

(a) of FIG. 45 is a diagram illustrating an arrangement of vertical electrodes in still another conventional capacitive touch sensor panel, which is disclosed in Patent Literature 4. (b) of FIG. 45 is a diagram illustrating an arrangement of horizontal electrodes in that capacitive touch sensor panel.

The capacitive touch sensor panel disclosed in Patent Literature 4 is a capacitance-type touch panel switch including (i) an electrically conductive X pattern group 61 including a plurality of conductive X sequences 62 arranged at slight intervals in the X direction and (ii) an electrically conductive Y pattern group 66 including a plurality of conductive Y sequences 67 arranged at slight intervals in the Y direction.

Each conductive X sequence 62 includes (i) a plurality of conductive X pads 63 that each have a substantially rhombic outline and that are arranged in the Y-axis direction and (ii) conductive X pads 63a that each have a substantially isosceles-triangular outline and that are arranged in the Y-axis direction to sandwich the conductive X pads 63. Adjacent conductive X pads 63 and 63 are connected to each other by a conductive X line 64, while adjacent conductive X pads 63 and 63a are also connected to each other by a conductive X line 64.

The conductive X pads 63 and 63a each include a mesh of (i) fine wires extending in the X direction and (ii) fine wires extending in the Y direction. Each conductive X line 64 is thin and includes three straight lines 65 extending in the Y direction and arranged at predetermined intervals in the X direction.

Each conductive Y sequence 67 includes (i) a plurality of conductive Y pads 68 that each have a substantially rhombic outline and that are arranged in the X-axis direction and (ii) conductive Y pads 68a that each have a substantially isosceles-triangular outline and that are arranged in the X-axis direction to sandwich the conductive Y pads 68. Adjacent conductive Y pads 68 and 68 are connected to each other by a conductive Y line 69, while adjacent conductive Y pads 68 and 68*a* are also connected to each other by a conductive Y line 69.

The conductive Y pads 68 and 68*a* each include a mesh of (i) fine wires extending in the X direction and (ii) fine wires extending in the Y direction. Each conductive Y line 69 is thin and includes three straight lines 60 extending in the X direction and arranged at predetermined intervals in the Y direction.

The X pattern group 61 and Y pattern group 66 arranged as above are so placed on top of each other as to extend orthogonally to each other in a planer view. The conductive X lines 64 of the conductive X sequences 62 and the conductive Y lines 69 of the conductive Y sequences 67 are stacked on top of each other to form a light-transmitting region having a light-transmitting property substantially identical to that of the conductive X pads 63 and the conductive Y pads 68.

CITATION LIST

Patent Literature 1

Japanese Patent Application Publication, Tokukai, No. 2010-92275 A (Publication Date: Apr. 22, 2010)

Patent Literature 2

Japanese Patent Publication No. 4364609, specification (Publication Date: Jun. 16, 2005)

Patent Literature 3

Japanese Patent Publication No. 4387773, specification (Publication Date: Jun. 16, 2005)

Patent Literature 4

Japanese Patent Application Publication, Tokukai, No. 2005-114362 A (Publication Date: Apr. 28, 2005)

Patent Literature 5

Japanese Patent Application Publication, Tokukai, No. 2005-134240 A (Publication Date: May 26, 2005)

Patent Literature 6

U.S. Pat. No. 4,639,720, specification (Jan. 27, 1987)

Patent Literature 7

Japanese Patent Application Publication, Tokukai, No. 2011-113149 A (Publication Date: Jun. 9, 2011)

Patent Literature 8

Japanese Patent Application Publication, Tokukai, No. 2010-39537 A (Publication Date: Feb. 18, 2010)

Patent Literature 9

Japanese Patent Application Publication, Tokukai, No. 2011-175412 A (Publication Date: Sep. 8, 2011)

SUMMARY OF INVENTION

Technical Problem

The touch sensor device of Patent Literature 1 operating in accordance with the scanning detection method is, however, disadvantageous in that the touch sensor device is required to complete within a period of time (T/m) a process of simultaneously selecting and scanning a plurality of lines so as to detect capacitances of the capacitance matrix $C_{ij}$. For the above symbol T/m, T represents a period of time given to obtain two-dimensionally distributed capacitance values, and m represents a number of scans.

Accuracy of a detecting process can generally be better improved by a process such as averaging, as a process time is longer. On the other hand, (i) the period of time T given to obtain capacitance values needs to be shorter in order for the touch sensor device to follow a high-speed operation, and (ii) the number M of scans needs to be larger for improvement of resolution. Either of (i) and (ii) problematically reduces the process time (T/m) and thus decreases detection accuracy.

The capacitance detecting circuit of Patent Literature 2, to cancel an offset error in a measured voltage, (i) switches between driving the first drive line group and driving the second drive line group on the basis of a code sequence and (ii) subtracts a measured voltage based on the driving of the second drive line group from a measured voltage based on the driving of the first drive line group (see the specification, paragraphs [0058] through [0061]). The capacitance detecting circuit, however, carries out a two-stage operation and is problematically less effective in simultaneously achieving a high-speed operation and power consumption reduction.

The arrangement illustrated in FIG. 41, however, is problematic in that ITO and graphene each have too high a resistance value to produce a large capacitive touch sensor panel having a size of 30 inches or larger. The above arrangement thus involves a method for making diamond-shaped sections from fine lines of a metal (for example, Ag or Cu) that has a low resistance value (Patent Literature 2 [FIG. 42] and Patent Literature 3 [FIG. 43]).

The arrangement illustrated in FIG. 42 problematically includes cross-shaped openings 97 that are present at certain intervals and that are not covered by the grid. The openings 97 are thus visually recognized, with the result of moire occurring. The above arrangement further has a problem of a decrease in position detection precision which decrease is due to the fact that the capacitance for the openings 97 is changed by a touch differently from that for the other region.

FIG. 44 is a diagram illustrating a uniform grid 73 constituted by the vertical electrodes 71 and the horizontal electrodes 72. The arrangement illustrated in FIG. 44, although free from openings such as those illustrated in FIG. 42, includes vertical electrodes 71 and horizontal electrodes 72 none of which has center-line symmetry or center-point symmetry. Further, placing the vertical electrodes 71 and the horizontal electrodes 72 on top of each other results in zigzag shapes 78 and 79 being formed respectively along the left side and bottom side of the grid 73 as illustrated in FIG. 44. This problematically makes it difficult to easily join, directly to the grid 73, (i) an address line for driving the horizontal electrodes 72 (or the vertical electrodes 71) and (ii) an address line for reading a signal from the vertical electrodes 71 (or the horizontal electrodes 72).

The arrangement illustrated in FIG. 45 includes (i) conductive X lines 64 that are parallel to the Y axis and (ii) conductive Y lines 69 that are parallel to the X axis. A conductive X line 64 is stacked on a conductive Y line 69 to form a light-transmitting region, which thus includes (i) straight lines parallel to the Y axis and (ii) straight lines parallel to the X axis. Thus, placing this capacitive touch sensor panel on, for example, a liquid crystal display problematically allows moire to occur.

It is an object of the present invention to provide a linear system coefficient estimating method, a linear device column value estimating method, a capacitance detecting method, an integrated circuit, a touch sensor system, and an electronic device each of which (i) achieves both a high detection accuracy and a high resolution and (ii) allows a high-speed operation.

It is an object of the present invention to provide (i) a capacitive touch sensor panel that includes a uniform grid with no visible gap and that can prevent moire or the like when placed on a display device, (ii) a capacitive touch sensor system including the above capacitive touch sensor panel, and (iii) an information input-output device.

Solution to Problem

A linear device value estimating method of the present invention is a linear device value estimating method for use in a touch sensor panel, the touch sensor panel including: a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction; a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction; an insulator provided between the vertical electrode surface and the horizontal electrode surface so as to insulate the plurality of vertical electrodes and the plurality of horizontal electrodes from each other; and a plurality of linear devices provided at respective intersections of the plurality of vertical electrodes with the plurality of horizontal electrodes, the plurality of vertical electrodes and the plurality of horizontal electrodes (i) being disposed so that, as viewed in a direction perpendicular to the vertical electrode surface, the plurality of vertical electrodes include no segment coincident with the plurality of horizontal electrodes and (ii) forming a uniform grid having no gap, the fine wire included in the first basic shapes and the fine wire included in the second basic shapes each extending in an oblique direction, the grid having a rectangular outline, the linear device value estimating method comprising: an outputting step for driving the plurality of vertical electrodes in parallel on a basis of code sequences di for each of the plurality of linear devices so as to output, along the plurality of horizontal electrodes, linear sums of respective outputs corresponding to the plurality of linear devices; and an estimating step for estimating respective values of the plurality of linear devices along the plurality of horizontal electrodes on a basis of an inner product operation of (i) the linear sums outputted along the plurality of horizontal electrodes and (ii) the code sequences di.

The above feature drives the plurality of vertical electrodes in parallel on the basis of code sequences di, and outputs, along the plurality of horizontal electrodes, the linear sums of outputs corresponding respectively to the linear devices. This makes it possible to estimate values of the linear devices, the values being inputted all simultaneously to the plurality of vertical electrodes along the individual horizontal electrodes. The above feature consequently (i) eliminates the need to sequentially select one of M drive lines and scan it for an input as in conventional arrangements, and (ii) extends a process time for obtaining values of linear devices. The linear device value estimating method thus maintains a good detection accuracy and achieves a good resolution and a high-speed operation.

A capacitance detecting method of the present invention is a capacitance detecting method for use in a touch sensor panel, the touch sensor panel including: a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction; a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction; an insulator provided between the vertical electrode surface and the horizontal electrode surface so as to insulate the plurality of vertical electrodes and the plurality of horizontal electrodes from each other; and a plurality of capacitances provided at respective intersections of the plurality of vertical electrodes with the plurality of horizontal electrodes, the plurality of vertical electrodes and the plurality of horizontal electrodes (i) being disposed so that, as viewed in a direction perpendicular to the vertical electrode surface, the plurality of vertical electrodes include no segment coincident with the plurality of horizontal electrodes and (ii) forming a uniform grid having no gap, the fine wire included in the first basic shapes and the fine wire included in the second basic shapes each extending in an oblique direction, the grid having a rectangular outline, the capacitance detecting method comprising: an outputting step for (i) driving the plurality of vertical electrodes in parallel for each of the plurality of capacitances, on a basis of code sequences di which include elements each being either +1 or −1, so that a voltage +V is applied for an element of +1 in the code sequences and that a voltage −V is applied for an element of −1 in the code sequences, and thus (ii) outputting, along the plurality of horizontal electrodes, linear sums of respective outputs corresponding to the plurality of capacitances; and an estimating step for estimating respective capacitance values of the plurality of capacitances along the plurality of horizontal electrodes on a basis of an inner product operation of the linear sums of the outputs and the code sequences di.

An integrated circuit of the present invention is a integrated circuit for controlling a touch sensor panel, the touch sensor panel including: a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction; a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction; an insulator provided between the vertical electrode surface and the horizontal electrode surface so as to insulate the plurality of vertical electrodes and the plurality of horizontal electrodes from each other; and a plurality of capacitances provided at respective intersections of the plurality of vertical electrodes with the plurality of horizontal electrodes, the plurality of vertical electrodes and the plurality of horizontal electrodes (i) being disposed so that, as viewed in a direction perpendicular to the vertical electrode surface, the plurality of vertical electrodes include no segment coincident with the plurality of horizontal electrodes and (ii) forming a uniform grid having no gap, the fine wire included in the first basic shapes and the fine wire included in the second basic shapes each extending in an oblique direction, the grid having a rectangular outline, the integrated circuit comprising: a drive section for (i) driving the plurality of vertical electrodes in parallel for each of the plurality of capacitances, on a basis of code sequences di which include elements each being either +1 or −1, so that a voltage +V is applied for an element of +1 in the code sequences and that a voltage −V is applied for an element of −1 in the code sequences, and thus (ii) outputting, along the plurality of horizontal electrodes, linear sums of respective electric charges stored in the plurality of capacitances; and an estimating section for estimating respective capacitance values of the plurality of capacitances along the plurality of horizontal electrodes on a basis of an inner product operation of (i) the linear sums of the electric charges, the linear sums being outputted along the plurality of horizontal electrodes, and (ii) the code sequences di.

A touch sensor system of the present invention is a touch sensor system comprising: a touch sensor panel, the touch sensor panel including: a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction; a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction; an insulator provided between the vertical electrode surface and the horizontal electrode surface so as to insulate the plurality of vertical electrodes and the plurality of horizontal electrodes from each other; and a plurality of capacitances provided at respective intersections of the plurality of vertical electrodes with the plurality of horizontal electrodes, the plurality of vertical electrodes and the plurality of horizontal electrodes (i) being disposed so that, as viewed in a direction perpendicular to the vertical electrode surface, the plurality of vertical electrodes include no segment coincident with the plurality of horizontal electrodes and (ii) forming a uniform grid having no gap, the fine wire included in the first basic shapes and the fine wire included in the second basic shapes each extending in an oblique direction, the grid having a rectangular outline; and an integrated circuit for controlling the touch sensor panel, the integrated circuit including: a drive section for (i) driving the plurality of vertical electrodes in parallel for each of the plurality of capacitances, on a basis of code sequences di which include elements each being either +1 or −1, so that a voltage +V is applied for an element of +1 in the code sequences and that a voltage −V is applied for an element of −1 in the code sequences, and thus (ii) outputting, along the plurality of horizontal electrodes, linear sums of respective electric charges stored in the plurality of capacitances; and an estimating section for estimating respective capacitance values of the plurality of capacitances along the plurality of horizontal electrodes on a basis of an inner product operation of (i) the linear sums of the electric charges, the linear sums being outputted along the plurality of horizontal electrodes, and (ii) the code sequences di.

An electronic device of the present invention is a electronic device, comprising: the touch sensor system of the present invention; and a display panel which either is placed on the touch sensor panel included in the touch sensor system or contains the touch sensor panel.

A capacitance detecting method of the present invention is a capacitance detecting method for detecting a capacitance of a touch sensor panel, the touch sensor panel including: a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction; a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction; an insulator provided between the vertical electrode surface and the horizontal electrode surface so as to insulate the plurality of vertical electrodes and the plurality of horizontal electrodes from each other; and a plurality of capacitances provided at respective intersections of the plurality of vertical electrodes with the plurality of horizontal electrodes, the plurality of vertical electrodes and the plurality of horizontal electrodes (i) being disposed so that, as viewed in a direction perpendicular to the vertical electrode surface, the plurality of vertical electrodes include no segment coincident with the plurality of horizontal electrodes and (ii) forming a uniform grid having no gap, the fine wire included in the first basic shapes and the fine wire included in the second basic shapes each extending in an oblique direction, the grid having a rectangular outline, the capacitance detecting method comprising: an outputting step for (i) driving the plurality of vertical electrodes in parallel for each of the plurality of capacitances, on a basis of code sequences di which include elements each being either +1 or −1, and (ii) outputting, to an analog integrator along the plurality of horizontal electrodes, linear sums of respective electric charges stored in the plurality of capacitances; and an estimating step for estimating respective capacitance values of the plurality of capacitances along the plurality of horizontal electrodes on a basis of an inner product operation of (i) the linear sums of the electric charges, the linear sums being outputted to the analog integrator along the plurality of horizontal electrodes, and (ii) the code sequences di, the outputting step driving, when the analog integrator is reset, the plurality of vertical electrodes at a first voltage represented by a voltage Vref, and driving, when the linear sums of the electric charges, the linear sums being outputted along the plurality of horizontal electrodes is sampled, the plurality of vertical electrodes at (i) a second voltage for an element of +1 in the code sequences, the second voltage being represented by a voltage (Vref+V), and (ii) a third voltage for an element of −1 in the code sequences, the third voltage being represented by a voltage (Vref−V).

Another capacitance detecting method of the present invention is a capacitance detecting method for detecting a capacitance of a touch sensor panel, the touch sensor panel including: a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction; a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction; an insulator provided between the vertical electrode surface and the horizontal electrode surface so as to insulate the plurality of vertical electrodes and the plurality of horizontal electrodes from each other; and a plurality of capacitances provided at respective intersections of the plurality of vertical electrodes with the plurality of horizontal electrodes, the plurality of vertical electrodes and the plurality of horizontal electrodes (i) being disposed so that, as viewed in a direction perpendicular to the vertical electrode surface, the plurality of vertical electrodes include no segment coincident with the plurality of horizontal electrodes and (ii) forming a uniform grid having no gap, the fine wire included in the first basic shapes and the fine wire included in the second basic shapes each extending in an oblique direction, the grid having a rectangular outline, the capacitance detecting method comprising: an outputting step for (i) driving the plurality of vertical electrodes in parallel, on a basis of code sequences di which include elements each being either +1 or −1, and (ii) outputting, to an analog integrator along the plurality of horizontal electrodes, linear sums of respective electric charges stored in the plurality of capacitances; and an estimating step for estimating respective capacitance values of the plurality of capacitances along the plurality of horizontal electrodes on a basis of an inner product operation of (i) the linear sums of the electric charges, the linear sums being outputted to the analog integrator along the plurality of horizontal electrodes, and (ii) the code sequences di, the outputting step driving, for an element of +1 in the code sequences, the plurality of vertical electrodes at (i) a first voltage when the analog integrator is reset and at (ii) a second voltage when the linear sums of the electric charges, the linear sums being outputted along the plurality of horizontal electrodes, is sampled, and, for an element of −1 in the code sequences, the plurality of vertical electrodes at (i) the second voltage when the analog integrator is reset, and (ii) the first voltage when the linear sums are sampled.

Still another capacitance detecting method of the present invention is a capacitance detecting method for detecting a capacitance of a touch sensor panel, the touch sensor panel including: a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction; a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction; an insulator provided between the vertical electrode surface and the horizontal electrode surface so as to insulate the plurality of vertical electrodes and the plurality of horizontal electrodes from each other; and a plurality of capacitances provided at respective intersections of the plurality of vertical electrodes with the plurality of horizontal electrodes, the plurality of vertical electrodes and the plurality of horizontal electrodes (i) being disposed so that, as viewed in a direction perpendicular to the vertical electrode surface, the plurality of vertical electrodes include no segment coincident with the plurality of horizontal electrodes and (ii) forming a uniform grid having no gap, the fine wire included in the first basic shapes and the fine wire included in the second basic shapes each extending in an oblique direction, the grid having a rectangular outline, the capacitance detecting method comprising: an outputting step for (i) driving the plurality of vertical electrodes in parallel, on a basis of code sequences di which include elements each being either +1 or −1, and (ii) outputting, to an analog integrator along the plurality of horizontal electrodes, linear sums of respective electric charges stored in the plurality of capacitances; and an estimating step for estimating respective capacitance values of the plurality of capacitances along the plurality of horizontal electrodes on a basis of an inner product operation of (i) the linear sums of the electric charges, the linear sums being outputted to the analog integrator along the plurality of horizontal electrodes, and (ii) the code sequences di, the capacitance detecting method further including, before the outputting step, a step of (i) driving, when the analog integrator is reset and when the linear sums of the electric charges, the linear sums being outputted to the analog integrator along the plurality of horizontal electrodes is sampled, the plurality of vertical electrodes at a first voltage so that the outputs of the linear sums of the electric charges are outputted to the analog integrator, (ii) reading out, from the analog integrator, the outputs of the linear sums of the electric charges as offset outputs, and (iii) storing the offset outputs in a memory.

Another integrated circuit of the present invention is an integrated circuit for controlling a touch sensor panel, the touch sensor panel including: a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction; a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction; an insulator provided between the vertical electrode surface and the horizontal electrode surface so as to insulate the plurality of vertical electrodes and the plurality of horizontal electrodes from each other; and a plurality of capacitances provided at respective intersections of the plurality of vertical electrodes with the plurality of horizontal electrodes, the plurality of vertical electrodes and the plurality of horizontal electrodes (i) being disposed so that, as viewed in a direction perpendicular to the vertical electrode surface, the plurality of vertical electrodes include no segment coincident with the plurality of horizontal electrodes and (ii) forming a uniform grid having no gap, the fine wire included in the first basic shapes and the fine wire included in the second basic shapes each extending in an oblique direction, the grid having a rectangular outline, the integrated circuit comprising: a drive section for (i) driving the plurality of vertical electrodes in parallel for the plurality of capacitances, on a basis of code sequences di which include elements each being either +1 or −1 and thus (ii) outputting, to an analog integrator along the plurality of horizontal electrodes, linear sums of respective electric charges stored in the plurality of capacitances; and an estimating section for estimating respective capacitance values of the plurality of capacitances along the plurality of horizontal electrodes on a basis of an inner product operation of (i) the linear sums of the electric charges, the linear sums being outputted to the analog integrator along the plurality of horizontal electrodes, and (ii) the code sequences di, the drive section driving, for an element of +1 in the code sequences, the plurality of vertical electrodes at (i) a first voltage when the analog integrator is reset and at (ii) a second voltage when outputs from the plurality of capacitances are sampled, and, for an element of −1 in the code sequences, the plurality of vertical electrodes at (i) the second voltage when the analog integrator is reset, and (ii) the first voltage when the outputs from the plurality of capacitances are sampled.

Still another integrated circuit of the present invention is an integrated circuit for controlling a touch sensor panel, the touch sensor panel including: a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction; a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction; an insulator provided between the vertical electrode surface and the horizontal electrode surface so as to insulate the plurality of vertical electrodes and the plurality of horizontal electrodes from each other; and a plurality of capacitances provided at respective intersections of the plurality of vertical electrodes with the plurality of horizontal electrodes, the plurality of vertical electrodes and the plurality of horizontal electrodes (i) being disposed so that, as viewed in a direction perpendicular to the vertical electrode surface, the plurality of vertical electrodes include no segment coincident with the plurality of horizontal electrodes and (ii) forming a uniform grid having no gap, the fine wire included in the first basic shapes and the fine wire included in the second basic shapes each extending in an oblique direction, the grid having a rectangular outline, the integrated circuit comprising: a drive section for (i) driving the plurality of vertical electrodes in parallel for the plurality of capacitances, on a basis of code sequences di which include elements each being either +1 or −1 and thus (ii) outputting, to an analog integrator along the plurality of horizontal electrodes, linear sums of respective electric charges stored in the plurality of capacitances; and an estimating section for estimating respective capacitance values of the plurality of capacitances along the plurality of horizontal electrodes on a basis of an inner product operation of (i) the linear sums of the electric charges, the linear sums being outputted to the analog integrator along the plurality of horizontal electrodes, and (ii) the code sequences di, the drive section, before the linear sums of the electric charges stored in the plurality of capacitances are outputted to the analog integrator along the plurality of horizontal electrodes, (i) driving the plurality of vertical electrodes at a first voltage when the analog integrator is reset and when the linear sums of the electric charges are sampled, (ii) outputting the linear sums of the electric charges to the analog integrator along the plurality of horizontal electrodes, (iii) reading out, from the analog integrator, the linear sums of the electric charges as offset outputs, and (iv) storing the offset outputs in a memory.

Another touch sensor system of the present invention is a touch sensor system comprising: a touch sensor panel, the touch sensor panel including: a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction; a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction; an insulator provided between the vertical electrode surface and the horizontal electrode surface so as to insulate the plurality of vertical electrodes and the plurality of horizontal electrodes from each other; and a plurality of capacitances provided at respective intersections of the plurality of vertical electrodes with the plurality of horizontal electrodes, the plurality of vertical electrodes and the plurality of horizontal electrodes (i) being disposed so that, as viewed in a direction perpendicular to the vertical electrode surface, the plurality of vertical electrodes include no segment coincident with the plurality of horizontal electrodes and (ii) forming a uniform grid having no gap, the fine wire included in the first basic shapes and the fine wire included in the second basic shapes each extending in an oblique direction, the grid having a rectangular outline; and an integrated circuit for controlling the touch sensor panel, the integrated circuit including: a drive section for (i) driving the plurality of vertical electrodes in parallel for each of the plurality of capacitances, on a basis of code sequences di which include elements each being either +1 or −1 and thus (ii) outputting, to an analog integrator along the plurality of horizontal electrodes, linear sums of respective electric charges stored in the plurality of capacitances; and an estimating section for estimating respective capacitance values of the plurality of capacitances along the plurality of horizontal electrodes on a basis of an inner product operation of (i) the linear sums of the electric charges, the linear sums being outputted along the plurality of horizontal electrodes, and (ii) the code sequences di, the drive section driving, for an element of +1 in the code sequences, the plurality of vertical electrodes at (i) a first voltage when the analog integrator is reset and at (ii) a second voltage when the linear sums of the electric charges are sampled, and, for an element of −1 in the code sequences, the plurality of vertical electrodes at (i) the second voltage when the analog integrator is reset, and (ii) the first voltage when the linear sums of the electric charges are sampled.

Still another touch sensor system of the present invention is a touch sensor system comprising: a touch sensor panel, the touch sensor panel including: a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction; a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction; an insulator provided between the vertical electrode surface and the horizontal electrode surface so as to insulate the plurality of vertical electrodes and the plurality of horizontal electrodes from each other; and a plurality of capacitances provided at respective intersections of the plurality of vertical electrodes with the plurality of horizontal electrodes, the plurality of vertical electrodes and the plurality of horizontal electrodes (i) being disposed so that, as viewed in a direction perpendicular to the vertical electrode surface, the plurality of vertical electrodes include no segment coincident with the plurality of horizontal electrodes and (ii) forming a uniform grid having no gap, the fine wire included in the first basic shapes and the fine wire included in the second basic shapes each extending in an oblique direction, the grid having a rectangular outline; and an integrated circuit for controlling the touch sensor panel, the integrated circuit including: a drive section for (i) driving the plurality of vertical electrodes in parallel for each of the plurality of capacitances, on a basis of code sequences di which include elements each being either +1 or −1 and thus (ii) outputting, to an analog integrator along the plurality of horizontal electrodes, linear sums of respective electric charges stored in the plurality of capacitances; and an estimating section for estimating respective capacitance values of the plurality of capacitances along the plurality of horizontal electrodes on a basis of an inner product operation of (i) the linear sums of the electric charges, the linear sums being outputted along the plurality of horizontal electrodes, and (ii) the code sequences di, the drive section, before the linear sums of the electric charges are outputted to the analog integrator, (i) driving the plurality of vertical electrodes at a first voltage when the analog integrator is reset and when the linear sums of the electric charges are sampled, (ii) outputting the linear sums of the electric charges to the analog integrator, (iii) reading out, from the analog integrator, the linear sums of the electric charges as offset outputs, and (iv) storing the offset outputs in a memory.

Another electronic device of the present invention is an electronic device, comprising: the touch sensor system of the present invention; and a display panel which either is placed on the sensor panel included in the touch sensor system or contains the sensor panel.

Still another capacitance detecting method of the present invention is a capacitance detecting method for detecting a capacitance of a touch sensor panel, the touch sensor panel including: a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction; a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction; an insulator provided between the vertical electrode surface and the horizontal electrode surface so as to insulate the plurality of vertical electrodes and the plurality of horizontal electrodes from each other; and a plurality of capacitances provided at respective intersections of the plurality of vertical electrodes with the plurality of horizontal electrodes, the plurality of vertical electrodes and the plurality of horizontal electrodes (i) being disposed so that, as viewed in a direction perpendicular to the vertical electrode surface, the plurality of vertical electrodes include no segment coincident with the plurality of horizontal electrodes and (ii) forming a uniform grid having no gap, the fine wire included in the first basic shapes and the fine wire included in the second basic shapes each extending in an oblique direction, the grid having a rectangular outline, the capacitance detecting method comprising: an outputting step for (i) driving the plurality of vertical electrodes in parallel, on a basis of code sequences di which include elements each being either +1 or −1, so that a voltage +V is applied for an element of +1 in the code sequences and that a voltage −V is applied for an element of −1 in the code sequences, and (ii) outputting, to an analog integrator along the plurality of horizontal electrodes, linear sums of respective electric charges stored in the plurality of capacitances; and an estimating step for estimating respective capacitance values of the plurality of capacitances along the plurality of horizontal electrodes on a basis of an inner product operation of (i) the linear sums of the electric charges, the linear sums being outputted to the analog integrator along the plurality of horizontal electrodes, and (ii) the code sequences di, the outputting step, to prevent saturation of the analog integrator, switching a gain of the analog integrator in accordance with an absolute value of a sum total of corresponding elements present in the code sequences along a column direction.

Still another capacitance detecting method of the present invention is a capacitance detecting method for detecting a capacitance of a touch sensor panel, the touch sensor panel including: a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction; a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction; an insulator provided between the vertical electrode surface and the horizontal electrode surface so as to insulate the plurality of vertical electrodes and the plurality of horizontal electrodes from each other; and a plurality of capacitances provided at respective intersections of the plurality of vertical electrodes with the plurality of horizontal electrodes, the plurality of vertical electrodes and the plurality of horizontal electrodes (i) being disposed so that, as viewed in a direction perpendicular to the vertical electrode surface, the plurality of vertical electrodes include no segment coincident with the plurality of horizontal electrodes and (ii) forming a uniform grid having no gap, the fine wire included in the first basic shapes and the fine wire included in the second basic shapes each extending in an oblique direction, the grid having a rectangular outline, the capacitance detecting method comprising: an outputting step for (i) driving the plurality of vertical electrodes in parallel, on a basis of code sequences di which include elements each being either +1 or −1, so that a voltage +V is applied for an element of +1 in the code sequences and that a voltage −V is applied for an element of 1− in the code sequences, and (ii) outputting, to an analog integrator along the plurality of horizontal electrodes, linear sums of respective electric charges stored in the plurality of capacitances; and an estimating step for estimating respective capacitance values of the plurality of capacitances along the plurality of horizontal electrodes on a basis of an inner product operation of (i) the linear sums of the electric charges, the linear sums being outputted to the analog integrator along the plurality of horizontal electrodes, and (ii) the code sequences di, the outputting step, to prevent saturation of the analog integrator, dividing, in accordance with an absolute value of a sum total of corresponding elements present in the code sequences along a column direction, a column of the code sequences into a plurality of columns so as to divide the driving of the plurality of vertical electrodes into a plurality of drivings.

Still anther capacitance detecting method of the present invention is a capacitance detecting method for detecting a capacitance of a touch sensor panel, the touch sensor panel including: a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction; a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction; an insulator provided between the vertical electrode surface and the horizontal electrode surface so as to insulate the plurality of vertical electrodes and the plurality of horizontal electrodes from each other; and a plurality of capacitances provided at respective intersections of the plurality of vertical electrodes with the plurality of horizontal electrodes, the plurality of vertical electrodes and the plurality of horizontal electrodes (i) being disposed so that, as viewed in a direction perpendicular to the vertical electrode surface, the plurality of vertical electrodes include no segment coincident with the plurality of horizontal electrodes and (ii) forming a uniform grid having no gap, the fine wire included in the first basic shapes and the fine wire included in the second basic shapes each extending in an oblique direction, the grid having a rectangular outline, the capacitance detecting method comprising: an outputting step for (i) driving the plurality of vertical electrodes in parallel, on a basis of code sequences di which include elements each being either +1 or −1, the code sequences corresponding to respective rows of a Hadamard matrix created by Sylvester method for each of the plurality of capacitances, so that a voltage +V is applied for an element of +1 in the code sequences and that a voltage −V is applied for an element of −1 in the code sequences, and (ii) outputting, to an analog integrator along the plurality of horizontal electrodes, linear sums of respective electric charges stored in the plurality of capacitances; and an estimating step for estimating respective capacitance values of the plurality of capacitances along the plurality of horizontal electrodes on a basis of an inner product operation of (i) the linear sums of the electric charges, the linear sums being outputted to the analog integrator along the plurality of horizontal electrodes, and (ii) the code sequences di, the outputting step, to prevent saturation of the analog integrator, dividing a first column of the code sequences into a plurality of columns so as to divide a driving for the first column of the code sequences into a plurality of drivings.

Still another capacitance detecting method of the present invention is a capacitance detecting method for detecting a capacitance of a touch sensor panel, the touch sensor panel including: a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction; a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction; an insulator provided between the vertical electrode surface and the horizontal electrode surface so as to insulate the plurality of vertical electrodes and the plurality of horizontal electrodes from each other; and a plurality of capacitances provided at respective intersections of the plurality of vertical electrodes with the plurality of horizontal electrodes, the plurality of vertical electrodes and the plurality of horizontal electrodes (i) being disposed so that, as viewed in a direction perpendicular to the vertical electrode surface, the plurality of vertical electrodes include no segment coincident with the plurality of horizontal electrodes and (ii) forming a uniform grid having no gap, the fine wire included in the first basic shapes and the fine wire included in the second basic shapes each extending in an oblique direction, the grid having a rectangular outline, the capacitance detecting method comprising: an outputting step for (i) driving the plurality of vertical electrodes in parallel, on a basis of code sequences di which include elements each being either +1 or −1, the code sequences corresponding to respective rows of a Hadamard matrix created by Sylvester method for each of the plurality of capacitances, so that a voltage +V is applied for an element of +1 in the code sequences and that a voltage −V is applied for an element of −1 in the code sequences, and (ii) outputting, to an analog integrator along the plurality of horizontal electrodes, linear sums of respective electric charges stored in the plurality of capacitances; and an estimating step for estimating respective capacitance values of the plurality of capacitances along the plurality of horizontal electrodes on a basis of an inner product operation of (i) the linear sums of the electric charges, the linear sums being outputted to the analog integrator along the plurality of horizontal electrodes, and (ii) the code sequences di, the outputting step dividing a particular column of the code sequences into a plurality of columns, the particular column having an absolute value of a sum total of corresponding elements present in the code sequences along a column direction which absolute value exceeds a threshold Num for saturation of the analog integrator, so as to divide a driving for the particular column into a plurality of drivings.

Advantageous Effects of Invention

A linear device value estimating method of the present invention includes: an outputting step for driving the plurality of vertical electrodes in parallel on a basis of code sequences di for each of the plurality of linear devices so as to output, along the plurality of horizontal electrodes, linear sums of respective outputs corresponding to the plurality of linear devices; and an estimating step for estimating respective values of the plurality of linear devices along the plurality of horizontal electrodes on a basis of an inner product operation of (i) the linear sums outputted along the plurality of horizontal electrodes and (ii) the code sequences di.

The above feature drives the plurality of vertical electrodes in parallel on the basis of code sequences di, and outputs, along the plurality of horizontal electrodes, the linear sums of outputs corresponding respectively to the linear devices. This makes it possible to estimate values of the linear devices, the values being inputted all simultaneously to the plurality of vertical electrodes along the individual horizontal electrodes. The above feature consequently (i) eliminates the need to sequentially select one of M drive lines and scan it for an input as in conventional arrangements, and (ii) extends a process time for obtaining values of linear devices. The linear device value estimating method thus maintains a good detection accuracy and achieves a good resolution and a high-speed operation.

BRIEF DESCRIPTION OF DRAWINGS

FIG. 5 is a diagram illustrating a first specific example of orthogonal code sequences as an input to the sensor panel included in the touch sensor system.

FIG. 6 is a diagram illustrating a second specific example of the orthogonal code sequences.

FIG. 7 is a diagram illustrating a third specific example of the orthogonal code sequences.

FIG. 11 (*a*) and (*b*) of FIG. 11 are each a diagram illustrating a code sequence for use in driving a sensor panel of Embodiment 4.

FIG. 12 is a diagram illustrating a code sequence for use in driving a sensor panel of Embodiment 5.

FIG. 14 (*a*) is a diagram for explaining code sequences of the above Embodiments which code sequences are based on an M-sequence, and (*b*) is a diagram illustrating a specific example of the code sequences based on an M-sequence.

FIG. 38 (*a*) is a diagram illustrating a first basic shape of a vertical electrode included as a variation in the touch panel, and (*b*) is a diagram illustrating a second basic shape of a horizontal electrode included as a variation in the touch panel.

DESCRIPTION OF EMBODIMENTS

Embodiments of a touch sensor system of the present invention are described below with reference to FIGS. 1 through 40.

Embodiment 1

Configuration of Touch Sensor System of Embodiment 1

Figure 1:
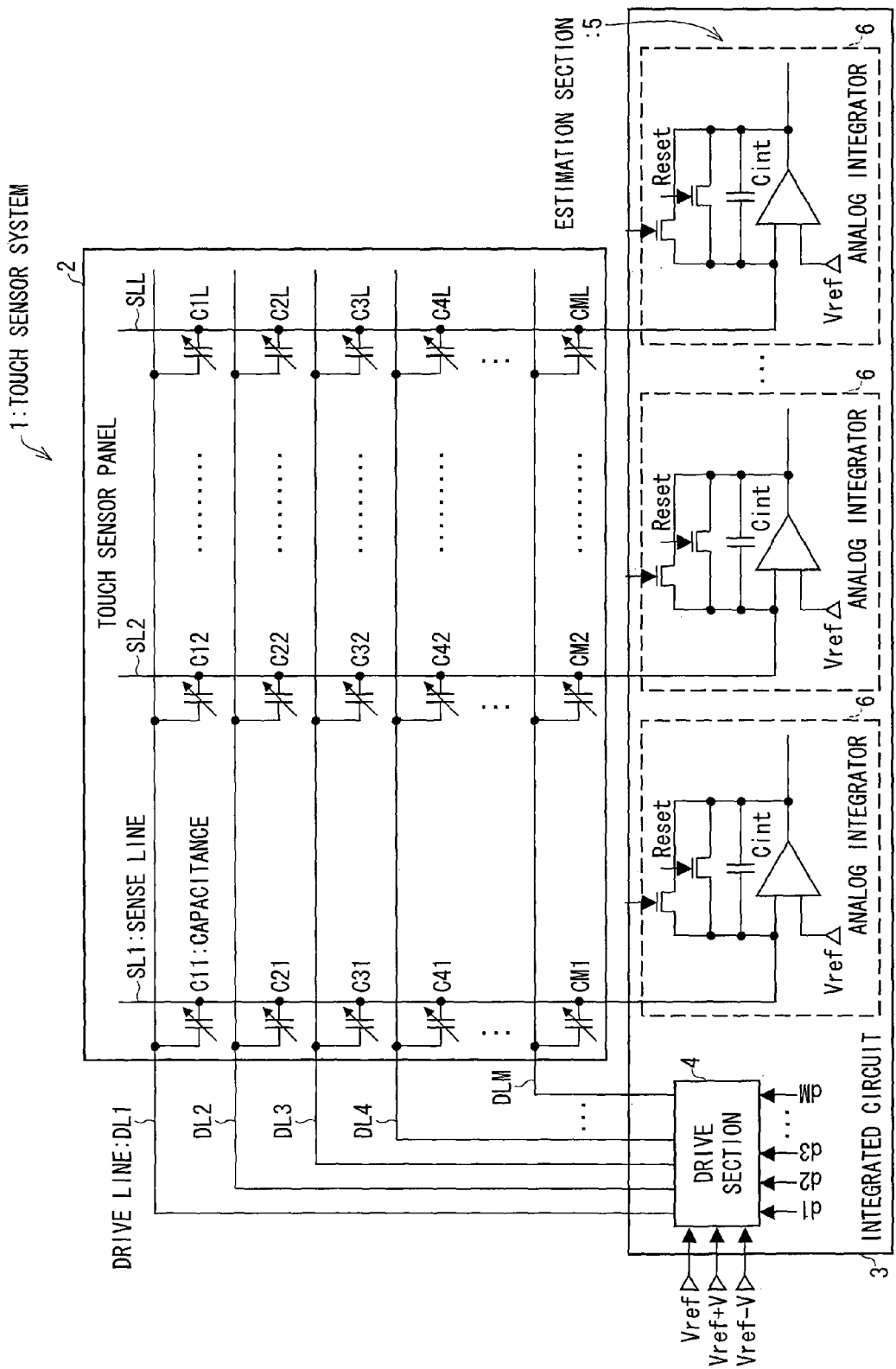
FIG. 1 is a circuit diagram illustrating a configuration of a touch sensor system of a first embodiment.

FIG. 1 is a circuit diagram illustrating a configuration of a touch sensor system 1 of the present embodiment. The touch sensor system 1 includes: a touch sensor panel 2; and an integrated circuit 3 for controlling the touch sensor panel 2. The touch sensor panel 2 includes: M drive lines DL1 through DLM provided in a horizontal direction in parallel to one another so as to be separated from one another at a predetermined interval; L sense lines SL1 through SLL provided in such a direction as to cross the drive lines and in parallel to one another so as to be separated from one another at a predetermined interval; and capacitances Cij (where i=1 to M, and j=1 to L) provided in a matrix of M rows×L columns at respective intersections of the M drive lines DL1 through DLM with the L sense lines SL1 through SLL.

Figure 2:
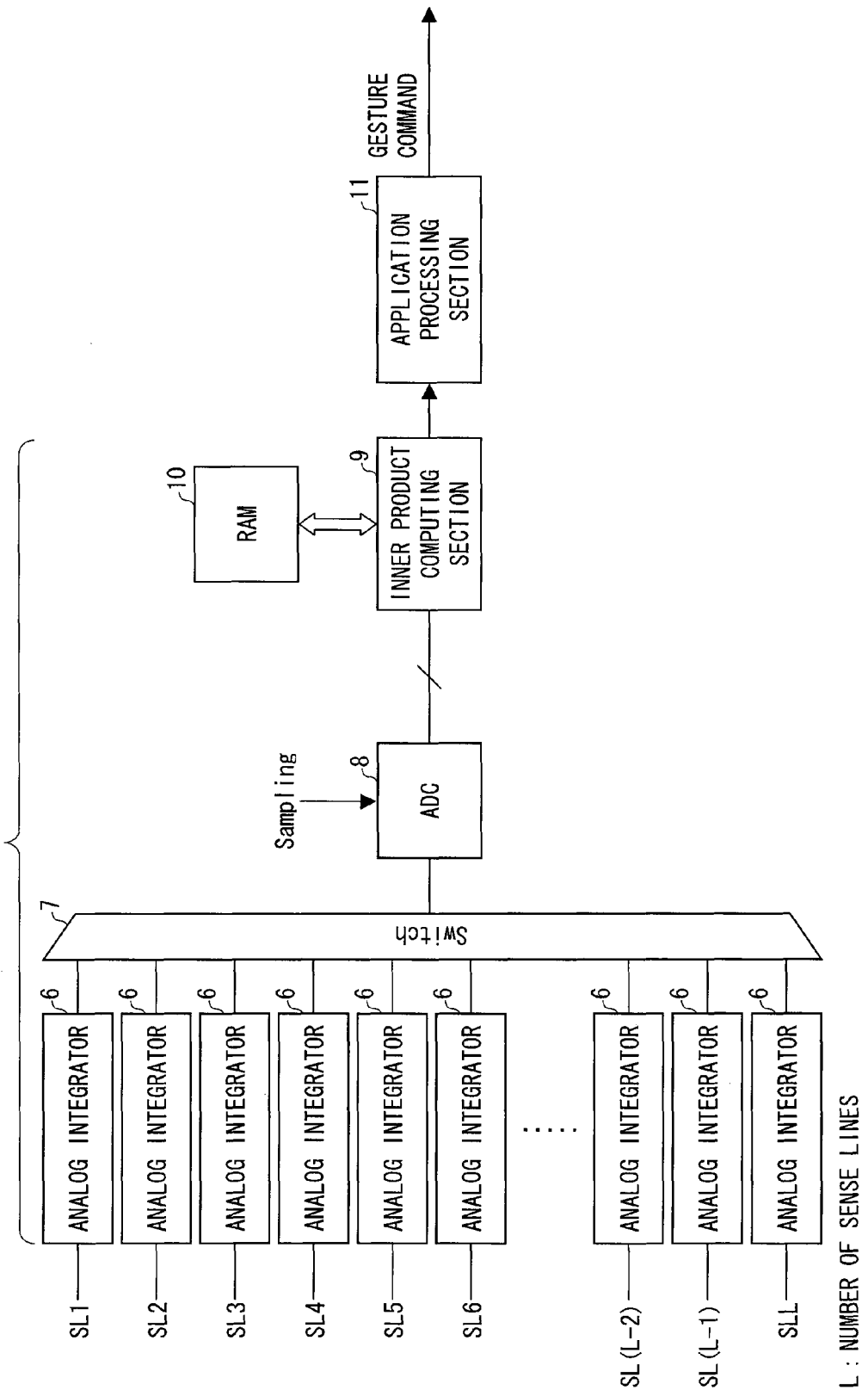
FIG. 2 is a block diagram illustrating a configuration of an estimation section of an integrated circuit included in the touch sensor system.

The integrated circuit 3 includes: a drive section 4 connected to the M drive lines DL1 through DLM; and an estimation section 5. FIG. 2 is a block diagram illustrating a configuration of the estimation section 5 included in the integrated circuit 3.

The estimation section 5 includes: L analog integrators connected to the L sense lines SL1 through SLL, respectively; a switch 7 connected to the L analog integrators 6; an AD converter 8 connected to the switch 7; an inner product computing section 9 connected to the AD converter 8; and a RAM 10 connected to the inner product computing section 9. The analog integrators 6 each include: an operational amplifier with a first input grounded; an integral capacitance Cint provided between an output of the operational amplifier and a second input thereof; a first transistor connected to the second input of the operational amplifier; and a second transistor connected to the second input in parallel to the first transistor.

The integrated circuit 3 further includes an application processing section 11 which is connected to the inner product computing section 9 and which carries out a gesture recognition process (for example, ARM) at 240 Hz. The integrated circuit 3 thus includes both analog circuits and digital circuits.

(Operation of Conventional Touch Sensor System)

The description below deals first with an operation of the conventional touch sensor device disclosed in Patent Literature 1 mentioned above, and then with an operation of the touch sensor system 1 of the present embodiment in detail. The following looks at detection of capacitances Cij (where i=1, ..., M, and j=1, ..., L) formed in a matrix at respective intersections of M drive lines and L sense lines, and specifically at scanning detection in which the individual drive lines are sequentially selected.

Capacitances Cij (j=1, ..., L) connected to a selected drive line are each supplied with a voltage V so as to store an electric charge (signal) Cij×V. Supposing that this signal is read out via a sense line so that a gain G is obtained, a signal to be detected is expressed as follows:

$$G \times Cij \times V \quad \text{(Formula 1)}$$

(Operation of Touch Sensor System of Present Embodiment)

Figure 3:
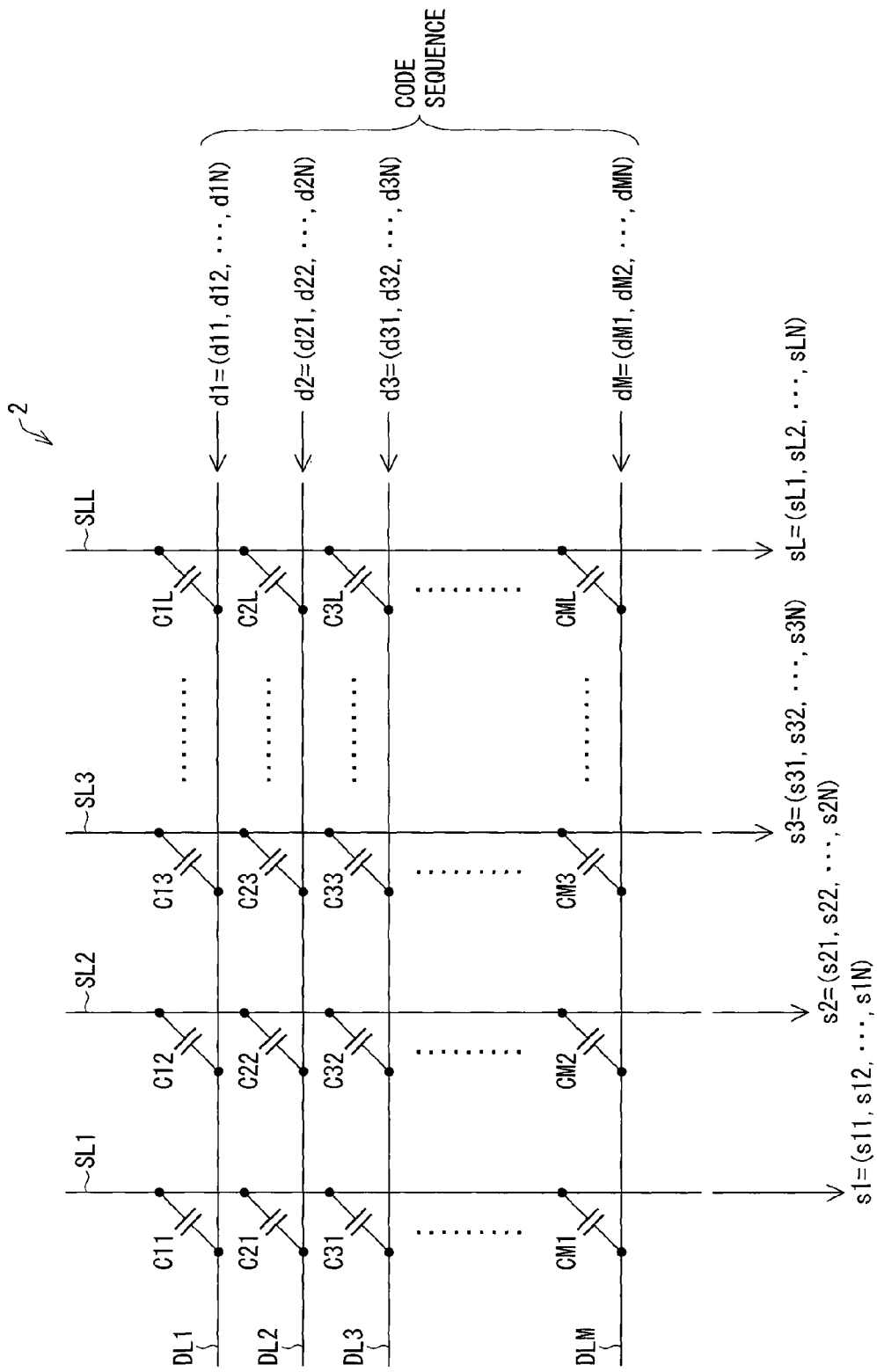
FIG. 3 is a diagram describing a method for driving a sensor panel included in the touch sensor system.

FIG. 3 is a diagram illustrating a method for driving the touch sensor panel 2 included in the touch sensor system 1. Constituents illustrated in FIG. 3 which are identical to their respective equivalents illustrated and referred to in FIGS. 1 and 2 are each assigned the same reference sign accordingly. Such constituents in FIG. 3 are not described in detail here.

First, the present embodiment of the present invention prepares code sequences di (=di1, di2, ..., diN, where i=1, ..., M). The code sequences di are orthogonal to one another and include +1 and −1. Further, the code sequences di each have a code length N. The orthogonality of the code sequences di (=di1, di2, ..., diN, where i=1, ..., M) each with a code length N means that the code sequences di satisfy the following condition:

$$di \cdot dk = \sum_{j=1}^{N} dij \times dkj$$
$$= N \times \delta ik$$

where $\delta ik = 1$ if $i = k$ $\delta ik = 0$ if $i \neq k$

The drive section 4 drives the M drive lines DL1 through DLM in parallel on the basis of the code sequences di so that a voltage +V is applied to each capacitance corresponding to +1 and a voltage −V is applied to each capacitance corresponding to −1. The capacitances Cij (where i=1 to M, and j=1 to L) consequently each store an electric charge (signal) ±CijV in accordance with a corresponding element (+1 or −1) in the code sequences.

The analog integrators 6 then each (i) add, via its connection to a corresponding sense line, electric charges stored in capacitances connected to the sense line and thus (ii) read out a signal for its corresponding sense line. The analog integrators 6 consequently obtain output sequence vectors sj (=sj1, sj2, ..., sjN, where j=1, ..., L).

Figure 4:
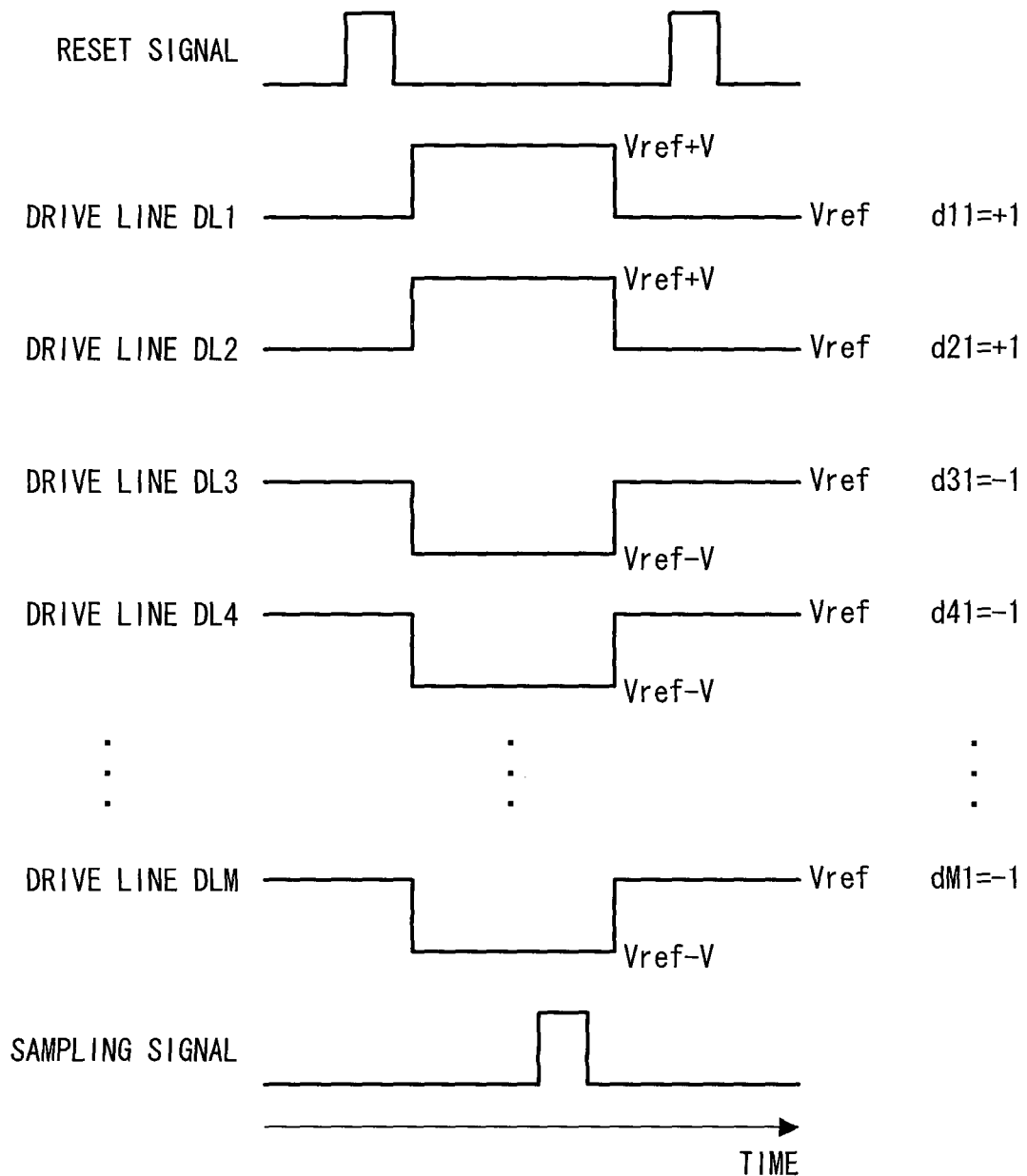
FIG. 4 is a timing chart describing the method for driving the sensor panel.

FIG. 4 is a timing chart illustrating the method for driving the touch sensor panel 2. First, a reset signal resets (i) the integral capacitances Cint of the respective analog integrators 6 and (ii) the capacitances provided in the touch sensor panel 2 in a matrix. The term "reset" as used herein means to discharge a capacitance. Next, the drive lines DL1 through DLM are driven in parallel each at Vref+V or Vref−V in accordance with each value (+1 or −1) of d11, d21, d31, ..., dM1 in a code sequence. This causes each corresponding capacitance to store an electric charge ±CV in accordance with a corresponding element ±1 of the code sequence. Then, a corresponding one of the analog integrators 6 (i) adds, via its connection to a corresponding sense line, electric charges stored in the capacitances connected to the sense line and thus (ii) reads out a signal for its corresponding sense line. The analog integrator 6 then outputs a result represented by $$G \times \sum_{k=1}^{M} (Cki \times V \times dki)$$

(in this circuit, G=−1/Cint), which is next subjected to an AD conversion in the AD converter 8 in accordance with a sampling signal.

The above operation produces output sequence vectors sji expressed as $$sji = G \times \sum_{k=1}^{M} (Ckj \times V \times dki)$$

and therefore, $$sj = \sum_{k=1}^{M} (Ckj \times V \times dk).$$

To find an inner product di·sj of a code sequence di and an output sequence vector sj, $$\begin{aligned} di \cdot sj &= di \cdot G \times \sum_{k=1}^{M} (Ckj \times V \times dk) \\ &= G \times \sum_{k=1}^{M} (Ckj \times V \times di \cdot dk) \\ &= G \times \sum_{k=1}^{M} (Ckj \times V \times N \times \delta ik) \\ &= G \times Cij \times V \times N \end{aligned}$$ (Formula 2)

where
δik=1 if i=k
δik=0 if i≠k

Comparison between Formula 1 and Formula 2 shows that the method of the present embodiment makes it possible to detect a signal which is N times as large as a signal detected by the conventional scanning readout method.

The gain G is 1/Cint in a case where signals are read out via the sense lines with use of the analog integrators 6 illustrated in FIGS. 1 and 2, that is, electric charge integrators each including an operational amplifier provided with an integral capacitance Cint.

The drive section 4 of the integrated circuit 3 thus drives the M drive lines in parallel so that for each of a first capacitance column Cip (where p is not smaller than 1 and not larger than (L−1), and i=1, . . . , M) and a second capacitance column Ciq (where p<q, q is not smaller than 2 and not greater than L, and i=1, . . . , M), voltages +V and −V are applied to capacitances so as to correspond to +1 and −1 of a code sequence, respectively, in accordance with the code sequences di (=di1, di2, . . . , diN, where i=1, . . . , M) which are orthogonal to one another and include elements of +1 and −1 and each of which has a length N. The drive section 4 then causes (i) the first capacitance column to output sFirst (=sp1, sp2, . . . , spN) and (ii) the second capacitance column to outputs sSecond (=sq1, sq2, . . . , sqN).

The outputs sFirst (=sp1, sp2, . . . , spN) from the first capacitance column are each integrated by a corresponding analog integrator 6, whereas the outputs sSecond (=sq1, sq2, . . . , sqN) from the second capacitance column are also each integrated by a corresponding analog integrator 6. The switch 7 sequentially selects one of the analog integrators 6, respectively corresponding to the sense lines SL1 through SLL, so as to supply to the AD converter 8 outputs from each capacitance column which have each been integrated by a corresponding analog integrator 6.

Specifically, the output sp1 is first read out from the first capacitance column to a first analog integrator 6 and integrated by the first analog integrator 6, while simultaneously, the output sq1 is read out from the second capacitance column to a second analog integrator 6 and integrated by the second analog integrator 6. Then, the switch 7 connects to the first analog integrator 6 so as to supply to the ADC 8 the output sp1 read out and integrated as above. The switch 7 then disconnects from the first analog integrator 6 and connects to the second analog integrator 6 so as to supply to the ADC 8 the output sq1 read out and integrated as above. Next, the output sp2 is read out from the first capacitance column to the first analog integrator 6 and integrated by the first analog integrator 6, while simultaneously, the output sq2 is read out from the second capacitance column to the second analog integrator 6 and integrated by the second analog integrator 6. Then, the switch 7 connects to the first analog integrator 6 so as to supply to the ADC 8 the output sp2 read out and integrated as above. The switch 7 then disconnects from the first analog integrator 6 and connects to the second analog integrator 6 so as to supply to the ADC 8 the output sq2 read out and integrated as above. This operation allows the outputs sp1 through spN and the outputs sq1 through sqN to be sequentially supplied to the ADC 8 via the first and second analog integrators 6 and the switch 7. The analog integrators 6 for all the sense lines operate in parallel in accordance with the driving of the drive lines.

The AD converter 8 carries out an AD conversion with respect to the outputs from each capacitance column, the outputs each having been integrated by a corresponding one of the analog integrators 6, and supplies the resulting outputs to the inner product computing section 9.

The inner product computing section 9 estimates, with reference to data stored in the RAM 10, (i) a capacitance value in the first capacitance column, the capacitance value corresponding to a k1-th drive line (where 1≤k1<M), by computing an inner product of a corresponding output sFirst and a corresponding code sequence di and (ii) a capacitance value in the second capacitance column, the capacitance value corresponding to a k2-th drive line (where k1<k2, and 1<k1≤M), by computing an inner product of a corresponding output sSecond and a corresponding code sequence di.

The application processing section 11 carries out a gesture recognition process on the basis of capacitance values of the capacitances which capacitance values have been estimated by the inner product computing section 9, and thus generates a gesture command.

(Specific Examples of Code Sequences)

FIG. 5 is a diagram illustrating a first specific example of orthogonal code sequences as an input to the touch sensor panel 2. The orthogonal code sequences di each with a length N can be created specifically as described below, for example.

An Hadamard matrix, which is a typical example of orthogonal code sequences, is created by Sylvester method illustrated in FIG. 5. The method first creates a building block of 2 rows×2 columns as a basic structure. The building block includes four bits, among which an upper right one, an upper left one, and a lower left one are identical to one another, whereas a lower right one is an inverse of the above bits.

The method then combines four blocks of the above 2×2 basic structure at upper right, upper left, lower right, and lower left locations so as to create codes in a bit arrangement of 4 rows×4 columns. The method also inverts bits in the lower right block as in the above creation of a 2×2 building block. Next, the method similarly creates codes in a bit arrangement of 8 rows×8 columns, and then creates codes in a bit arrangement of 16 rows×16 columns. These matrices each satisfy the above-mentioned definition of being "orthogonal" in the present invention.

In a case where, for example, the touch sensor panel 2 of the present embodiment includes 16 drive lines, the present embodiment can use, as the orthogonal code sequences, codes in a bit arrangement of 16 rows×16 columns illustrated in FIG. 5. An Hadamard matrix is a square matrix which includes elements each being 1 or −1 and which includes rows orthogonal to one another. In other words, any two rows in an Hadamard matrix represent vectors perpendicular to each other.

The orthogonal code sequences of the present embodiment can be any M-row matrix taken from an N-dimensional Hadamard matrix (where M≤N). As described below, an Hadamard matrix created by a method other than Sylvester method can alternatively be used in the present invention.

FIG. 6 is a diagram illustrating a second specific example of the orthogonal code sequences. FIG. 7 is a diagram illustrating a third specific example of the orthogonal code sequences. While any N-dimensional Hadamard matrix created by Sylvester method can be expressed by a power of N=2, it is assumed that an Hadamard matrix can be created if N is a multiple of 4. For example, FIG. 6 illustrates an Hadamard matrix in which N=12, whereas FIG. 7 illustrates an Hadamard matrix in which N=20. These Hadamard matrices created by a method other than Sylvester method can alternatively be used as the orthogonal code sequences of the present embodiment.

(How Inner Product is Computed)

An inner product matrix C'ij=di·sj is computed through steps described below.

(1) The integrated circuit 3 resets an inner product matrix stored in the RAM 10 (see FIG. 2) of the estimation section 5 to C'ij=0.

(2) The drive section 4 drives an i-th drive line DLi (where i=1, ..., M) at a voltage V×dik in parallel at a time tk (where k is one of 1, ..., N) so as to supply each connected capacitance with an electric charge Cij×V×dik.

(3) The integrated circuit 3 connects the analog integrators 6 to their corresponding sense lines j (where j=1, ..., L) so that the analog integrators 6 each read out an output voltage sjk from a corresponding one of the capacitances which have been charged at the time tk. The switch 7 then sequentially supplies the L output voltages sjk for the time tk to the AD converter 8 for AD conversion. The L output voltages sjk have been read out by the L respective analog integrators 6 provided so as to correspond to the L sense lines. The AD converter 8 carries out an AD conversion with respect to the output voltages sjk for the time tk, and then supplies them to the inner product computing section 9. The output voltages sjk for the time tk thus supplied to the inner product computing section 9 are expressed as follows:

$$sjk = \sum_{i=1}^{M} (Cij \times V \times dik / C\text{int}).$$

(4) The inner product computing section 9 carries out addition or subtraction with respect to C'ij in accordance with (i) the L respective output voltages sjk outputted from the AD converter 8 and (ii) code sequences dik stored in the RAM 10. Specifically, the inner product computing section 9 carries out addition if a code sequence dik in question is 1, whereas it carries out subtraction if a code sequence dik in question is −1. The inner product computing section 9 then updates values of C'ij on the basis of results of the addition or subtraction:

$$C'ij \leftarrow C'ij + dik \times sjk$$

(5) The above procedure is repeated N times so as to correspond to the length of each code sequence while a value of the time is increased in increments (that is, tk+1). The process then returns to the step (1).

Completing the above steps causes C'ij to have values equal to results of the inner product computation.

The touch sensor panel 2 of the present embodiment, as described above, includes M drive lines and L sense lines, and has a length N for each code sequence. In a case where, for example, the touch sensor panel 2 is used in a 4-inch class mobile data terminal or the like, the touch sensor panel 2 will have a pitch of approximately 3 mm if M=16 and L=32. In a case where, for example, the touch sensor panel 2 is used in an electronic device including a 20-inch class screen, the touch sensor panel 2 will have a pitch of approximately 6 mm if M=48 and L=80. The length N of the code sequences has a very large degree of freedom, for example, N=64 to 512.

(Difference in Concept of Driving Between Present Invention and Conventional Art)

The capacitance detecting circuit disclosed in Patent Literature 2 mentioned above also (i) drives drive lines on the basis of a code sequence, (ii) outputs measured voltages each obtained by converting into an electric signal a sum total of currents across capacitances, connected to sense lines, at a plurality of respective intersections of each sense line with the driven drive lines, and (iii) carries out, for each sense line, a product-sum operation on the basis of the measured voltages and the code sequence. The capacitance detecting circuit thus finds a voltage value corresponding to each of the capacitances at the respective intersections. This capacitance detecting circuit, however, differs as below from the present embodiment in concept of driving the drive lines.

To simplify an explanation, the following description deals with an example case in which four capacitances (C1, C2, C3, and C4) are formed between a single sense line and four drive lines. Assuming that driving signals (code sequences) for the four drive lines are 1, 1, −1, and −1 (1, 1, 0, and 0 in Patent Literature 2), the present embodiment drives all the drive lines for each driving operation and thus produces an integral output corresponding to $$C1+C2-C3-C4 \quad \text{(Formula 3)},$$

whereas the capacitance detecting circuit disclosed in Patent Literature 2 drives only drive lines corresponding to "1" and thus produces an integral output corresponding to $$C1+C2 \quad \text{(Formula 4)}.$$

Comparison between Formula 3 of the present embodiment and Formula 4 of Patent Literature 2 shows that the integral output produced in the present embodiment has a larger amount of information than that of Patent Literature 2.

Assuming that $$Ci = C + \Delta Ci$$

where $\Delta Ci$ represents a change in capacitance ($\Delta Ci$ is normally approximately 10% of C), $$\text{(Formula 3)} = C1 + C2 - C3 - C4 \quad \text{(Formula 5)}$$
$$= \Delta C1 + \Delta C2 - \Delta C3 - \Delta C4$$
$$\approx 0.2 \times C,$$

and $$\text{(Formula 4)} = 2 \times C + \Delta C1 + \Delta C2 \quad \text{(Formula 6)}$$
$$\approx 2 \times C,$$

where the symbol "≈" means "nearly equal."

Since $\Delta Ci$ is approximately 10% of C in a touch sensor panel or the like, Formula 6 yields a value which is approximately 10 times as large as a value of Formula 5. This indicates that an integrating circuit that satisfies Formula 6 of Patent Literature 2 is unfortunately (i) required to set a gain which is approximately 1/10 of that of an integrating circuit of the present embodiment which integrating circuit satisfies Formula 5, and is thus (ii) lower in S/N ratio than the integrating circuit of the present embodiment. This difference in S/N ratio further increases with an increase in the number M of the drive lines.

The present embodiment, which drives all the drive lines in parallel for each driving operation, differs from the capacitance detecting circuit disclosed in Patent Literature 2, which switches between driving a first drive line group (C1 and C2) and driving a second drive line group (C3 and C4) on the basis of a code sequence so as to cancel an offset error in a measured voltage. In the present embodiment, an offset due to feedthrough in a reset switch can be measured on the basis of an output obtained from the AD converter 8 in a state where no signal is being inputted to a drive line (that is, the drive line is driven at a voltage Vref). Subtracting a measured offset value in a digital circuit cancels an offset error.

(Difference in Positive and Negative Operation Between Present Invention and Conventional Art)

The present embodiment calculates a value of Formula 3 at once by driving the M drive lines in parallel in accordance with values in a code sequence, that is, by driving the M drive lines so that voltages +V and −V are applied to the capacitances so as to correspond to +1 and −1, respectively. The capacitance detecting circuit disclosed in Patent Literature 2, in contrast, first calculates C1+C2 of Formula 4 and then calculates C3+C4 thereof. The capacitance detecting circuit of Patent Literature 2 thus carries out a two-stage operation and is less effective in simultaneously achieving a high speed operation and power consumption reduction.

The present embodiment further differs from the capacitance detecting circuit of Patent Literature 2 in that the present embodiment drives the drive lines so that a voltage −V is applied so as to correspond to a value of −1 in a code sequence, whereas the capacitance detecting circuit of Patent Literature 2 merely drives the drive lines at a voltage +V and thus lacks a concept of driving the drive lines at a voltage −V.

(Another Configuration of Estimation Section 5) The present embodiment describes an example arrangement including (i) analog integrators 6 which are provided so as to correspond to L respective sense lines, (ii) a switch 7 which sequentially selects one of the analog integrators 6, (iii) a single AD converter 8, and (iv) a single inner product computing section 9. The present invention is, however, not limited to this arrangement. The present invention can alternatively include a single analog integrator 6 so that the single analog integrator 6 sequentially selects an input to read out a signal for each sense line.

The present invention can further alternatively include (i) AD converters 8 provided so as to correspond to the respective sense lines and the respective analog integrators 6 and (ii) a switch 7 provided between the AD converters 8 and the inner product computing section 9.

(Variation of Present Embodiment)

The present embodiment describes an example case of detecting capacitance values of respective capacitances formed between drive lines and sense lines. The present invention is, however, not limited to this. The present invention is also applicable in, for example, an arrangement for estimating values of respective linear devices formed between drive lines and sense lines. The present invention is further applicable in an arrangement for estimating a coefficient Ck corresponding to a k-th input xk (k=1, . . . , M) of a system which includes M inputs xk and has a linear input/output.

Furthermore, (i) the touch sensor system 1 of the present embodiment and (ii) a display panel placed over the touch sensor panel 2 of the touch sensor system 1 can be combined with each other so as to constitute an electronic device. Alternatively, (i) the touch sensor system 1 and (ii) a display panel including the touch sensor panel 2 and having a function of the touch sensor panel 2 included in the touch sensor system 1 can be combined with each other so as to constitute an electronic device.

Embodiment 2

Method for Driving Touch Sensor Panel at Two Voltages

Figure 8:
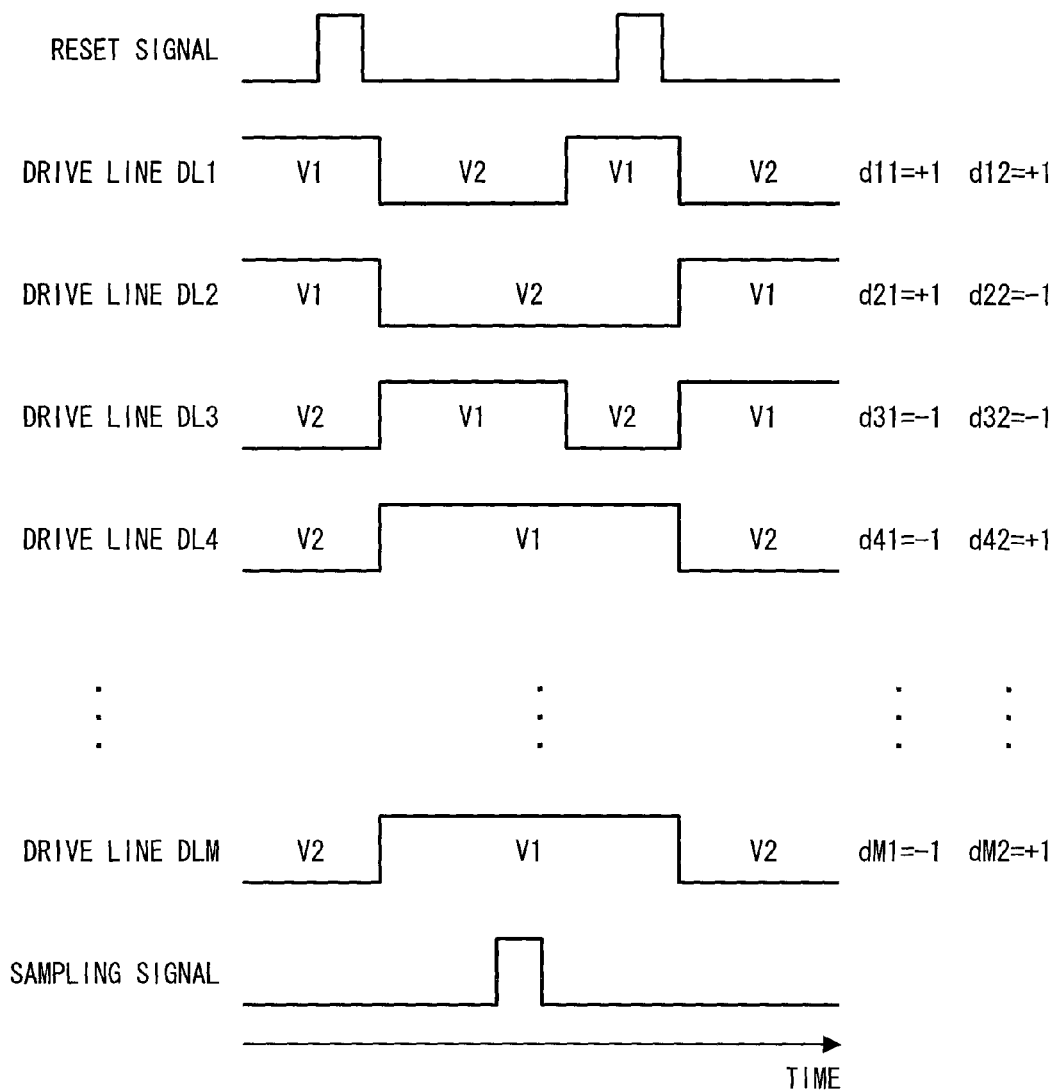
FIG. 8 is a timing chart illustrating a method for driving a sensor panel included in a touch sensor system of Embodiment 2.

FIG. 8 is a first timing chart illustrating a method for driving a touch sensor panel 2 included in a touch sensor system 1 of Embodiment 2.

The method described in Embodiment 1 above with reference to FIG. 4 for driving the touch sensor panel 2 drives the touch sensor panel 2 at three voltages, namely Vref, Vref+V, and Vref−V. The driving method of Embodiment 2, in contrast, drives the touch sensor panel 2 at two voltages V1 and V2.

Specifically, for a value of +1 in a code sequence, the method drives a corresponding drive line at (i) a voltage V1 when a corresponding one of the analog integrators 6 (see FIG. 1) is reset and at (ii) a voltage V2 when an output is sampled from a capacitance connected to a corresponding sense line. Further, for a value of −1 in a code sequence, the method drives a corresponding drive line at (i) the voltage V2 when a corresponding one of the analog integrators 6 is reset and at (ii) the voltage V1 when an output is sampled from a capacitance connected to a corresponding sense line.

More specifically, in an example illustrated in FIG. 8, the drive line DL1, which corresponds to a code sequence having elements d11=+1 and d12=+1, is driven at (i) the voltage V1 when the analog integrators 6 are reset, (ii) the voltage V2 when outputs are sampled, (iii) the voltage V1 when the analog integrators 6 are reset next, and (iv) the voltage V2 when outputs are sampled next. The drive line DL2, which corresponds to a code sequence having elements d21=+1 and d22=−1, is driven at (i) the voltage V1 when the analog integrators 6 are reset, (ii) the voltage V2 when outputs are sampled, (iii) the voltage V2 when the analog integrators 6 are reset next, and (iv) the voltage V1 when outputs are sampled next.

The drive line DL3, which corresponds to a code sequence having elements d31=−1 and d32=−1, is driven at (i) the voltage V2 when the analog integrators 6 are reset, (ii) the voltage V1 when outputs are sampled, (iii) the voltage V2 when the analog integrators 6 are reset, and (iv) the voltage V1 when outputs are sampled next. The drive line DL4, which corresponds to a code sequence having elements d41=−1 and d42=+1, is driven at (i) the voltage V2 when the analog integrators 6 are reset, (ii) the voltage V1 when outputs are sampled, (iii) the voltage V1 when the analog integrators 6 are reset next, and (iv) the voltage V2 when outputs are sampled next. The drive line DLM, which corresponds to a code sequence having elements dM1=−1 and dM2=+1, is driven at (i) the voltage V2 when the analog integrators 6 are reset, (ii) the voltage V1 when outputs are sampled, (iii) the voltage V1 when the analog integrators 6 are reset next, and (iv) the voltage V2 when outputs are sampled next.

Assuming that V1=Vdd and V2=Vss, an output is expressed as $$(Cf/Cint) \times (V1-V2) = (Cf/Cint) \times (Vdd-Vss).$$

In the method described in Embodiment 1 above with reference to FIG. 4 for driving the touch sensor panel 2, if Vref=(Vdd−Vss)/2, $$V=(Vdd-Vss)/2$$

since Vdd=Vref+V and Vss=Vref−V. This V is half an output in the example illustrated in FIG. 8. The driving method of Embodiment 2 illustrated in FIG. 8 thus (i) achieves a signal intensity which is twice as large as a signal intensity achieved by the driving method of Embodiment 1 illustrated in FIG. 4, and consequently (ii) allows the capacitances to each store an electric charge which is twice as large accordingly.

(Reading Out Offset)

Figure 9:
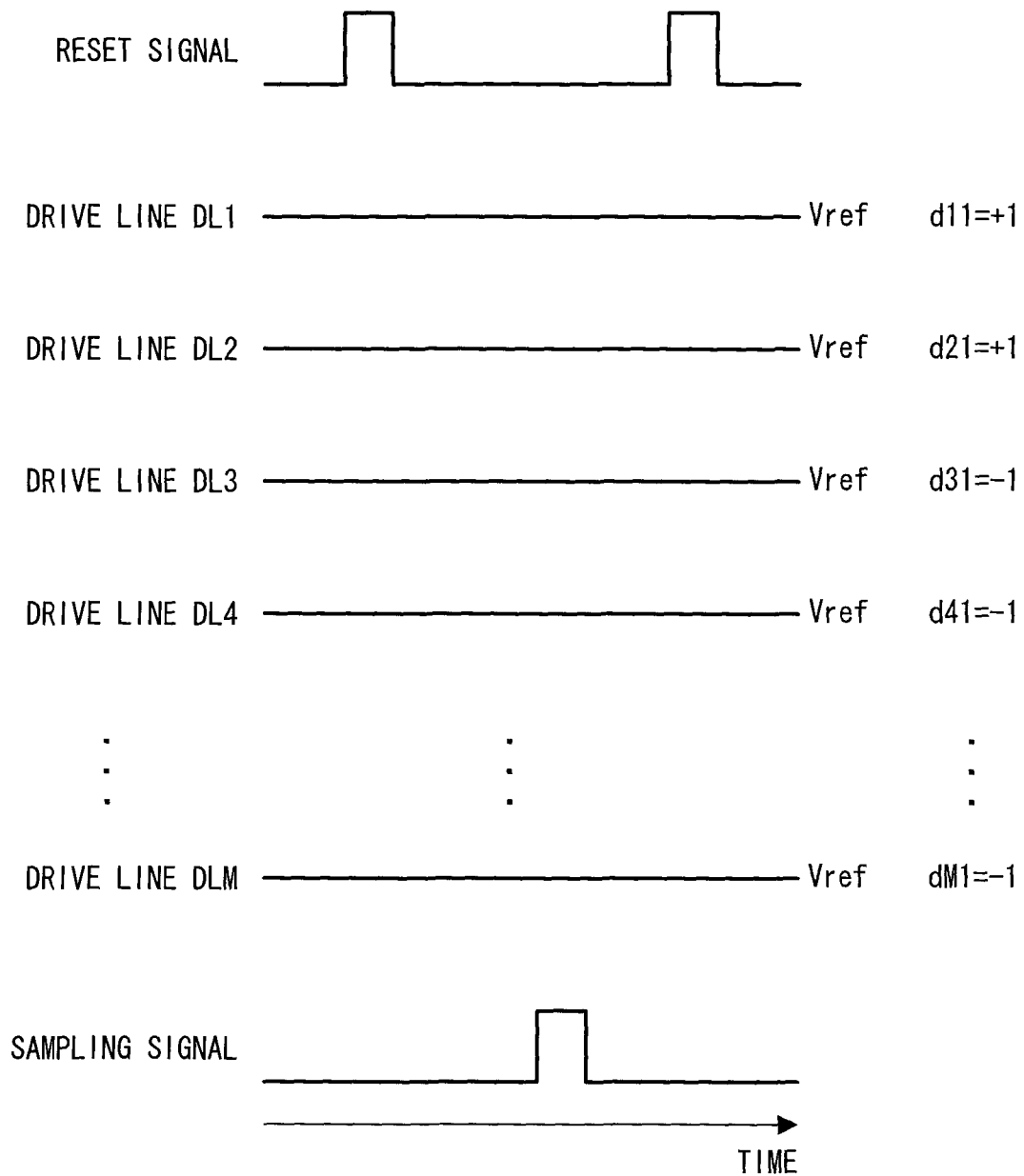
FIG. 9 is another timing chart illustrating the method for driving the sensor panel included in the touch sensor system of Embodiment 2.

FIG. 9 is a second timing chart illustrating a method for driving the touch sensor panel 2 included in the touch sensor system 1 of Embodiment 2.

The method drives the drive lines DL1 through DLM as illustrated in FIG. 9 before it drives the drive lines DL1 through DLM in parallel illustrated in FIG. 4 or 8. Specifically, the method drives the drive lines DL1 through DLM at a constant voltage Vref both when the analog integrators 6 are reset and when outputs are sampled, and thus supplies no signals to the drive lines. The method in this state reads out offset output values from the respective analog integrators 6 (see FIGS. 1 and 2). The ADC 8 then carries out an AD conversion with respect to the offset output values read out from the analog integrators 6 as above. The inner product computing section 9 next measures the offset output values which have been subjected to an AD conversion in the ADC 8. The offset output values thus measured are each stored in the RAM 10 in association with a corresponding one of the sense lines SL1 through SLL.

(Offset Compensation Method)

The method next drives the drive lines DL1 through DLM in parallel as illustrated in FIG. 4 or 8, and causes each capacitance column to supply outputs to a corresponding analog integrator 6. The ADC 8 then carries out an AD conversion with respect to the outputs from the capacitance columns which outputs have been received by the analog integrators 6, and thus supplies the resulting outputs to the inner product computing section 9. The inner product computing section 9 next subtracts, for the respective sense lines SL1 through SLL, the offset output values stored in the RAM 10 from the outputs from the capacitance columns which outputs have been supplied from the ADC 8. This cancels an offset due to feedthrough in a reset switch in each analog integrator 6.

The method can alternatively (i) repeat, a plurality of times, a procedure of: driving the drive lines DL1 through DLM at a constant voltage Vref both when the analog integrators 6 are reset and when outputs are sampled; reading out offset output values from the respective analog integrators 6; causing the ADC 8 to carry out an AD conversion with respect to the offset output values read out as above; and causing the inner product computing section 9 to measure the resulting offset output values, so as to measure a plurality of sets of offset output values, and (ii) finding averages of the offset output values so as to store in the RAM 10 the average offset output values from which noise components included in the offset have been removed. The above plurality of times can, for example, be set to 16 times for 60 Hz or 100 times for 240 Hz.

Embodiment 3

Switching Gains of Analog Integrators

Figure 10:
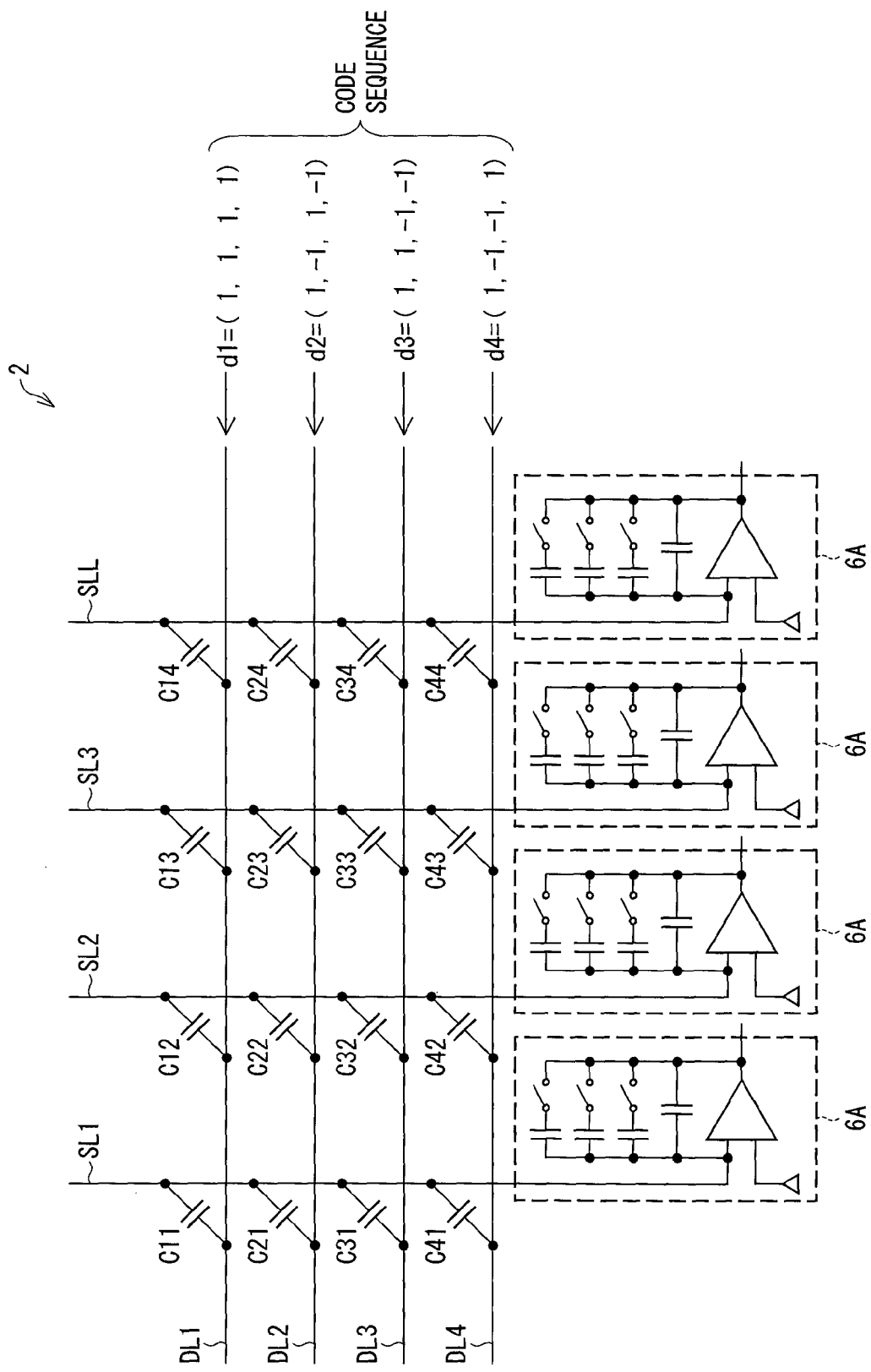
FIG. 10 is a diagram illustrating a method for driving a sensor panel of Embodiment 3.

FIG. 10 is a diagram illustrating a method for driving a touch sensor panel 2 of Embodiment 3. Constituents of the present embodiment which are identical to their respective equivalents in Embodiment 1 are each assigned the same reference sign accordingly. Such constituents of the present embodiment are not described in detail here.

The present embodiment deals with an example which involves (i) a touch sensor panel 2 including four drive lines DL1 through DL4 and four sense lines SL1 through SL4 and (ii) a code sequence based on a four-dimensional Hadamard matrix created by Sylvester method.

The present embodiment includes analog integrators 6A. The analog integrators 6A each include: an operational amplifier with a first input connected to a reference voltage Vref; an integral capacitance Cint provided between an output of the operational amplifier and a second input thereof; three other integral capacitances connected to the integral capacitance in parallel; and three switches each provided between one of the three other integral capacitances and the output of the operational amplifier.

A code sequence based on a four-dimensional Hadamard matrix created by Sylvester method includes elements such that a sum total of elements along a column direction is "4" for the first column and "0" for each of the second to fourth columns. Thus, a value obtained by adding outputs from a capacitance column is significantly greater when the drive lines are driven on the basis of the elements in the first column of the code sequence than when the drive lines are driven on the basis of the elements in one of the second to fourth columns of the code sequence. The value may exceed a capacity of a corresponding analog integrator 6A and thus saturate the analog integrator 6A.

In view of this, when the drive lines are driven on the basis of a column having a sum total of elements present in the code sequence along the column direction which sum total is so large as to saturate a corresponding analog integrator 6A, the switches included in the corresponding analog integrator 6A are appropriately turned on so as to prevent saturation of the analog integrator 6A.

An Hadamard matrix created by Sylvester method invariably includes a first column having elements each being +1. An Hadamard matrix thus has a sum total of elements in the first column which sum total is significantly greater than that in any other column, and may thus saturate a corresponding analog integrator 6A. It is, however, possible to prevent such saturation of an analog integrator 6A by turning on the switches in the analog integrator 6A as above so as to switch a gain of the analog integrator 6A.

As described above, Embodiment 3 switches a gain of each analog integrator 6A in accordance with an absolute value of a sum total of corresponding elements present in the code sequence along the column direction. As such, it is possible to prevent saturation of the analog integrators 6A.

(Compensation of Gain Switching for Analog Integrator by Gain Switching of Inner Product Computing Section)

The inner product computing section 9 estimates capacitance values in a capacitance column, the capacitance values corresponding to the respective drive lines, by computing an inner product of (i) a code sequence and (ii) digital values each obtained by an AD conversion, by the ADC 8, of outputs from the capacitance column which outputs have been supplied to a corresponding one of the analog integrators 6A that can switch their respective gains. The inner product computing section 9 switches weighting for each of the digital values in accordance with the absolute value of a sum total of corresponding elements present in the code sequence along the column direction. This makes equal, between columns of the code sequence, a product of (i) the gain of an analog integrator 6A and (ii) the gain obtained by weighting the digital value.

Embodiment 4

Division for Driving Drive Lines a Plurality of Times and Computing Inner Products (a) and (b) of FIG. 11 are each a diagram illustrating a code sequence for use in driving a touch sensor panel 2 of Embodiment 4.

(a) of FIG. 11 illustrates a code sequence based on a four-dimensional Hadamard matrix created by Sylvester method. The code sequence is similar to the code sequence of FIG. 10 in that a sum total of elements along the column direction is "4" for the first column and "0" for each of the second to fourth columns. Thus, a value of a sum total of outputs obtained from a capacitance column is significantly greater when the drive lines are driven on the basis of the elements in the first column of the code sequence than when the drive lines are driven on the basis of the elements in one of the second to fourth columns of the code sequence. The value may exceed a capacity of a corresponding analog integrator 6A and thus saturate the analog integrator 6A.

In view of this, the present embodiment divides, as illustrated in (b) of FIG. 11, the first column (1, 1, 1, 1) of the code sequence into two columns: one column represented by (1, 1, 0, 0) and the other column represented by (0, 0, 1, 1). This arrangement (i) increases the number of driving operations for the four drive lines from 4 times to 5 times and (ii) divides the sum total "4" of elements in the column direction into "2" and "2." The above arrangement thus reduces a maximum sum total of elements in the column direction from "4" to "2," and thus prevents saturation of the analog integrators.

Embodiment 4 illustrates an example code sequence based on a four-dimensional Hadamard matrix created by Sylvester method. The present invention is, however, not limited to this. The present invention is alternatively applicable in a code sequence based on a $2^n$-dimensional Hadamard matrix other than a four-dimensional Hadamard matrix. The present invention is also applicable in a code sequence based on an Hadamard matrix of any dimension which Hadamard matrix is created by a method other than Sylvester method.

Embodiment 5

Triangular Mountain Shaped Driving Method

Figure 12:
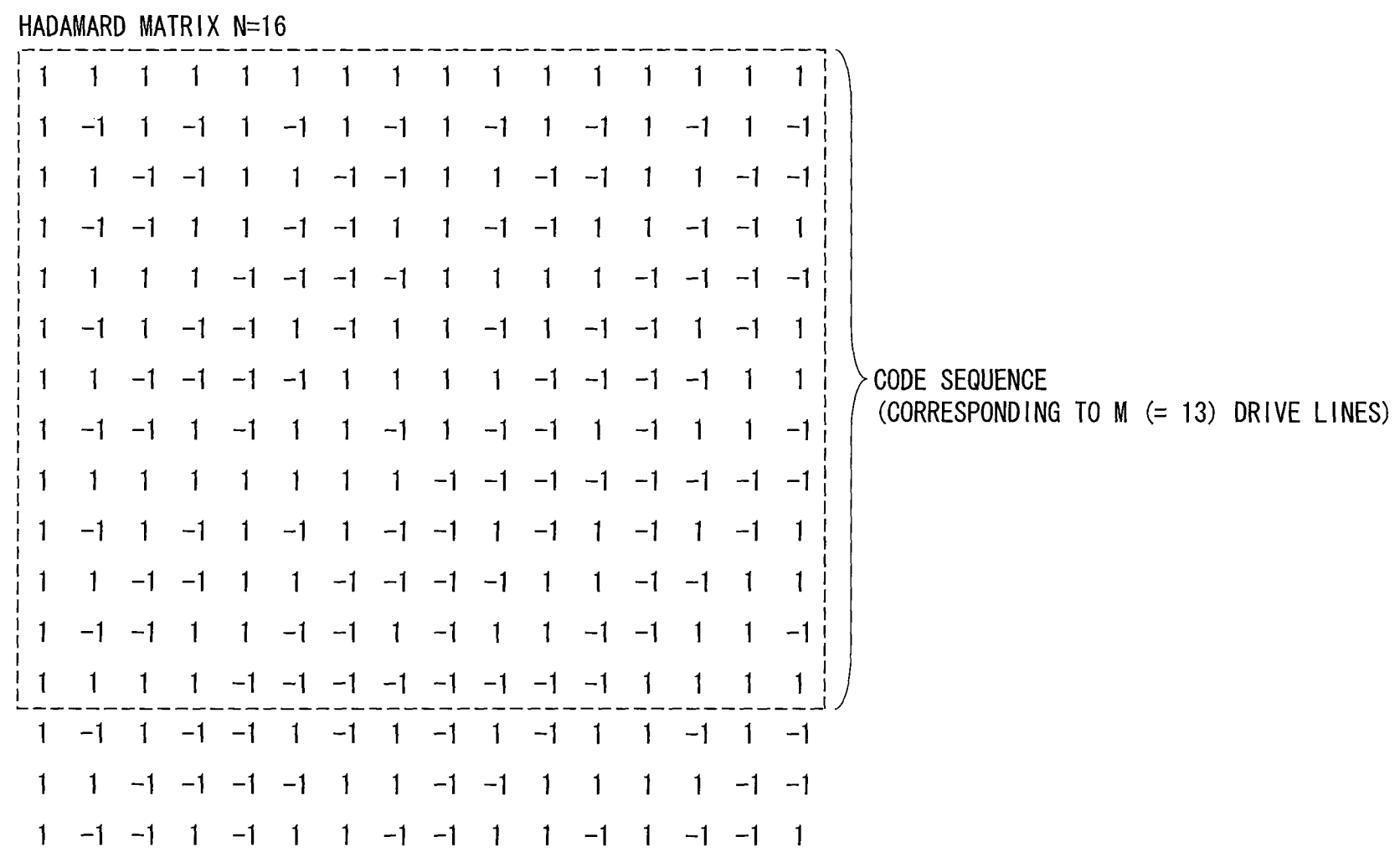

FIG. 12 is a diagram illustrating a code sequence for use in driving a touch sensor panel 2 of Embodiment 5.

In the touch sensor panel 2 of Embodiment 5, M drive lines are driven in parallel for each capacitance column formed between the M drive lines and L sense lines. The M drive lines are driven as such on the basis of code sequences which are orthogonal to one another and include elements each being +1 or −1 and each of which has a code length N>M. The code sequences correspond to respective rows of a $2^n$-dimensional Hadamard matrix (where M<$2^n$) created by Sylvester method. FIG. 12 illustrates an example of a code sequence of 13 rows×16 columns which is based on a 16-dimensional Hadamard matrix and which corresponds to M drive lines (where M=13).

Figure 13:
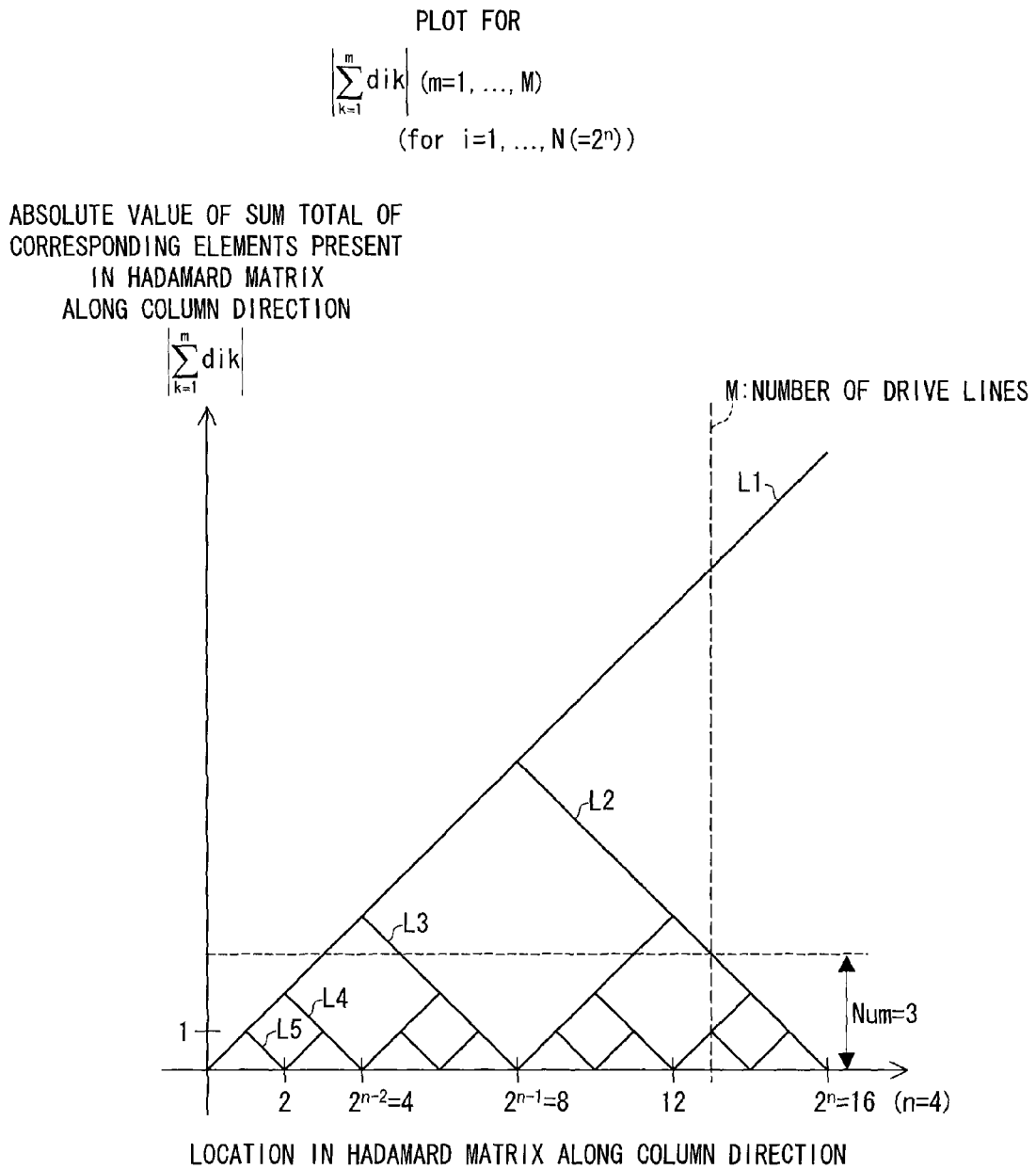
FIG. 13 is a graph illustrating a method for driving the sensor panel.

FIG. 13 is a graph illustrating a method for driving the touch sensor panel 2. The graph has (i) a horizontal axis representing a location, along the column direction, in the Hadamard matrix (where N=16) illustrated in FIG. 12 and (ii) a vertical axis representing an absolute value of a sum total of elements present in the Hadamard matrix (where N=16) along the column direction.

In the Hadamard matrix where N=16, elements in the first column are each "1." Thus, a relation between (i) a location along the column direction (horizontal axis) and (ii) an absolute value of a sum total of elements along the column direction (vertical axis) is represented by a line L1, which shows a linear, monotone increase.

In the Hadamard matrix where N=16, the 9th column (that is, the ($2^{(4-1)}$+1)th column) includes "1" from the 1st row through to the 8th row and "−1" from the 9th row through to the 16th row. Thus, the above relation for the 9th column is represented by a line L2, which shows a linear, monotone increase and then a linear, monotone decrease, thus forming a triangular mountain shape with a base length of 16 and a height of 8.

In the Hadamard matrix where N=16, the 5th column (that is, the ($2^{4-1}-2^{4-2}$+1)-th column) includes (i) "1" from the 1st row through to the 4th row, (ii) "−1" from the 5th row through to the 8th row, (iii) "1" from the 9th row through to the 12th row, and (iv) "−1" from the 13th row through to the 16th row. Thus, the above relation for the 5th column is represented by a line L3, which forms two triangular mountain shapes each with a base length of 8 and a height of 4. Further, the 13th column (that is, the ($2^{4-1}+2^{4-2}$+1)-th column) includes (i) "1" from the 1st row through to the 4th row, (ii) "−1" from the 5th row through to the 8th row, (iii) "−1" from the 9th row through to the 12th row, and (iv) "1" from the 13th row through to the 16th row. Thus, the above relation for the 13th column is also represented by the line L3, which forms two triangular mountain shapes.

The 3rd column, the 7 column, the 11th column, and the 15th column are each represented by a line L4, which forms four triangular mountain shapes each with a base length of 4 and a height of 2. The 2nd column, the 4th column, the 6th column, the 8th column, the 10th column, the 12th column, the 14th column, and the 16th column are each represented by a line L5, which forms eight triangular mountain shapes each with a base length of 2 and a height of 1.

The description below supposes that the above absolute value of a sum total of elements present in the code sequence along the column direction has a threshold Num, above which a corresponding analog integrator 6 (see FIG. 1) is saturated. In the examples illustrated in FIGS. 12 and 13, Num=3, and the number of drive lines is 13 (M=13).

As illustrated in FIG. 13, the absolute value does not exceed the threshold Num=3 in any column corresponding to the line L5 (that is, the 2nd column, the 4th column, the 6th column, the 8th column, the 10th column, the 12th column, the 14th column, and the 16th column) or any column corresponding to the line L4 (that is, the 3rd column, the 7 column, the 11 column, and the 15 column). Simultaneously driving the M (=13) drive lines thus does not saturate analog integrators 6 corresponding to the above columns.

The 1st column corresponding to the line L1 exceeds the threshold Num=3. The 1st column is thus divided in driving on the basis of the threshold Num=3 such that four sets each including three drive lines are driven sequentially from the 1st drive line, and the drive line DL13 is then driven. This prevents saturation of the analog integrators 6.

In general terms, the above driving is carried out such that [M/Num] sets each including NuM drive lines are driven sequentially from the 1st drive line through to the Num×[M/Num]-th drive line, and drive lines corresponding to a remainder of the (M/Num) are then driven in parallel. In the above description, [x] represents the integer part of x, which also applies in the description below.

The 9th column corresponding to the line L2 exceeds the threshold Num=3. For the 9th column corresponding to the line L2, the 2nd drive line through the 13th drive line are first driven in parallel in accordance with their respective corresponding elements in the code sequence, and the 1st drive line is then driven.

In general terms, the above driving is carried out such that a drive line on a row based on the $(2^{n-1}-(M-2^{n-1}))$-th row $(=(2^n-M)$-th row) through a drive line on the M-th row are first driven in parallel. Next, [row based on the $(2^{n-1}-(M-2^{n-1})-1)$-th row/Num] sets each including NuM drive lines are driven sequentially from the 1st drive line through to the drive line on the $(2^{n-1}-(M-2^{n-1}))$-th row $(=(2^n-M)$-th row). Then, drive lines other than the (row based on the $(2^{n-1}-(M-2^{n-1})-1)$-th row/Num) sets are driven in parallel.

In the example of Embodiment 5, where n=4 and M=13, the $(2^{n-1}-(M-2^{n-1}))$-th row=the 3rd row. Even in a case where the 3rd drive line through the 13th drive line are driven in parallel, a sum total of corresponding elements present in the code sequence along the column direction is +1, which is 2 less than the threshold Num=3. Thus, even in a case where the 2nd drive line through the 13th drive line are driven in parallel, a sum total of corresponding elements present in the code sequence along the column direction is +2, which is still less than the threshold Num=3. As such, although the $(2^{n-1}-(M-2^{n-1}))$-th row is the 3rd row, the 2nd row is selected as a row based on the $(2^{n-1}-(M-2^{n-1}))$-th row (=the 3rd row) in view of the threshold Num, and the 2nd drive line through the 13th drive line are thus driven in parallel.

The 5th column and the 13th column corresponding to the line L3 each exceed the threshold Num=3. For the 5th column and the 13th column corresponding to the line L3, the 1st drive line through the 8th drive line are first simultaneously driven in parallel. The 10th drive line through the 13th drive line are then driven. The 9th drive line is driven next.

In general terms, the 1st drive line through the $(2^{n-1})$-th drive line are first simultaneously driven in parallel. Next, a drive line on a row based on the $((2^{n-1}+2^{n-2})-(M-(2^{n-1}+2^{n-2})))$-th row through a drive line on the M-th row are driven in parallel. Then, [((row based on $((2^{n-1}+2^{n-2})-(M-(2^{n-1}+2^{n-2})))))-(2^{n-1}+1)/$Num] sets each including NuM drive lines are driven sequentially from the drive line on the $(2^{n-1}+1)$-th row through to the drive line on the ((row based on the $((2^{n-1}+2^{n-2})-(M-(2^{n-1}+2^{n-2})))$-th row))−1)-th row. Next, drive lines other than the (((row based on $((2^{n-1}+2^{n-2})-(M-(2^{n-1}+2^{n-2})))))-(2^{n-1}+1)/$Num) sets are driven in parallel.

In the example of Embodiment 5, where n=4 and M=13, the $((2^{n-1}+2^{n-2})-(M-(2^{n-1}+2^{n-2})))$-th row=the 11th row. Even in a case where the 11th drive line through the 13th drive line are driven in parallel, a sum total of corresponding elements present in the code sequence along the column direction is +1, which is 2 less than the threshold Num=3. Thus, even in a case where the 10th drive line through the 13th drive line are driven in parallel, a sum total of corresponding elements present in the code sequence along the column direction is +2, which is still less than the threshold Num=3. As such, although the $((2^{n-1}+2^{n-2})-(M-(2^{n-1}+2^{n-2})))$-th row is the 11th row, the 10th row is selected as a row based on the $((2^{n-1}+2^{n-2})-(M-(2^{n-1}+2^{n-2})))$-th row (=the 11th row) in view of the threshold Num, and the 10th drive line through the 13th drive line are thus driven in parallel.

The following description deals with how the touch sensor panel 2 is driven in a case where the number of drive lines is 12 or smaller (M≤12). The description below first deals with a case in which 8<M≤12: For each of the line L1 and the line L2, a driving method is identical to a corresponding one described above for the line L1 or the line L2. For the line L3, the drive line on the 1st row through a drive line on the $(2^{n-1})$-th row are first driven simultaneously in parallel. Next, $[(M-(2^{n-1}))/$Num] sets each including NuM drive lines are driven sequentially from a drive line on the $((2^{n-1})+1)$-th row through to a drive line on the $(2^{n-1})+$Num×$[(M-(2^{n-1}))/$Num]-th row. Then, drive lines other than the $((M-(2^{n-1}))/$Num) sets are driven in parallel.

The description below now deals with a case in which 4<M≤8: For the line L1, a driving method is identical to that described above for the line L1. For the line L2, a driving method is also identical to that described above for the line L1. For the line L3, a driving method is identical to that described above for the line L2 of the case of M (number of drive lines)=13.

The description below deals with a case in which M≤4: For the line L1, a driving method is identical to that described above for the line L1. For each of the line L2 and the line L3 also, a driving method is identical to that described above for the line L1.

The following description deals with how the touch sensor panel 2 is driven in a case where the threshold Num=1 and M (number of drive lines)=13: For each of the line L1, the line L2, and the line L3, a driving method is identical to a corresponding one described above for the case in which the threshold Num=3. For the line L4, a drive line on the 1st row through a drive line on the $(2^{n-1}+2^{n-2})$-th row are first driven simultaneously in parallel. Next, $[(M-(2^{n-1}+2^{n-2}))/$Num] sets each including NuM drive lines are driven sequentially from a drive line on the $((2^{n-1}+2^{n-2})+1)$-th row through to a drive line on the $(2^{n-1}+2^{n-2})+$Num×$[(M-(2^{n-1}+2^{n-2}))$ Num]-th row. Then, drive lines other than the $((M-(2^{n-1}+2^{n-2}))/$Num) sets are driven in parallel.

A driving method similar to the driving method described above can simply be employed even in a case where the order of the $2^n$-dimensional Hadamard matrix (where M<$2^n$) is increased to n>4.

Even in a case where the relation between (i) a location in the code sequence along the column direction and (ii) the absolute value of a sum total of corresponding elements along the column direction is not as illustrated in FIG. 13, it is possible to switch rows of the code sequence to carry out the above driving method if such switching allows a $2^n$-dimensional Hadamard matrix (where $M<2^n$) to be created by Sylvester method so as to satisfy the above relation illustrated in FIG. 13.

Embodiments 1 through 5 above each describe an example of driving drive lines in parallel in accordance with orthogonal code sequences. The present invention is, however, not limited to this. The present invention can alternatively drive drive lines in accordance with code sequences based on an M-sequence.

(a) of FIG. 14 is a diagram for explaining code sequences of the above Embodiments which code sequences are based on an M-sequence. The code sequences $d_1=(d_{11}, d_{12}, \ldots d_{1N})$, $d_2=(d_{21}, d_{22}, \ldots d_{2N}), \ldots dM=(d_{M1}, d_{M2}, \ldots d_{MN})$ based on an M-sequence (i) serve to drive in parallel a first drive line through an M-th drive line and (ii) each include elements each being 1 or −1. The code sequences $d_1, d_2, \ldots dM$ based on an M-sequence, assuming that they are sequences resulting from circularly shifting an M-sequence each having a length N ($=2^n-1$), satisfy a condition defined by Formula 8 in (a) of FIG. 14.

An M-sequence is a type of binary pseudo-random number sequence, and includes only two values, namely 1 and −1 (or 1 and 0). An M-sequence has a cycle having a length represented by $2^n-1$. An M-sequence having a length=$2^3-1=7$ is, for example, "1, −1, −1, 1, 1, 1, −1." An M-sequence having a length=$2^4-1=15$ is, for example, "1, −1, −1, −1, 1, 1, 1, 1, −1, 1, −1, 1, 1, −1, −1."

(b) of FIG. 14 is a diagram illustrating a specific example of code sequences based on an M-sequence. (b) of FIG. 14 illustrates code sequences MCS based on an M-sequence which are code sequences of 13 rows×15 columns. The code sequences MCS include a first row which is an M-sequence having a length=15, that is, "1, −1, −1, −1, 1, 1, 1, 1, −1, 1, −1, 1, 1, −1, −1." The code sequences MCS include a second row which results from circularly shifting the M-sequence on the first row to the left by one element. The code sequences MCS include a third row which results from circularly shifting the M-sequence on the second row to the left by one element. The circular shift continues in the following code sequences. The code sequences MCS thus include a k-th row which results from circularly shifting the M-sequence on the (k−1)-th row to the left by one element (where 2≤k≤13).

Embodiment 6

Electronic Device Including Touch Sensor System

Figure 15:
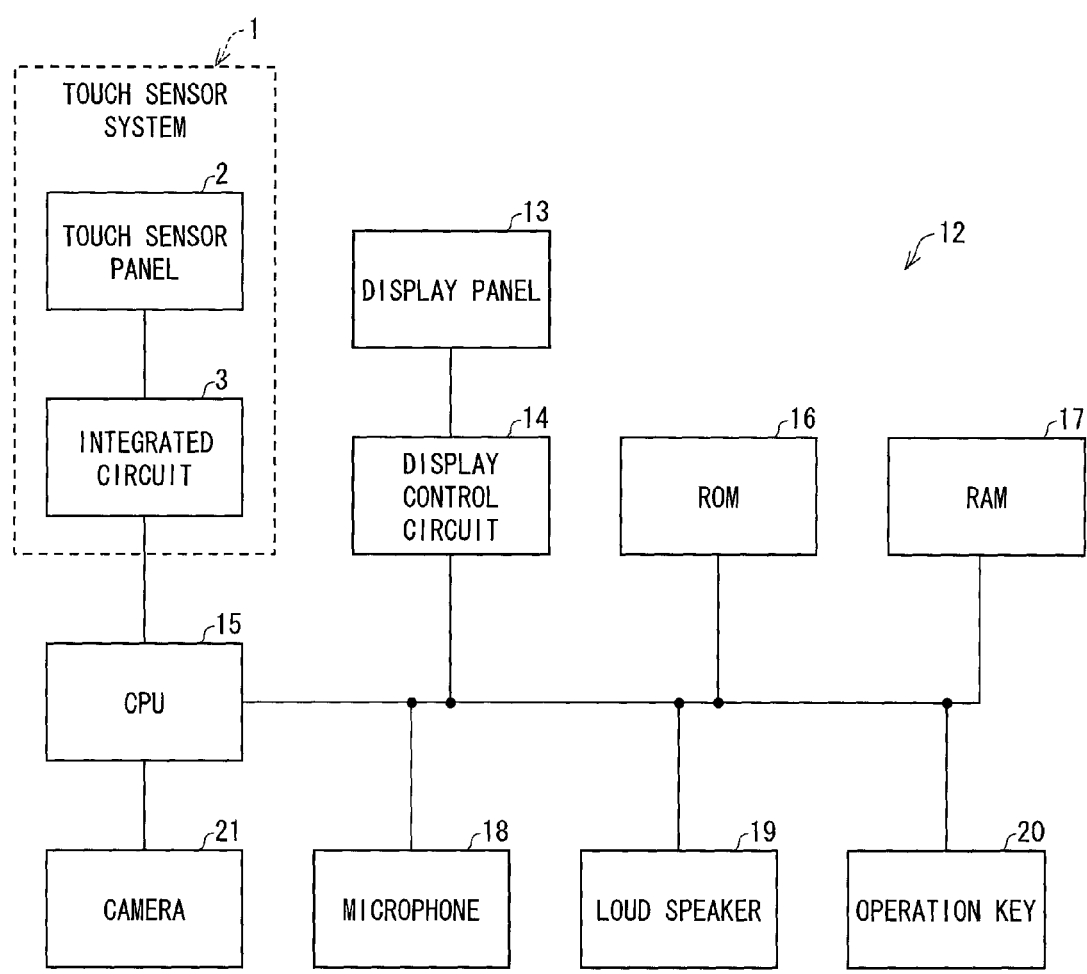
FIG. 15 is a functional block diagram illustrating a configuration of a mobile telephone including the touch sensor system.

FIG. 15 is a functional block diagram illustrating a configuration of a mobile telephone 12 including the touch sensor system 1. The mobile telephone (electronic device) 12 includes: a CPU 15; a RAM 17; a ROM 16; a camera 21; a microphone 18; a loud speaker 19; operation keys 20; a display panel 13; a display control circuit 14; and the touch sensor system 1. The above constituents are interconnected via a data bus.

The CPU 15 controls operation of the mobile telephone 12. The CPU 15, for example, executes a program stored in the ROM 16. The operation keys 20 receive an input of an instruction by a user of the mobile telephone 12. The RAM 17 stores, in a volatile manner, data generated by execution of a program by the CPU 15 or data inputted with use of the operation keys 20. The ROM 16 stores data in a nonvolatile manner.

The ROM 16 is a writable, erasable ROM such as EPROM (Erasable Programmable Read-Only Memory) and a flash memory. The mobile telephone 12 can further include an interface (IF; not shown in FIG. 15) for connecting to another electronic device by wire.

The camera 21 photographs an object in response to an operation of the operation keys 20 by the user. Image data of the object thus photographed is stored in the RAM 17 or an external memory (for example, a memory card). The microphone 18 receives a speech input from the user. The mobile telephone 12 digitizes the speech input (analog data), and can transmit the digitized speech input to a communication target (for example, another mobile telephone). The loud speaker 19 outputs, for example, sound based on data such as music data stored in the RAM 17.

The touch sensor system 1 includes a touch sensor panel 2 and an integrated circuit 3. The CPU 15 controls operation of the touch sensor system 1. The CPU 15, for example, executes a program stored in the ROM 16. The RAM 17 stores, in a volatile manner, data generated by execution of a program by the CPU 15. The ROM 16 stores data in a nonvolatile manner.

The display panel 13 displays, as controlled by the display control circuit 14, an image stored in the ROM 16 or the RAM 17. The display panel 13 either is placed on the touch sensor panel 2 or contains the touch sensor panel 2.

Embodiment 7

The description below deals first with an overall arrangement of a touch sensor system 101 including the capacitive touch sensor panel 102, and then with an arrangement of the touch sensor panel 102 itself.

Figure 16:
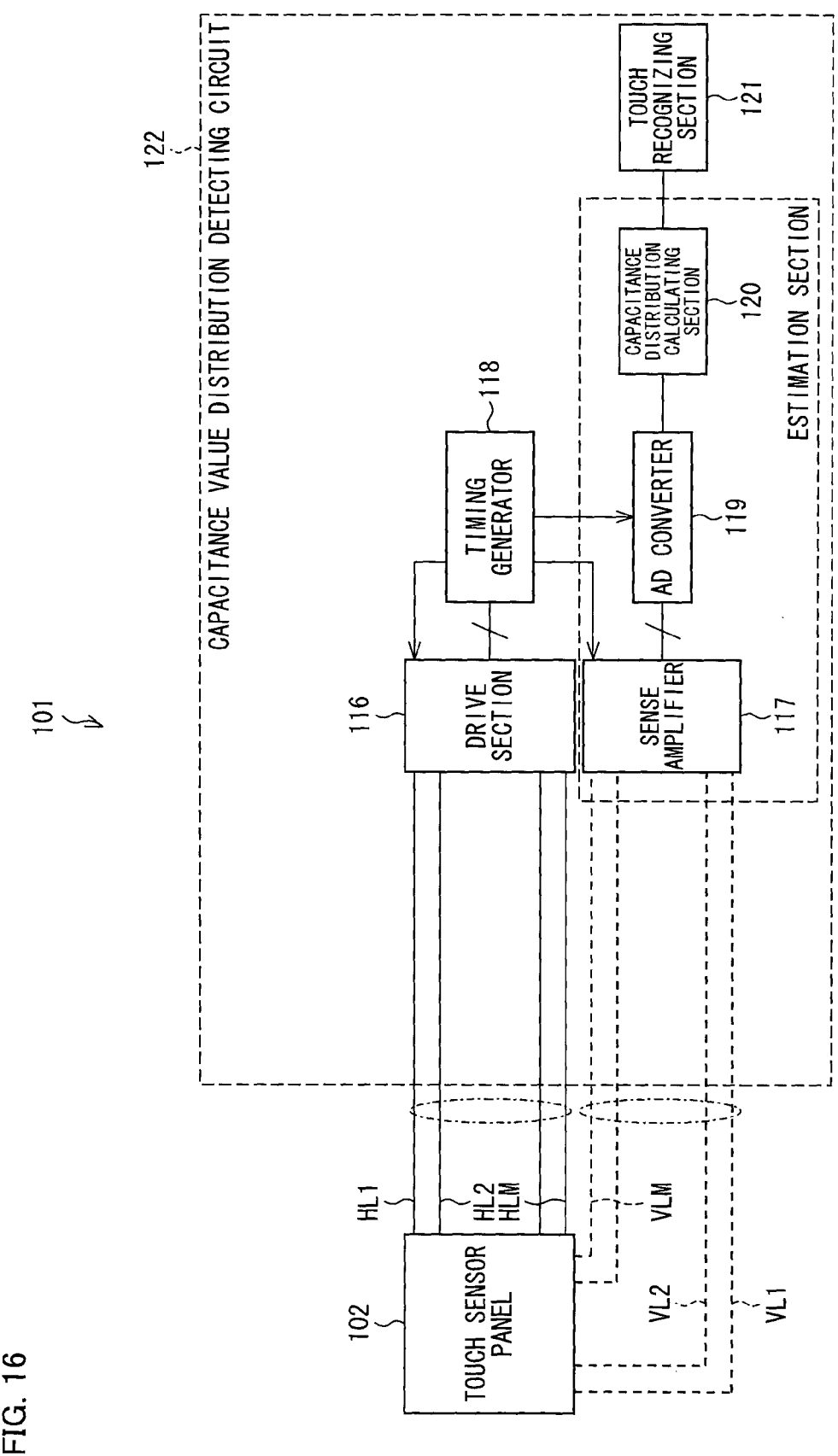
FIG. 16 is a block diagram illustrating a configuration of a touch sensor system of Embodiment 7.

FIG. 16 is a block diagram illustrating a configuration of the touch sensor system 101 of Embodiment 7. The touch sensor system 101 includes a touch sensor panel 102 and a capacitance value distribution detecting circuit 122. The touch sensor panel 102 includes: a plurality of horizontal electrodes 107 (see FIGS. 17 and 19) extending parallel to one another in the horizontal direction; a plurality of vertical electrodes 106 (see FIGS. 17 and 18) extending parallel to one another in the vertical direction; and capacitances formed at respective intersections of the horizontal electrodes 107 with the vertical electrodes 106.

The horizontal electrodes 107 are connected to respective address lines HL1 to HLM, whereas the vertical electrodes 106 are connected to respective address lines VL1 to VLM.

The capacitance value distribution detecting circuit 122 includes a drive section 116. The drive section 116 applies voltages to the respective horizontal electrodes 107 through the respective address lines HL1 to HLM on the basis of a code sequence to drive the individual capacitances. The capacitance value distribution detecting circuit 122 further includes a sense amplifier 117. The sense amplifier 117 reads out, through the respective vertical electrodes 106 and the respective address lines VL1 to VLM, linear sums of electric charge corresponding to the individual capacitances driven by the drive section 116, and supplies the linear sums to an AD converter 119. The AD converter 119 carries out an AD conversion of the linear sums, having been read out through the respective address lines VL1 to VLM, of electric charge corresponding to the individual capacitances, and supplies a resulting signal to a capacitance distribution calculating section 120.

The present embodiment of the present invention describes an example of (i) applying voltages to the respective horizontal electrodes to drive them and (ii) reading out voltage signals from the respective vertical electrodes. The present invention is, however, not limited to such an arrangement. The present embodiment may alternatively be arranged to (i) apply voltages to the respective vertical electrodes to drive them and (ii) read out voltage signals from the respective horizontal electrodes.

The capacitance distribution calculating section 120, as in Embodiments 1 to 5, calculates a capacitance distribution over the touch sensor panel 102 on the basis of (i) the linear sums, having been supplied from the AD converter 119, of electric charge corresponding to the individual capacitances and (ii) the code sequence, and thus supplies a result of the calculation to a touch recognizing section 121. The touch recognizing section 121, on the basis of the capacitance distribution supplied from the capacitance distribution calculating section 120, recognizes the position on a surface of the touch sensor panel 102 at which position the touch sensor panel 102 has been touched.

The capacitance value distribution detecting circuit 122 further includes a timing generator 118. The timing generator 118 generates (i) a signal that regulates the operation of the drive section 116, (ii) a signal that regulates the operation of the sense amplifier 117, and (iii) a signal that regulates the operation of the AD converter 119. The timing generator 118 thus supplies such respective signals to the drive section 116, the sense amplifier 117, and the AD converter 119.

(Configuration of Touch Sensor Panel 102)

FIG. 2 is a cross-sectional view illustrating a structure of the touch sensor panel 102, which is included in the touch sensor system 101. The touch sensor panel 102 includes: a substrate 103 (insulator); a plurality of vertical electrodes 106 provided on a first surface 104 (vertical electrode surface) of the substrate 103; and a plurality of horizontal electrodes 107 provided on a second surface 105 (horizontal electrode surface) of the substrate 103.

The substrate 103 is an insulating dielectric substrate. The substrate 103 is disposed between the vertical electrodes 106 and the horizontal electrodes 107 to insulate the vertical electrodes 106 from the horizontal electrodes 107. The substrate 103 is provided with, on the side of the vertical electrodes 106, a transparent adhesive 113 that covers the vertical electrodes 106. The transparent adhesive 113 is provided with a cover film 115 adhered to a surface thereof. The substrate 103 is provided with, on the side of the horizontal electrodes 107, a transparent adhesive 114 that covers the horizontal electrodes 107. To the transparent adhesive 114 is attached a display 112.

(Arrangement of Vertical Electrodes 106)

Figure 18:
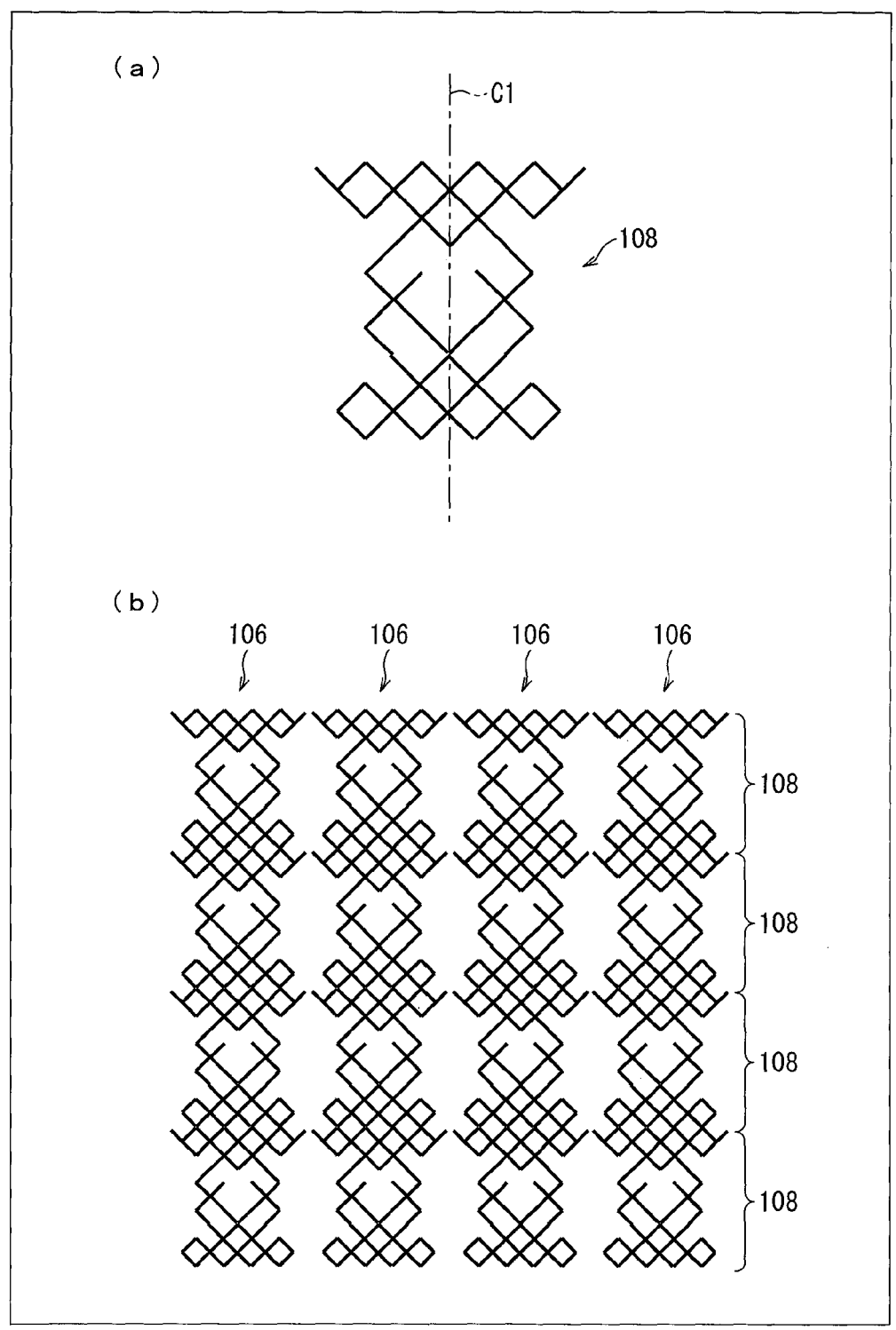
FIG. 18 (*a*) is a diagram illustrating a first basic shape of a vertical electrode included in the touch panel, and (*b*) is a diagram illustrating an arrangement of vertical electrodes.

(a) of FIG. 18 is a diagram illustrating a first basic shape 108 of a vertical electrode 106 included in the touch sensor panel 102. (b) of FIG. 18 is a diagram illustrating an arrangement of vertical electrodes 106.

The vertical electrodes 106 are, as mentioned above with reference to FIG. 17, provided on the first surface 104 of the substrate 103. Each vertical electrode 106 includes a sequence of a repeat of first basic shapes 108 each formed of fine wires illustrated in (a) of FIG. 18, the first basic shapes 108 being connected to one another in a vertical direction as illustrated in (b) of FIG. 18. Each first basic shape 108 has line symmetry with respect to a vertical center line C1, and consists only of (i) a fine wire inclined at an oblique angle of degrees and (ii) a fine wire inclined at an angle of negative 45 degrees. The vertical electrodes 106 are provided on the first surface 104 (see FIG. 17) of the substrate 103 and arranged at predetermined intervals (for example, with a pitch of approximately 7 mm) in the horizontal direction.

Such inclined fine wires forming each first basic shape 108 do not block pixels included in a liquid crystal display 112 on which the touch sensor panel 102 is placed This arrangement thus prevents moire from occurring.

(Configuration of Horizontal Electrodes 107)

Figure 19:
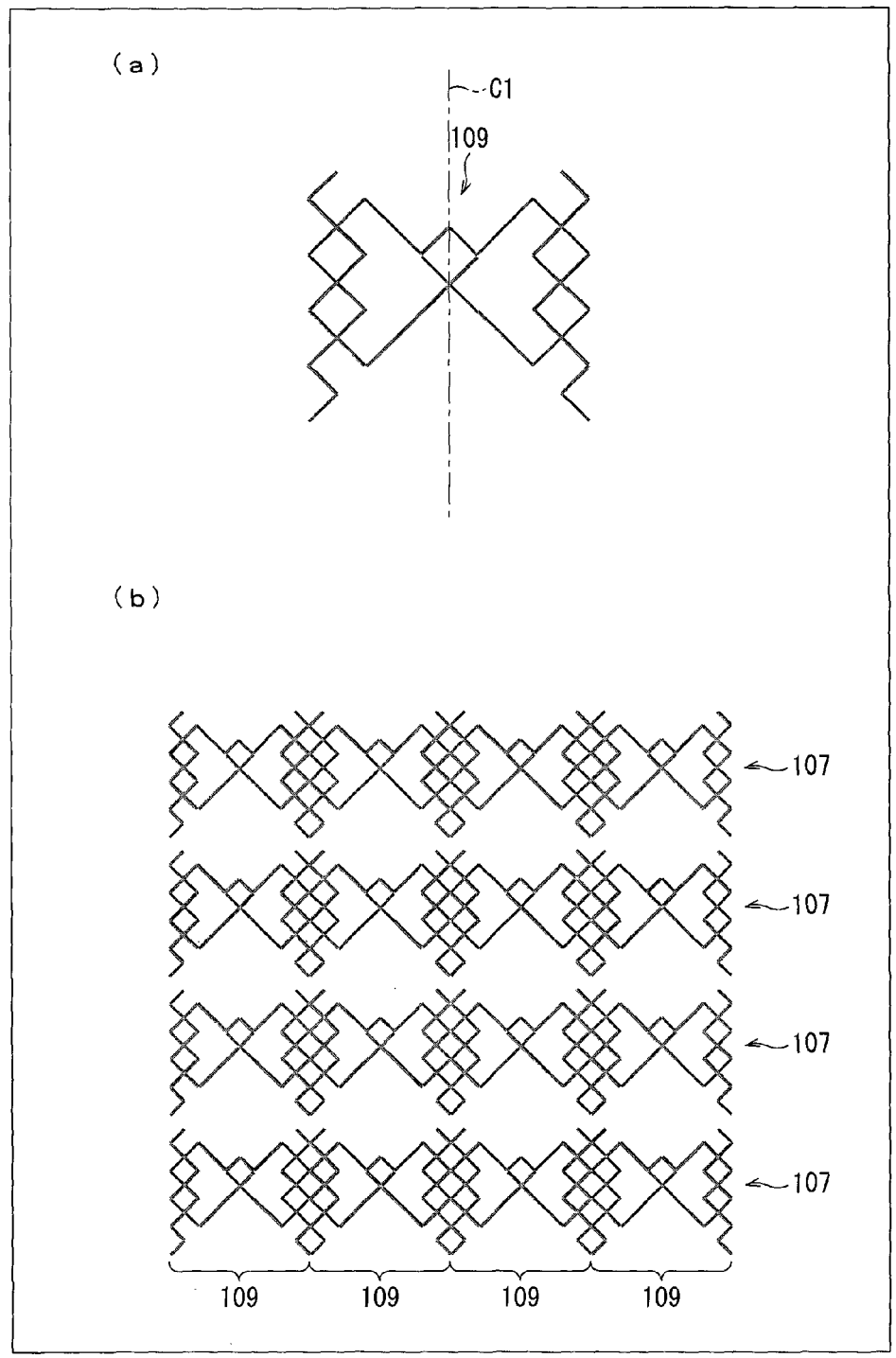
FIG. 19 (*a*) is a diagram illustrating a second basic shape of a horizontal electrode included in the touch panel, and (*b*) is a diagram illustrating an arrangement of horizontal electrodes.

(a) of FIG. 19 is a diagram illustrating a second basic shape 109 of a horizontal electrode 107 included in the touch sensor panel 102. (b) of FIG. 19 is a diagram illustrating an arrangement of horizontal electrodes 107.

The horizontal electrodes 107 are, as mentioned above with reference to FIG. 17, provided on the second surface 105 of the substrate 103. Each horizontal electrode 107 includes a sequence of a repeat of second basic shapes 109 each formed of fine wires illustrated in (a) of FIG. 19, the second basic shapes 109 being connected to one another in a horizontal direction as illustrated in (b) of FIG. 19. Each second basic shape 109 has line symmetry with respect to the vertical center line C1, and similarly to the first basic shapes 108, consists only of (i) a fine wire inclined at an oblique angle of 45 degrees and (ii) a fine wire inclined at an angle of negative 45 degrees. The horizontal electrodes 107 are provided on the second surface 105 (see FIG. 17) of the substrate 103 and arranged at predetermined intervals (for example, with a pitch of approximately 7 mm) in the vertical direction.

The vertical electrodes 106 and the horizontal electrodes 107 are each formed by, for example, etching a metal thin film or printing a pattern with an ink including electrically conductive nanoparticles. Such electrically conductive nanoparticles include silver, gold, platinum, palladium, copper, carbon, or a mixture of any of the above.

(Arrangement of Grid)

Figure 20:
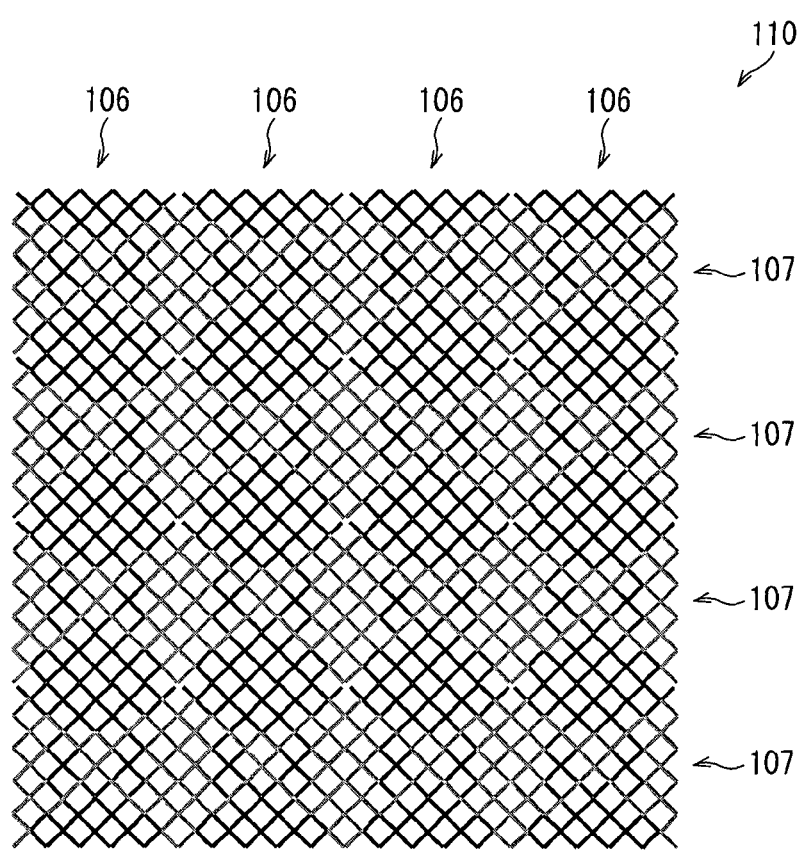
FIG. 20 is a diagram illustrating a uniform grid including the vertical electrodes and the horizontal electrode.

FIG. 20 is a diagram illustrating a uniform grid 110 including the plurality of vertical electrodes 106 and the plurality of horizontal electrodes 107. The vertical electrodes 106 and the horizontal electrodes 107 are so disposed that as viewed in the direction perpendicular to the substrate 103 (see FIG. 17), the vertical electrodes 106 include no segment coincident with the horizontal electrodes 107. The vertical electrodes 106 and the horizontal electrodes 107 are disposed uniformly to form a grid 110 with no gap. The grid 110 has an outline in a rectangular shape.

Figure 42:
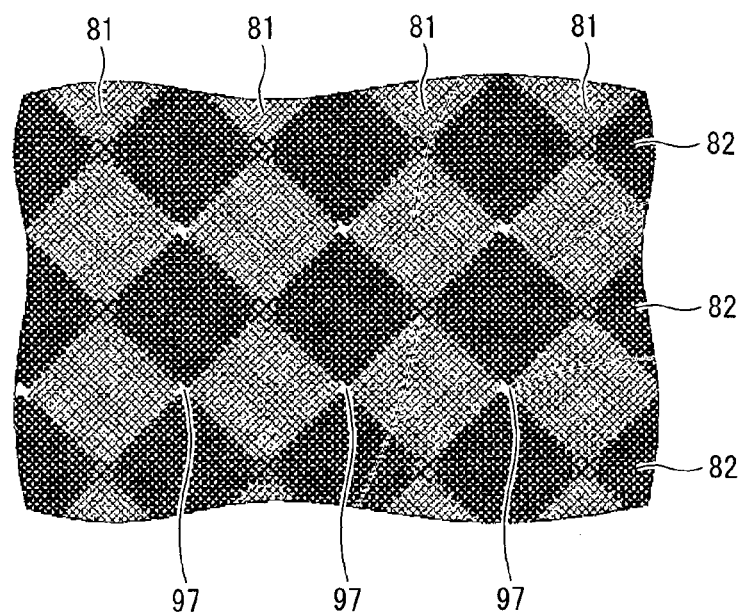
FIG. 42 is a diagram illustrating an arrangement of vertical electrodes and horizontal electrodes in another conventional capacitive touch sensor panel.

The basic shapes 108 constituting the vertical electrodes 106 and the basic shapes 109 constituting the horizontal electrodes 107 each have line symmetry. The vertical electrodes 106 and the horizontal electrodes 107 form a grid 110, which has no gap. This arrangement solves the problem caused in, for example, the conventional arrangement illustrated in FIG. 42, that is, the problem of cross-shaped openings 97 that are not covered by a grid, the openings 97 being visibly recognized, with the result of decreased visibility. The conventional arrangement illustrated in FIG. 42 poses another problem that the capacitance in a portion surrounding an opening 97 is changed differently from that in a portion away from the opening 97. The arrangement of Embodiment 7 illustrated in FIG. 20, which causes no opening, advantageously allows a capacitance to change in a uniform manner over the entire substrate 103.

Figure 43:
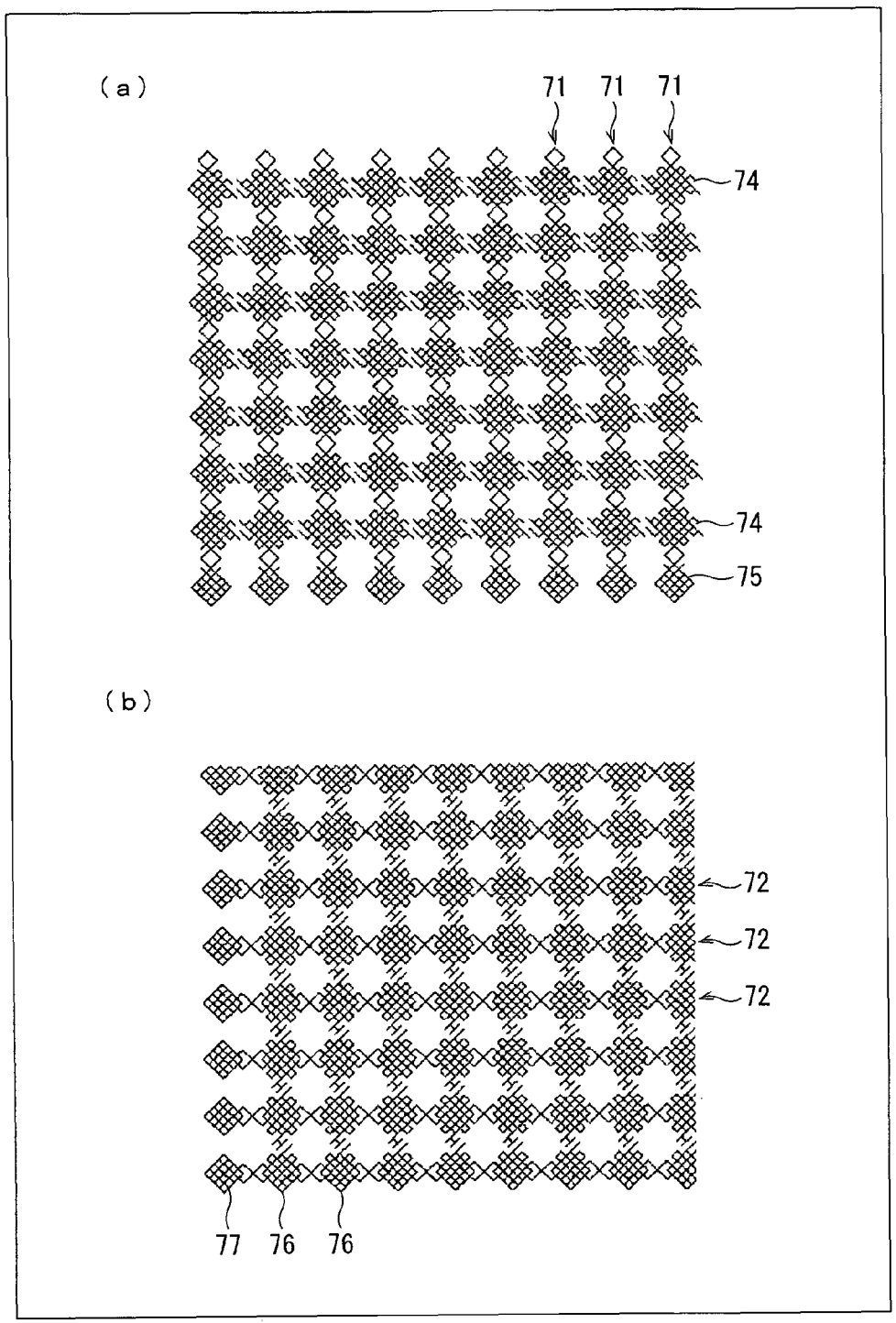
FIG. 43 (*a*) is a diagram illustrating an arrangement of vertical electrodes in yet another conventional capacitive touch sensor panel, and (*b*) is a diagram illustrating an arrangement of horizontal electrodes in that capacitive touch sensor panel.
Figure 44:
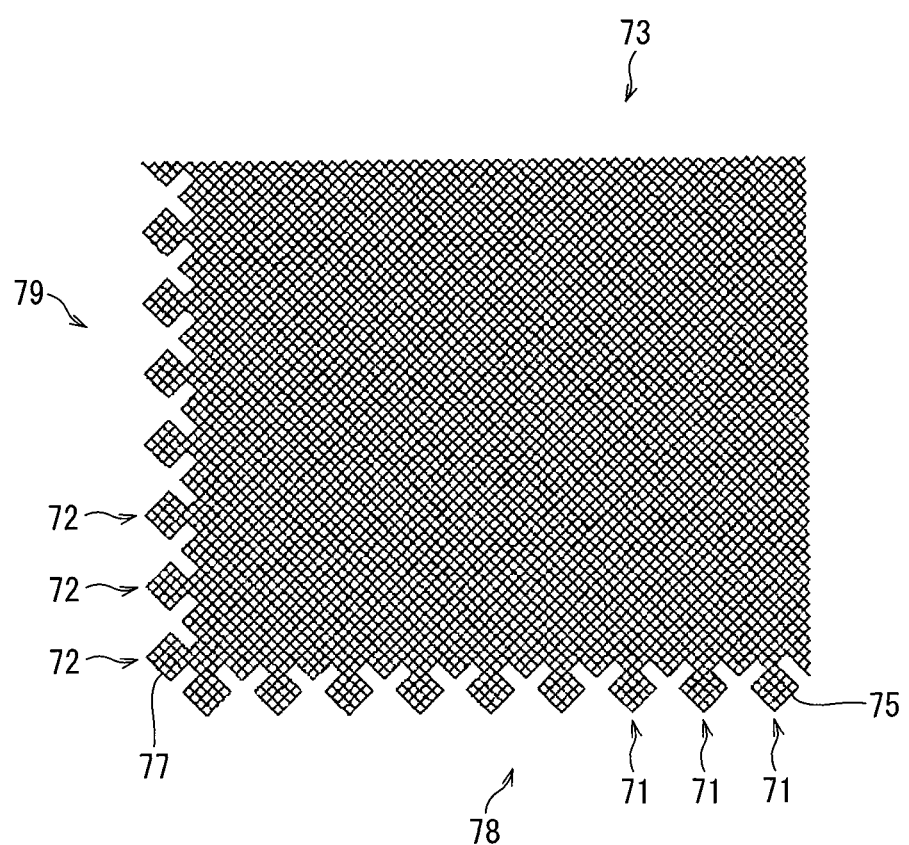
FIG. 44 is a diagram illustrating a uniform grid including the vertical electrodes and the horizontal electrode.

The arrangement illustrated in FIG. 43 includes: vertical electrodes 71 each formed by (i) forming a repeat of basic shapes 74 in the vertical direction and then (ii) joining, to the repeat of basic shapes 74, a basic shape 75 different from the basic shapes 74; and horizontal electrodes 1072 each formed by (i) forming a repeat of basic shape 76 in the horizontal direction and then (ii) joining, to the repeat of basic shapes 76, a basic shape 77 different from the basic shapes 76. The vertical electrodes 71 and the horizontal electrodes 1072 are placed on top of each other to form a grid 73 (see FIG. 44), which has (i) along its bottom side, a zigzag shape 78 due to the basic shapes 75 and (ii) along its left side, a zigzag shape 79 due to the basic shapes 77. These zigzag shapes 78 and 79 problematically make it difficult to (i) easily join, directly to the horizontal electrodes 1072 forming the zigzag shape 79, respective address lines for driving the horizontal electrodes 1072, and (ii) easily join, directly to the vertical electrodes 71 forming the zigzag shape 78, respective address lines for driving the vertical electrodes 71.

In contrast, the arrangement of Embodiment 7 illustrated in FIG. 20 includes a grid 110 having a rectangular outline and no zigzag shape. This arrangement thus makes it possible to (i) easily join, directly to the horizontal electrodes 107, respective address lines for driving the horizontal electrodes 107, and (ii) easily join, directly to the vertical electrodes 106, respective address lines for reading out signals from the vertical electrodes 106.

Figure 45:
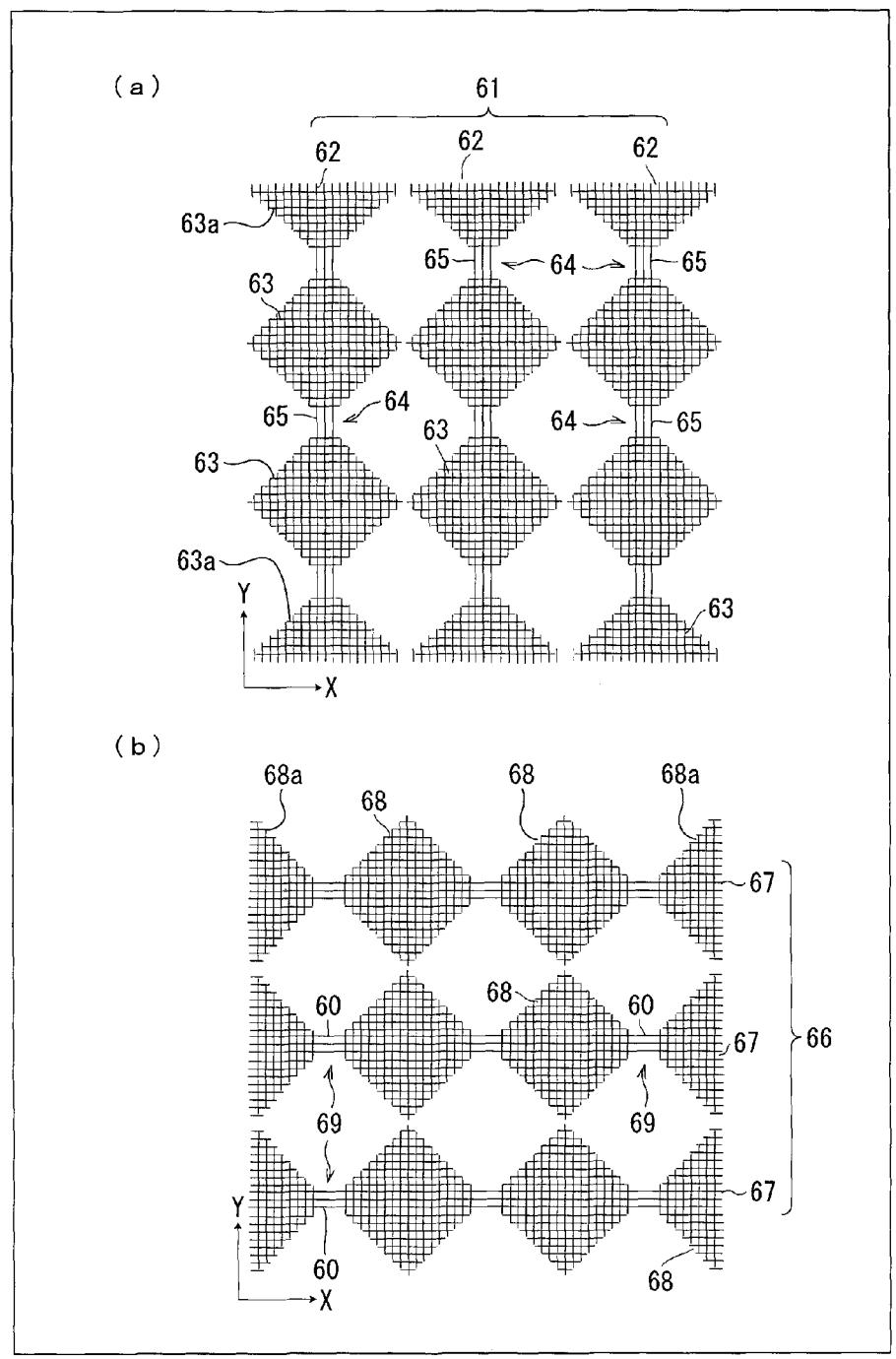
FIG. 45 (a) is a diagram illustrating an arrangement of vertical electrodes in still another conventional capacitive touch sensor panel, and (b) is a diagram illustrating an arrangement of horizontal electrodes in that capacitive touch sensor panel.

The arrangement illustrated in (*a*) of FIG. 45 includes conductive X sequences 62 each formed by (i) forming, in the vertical direction, a repeat of basic shapes each combining a conductive X pad 63 with a conductive X line 64 and then (ii) joining, to the repeat of basic shapes, conductive X pads 63*a*, each of which is a basic shape different from the basic shape combining a conductive X pad 63 with a conductive X line 64. Thus, the conductive X sequences 62 illustrated in (*a*) of FIG. 45 are not formed of a repeat of basic shapes connected to one another in the vertical direction, and are thus different in configuration from the vertical electrodes 106 of Embodiment 7 illustrated in FIG. 18.

The arrangement illustrated in (*b*) of FIG. 45 includes conductive Y sequences 67 each formed by (i) forming, in the horizontal direction, a repeat of basic shapes each combining a conductive Y pad 68 with a conductive Y line 69 and then (ii) joining, to the repeat of basic shapes, conductive Y pads 68*a*, each of which is a basic shape different from the basic shape combining a conductive Y pad 68 with a conductive Y line 69. Thus, the conductive Y sequences 67 illustrated in (*b*) of FIG. 45 are not formed of a repeat of basic shapes connected to one another in the horizontal direction, and are thus different in configuration from the horizontal electrodes 107 of Embodiment 7 illustrated in FIG. 19.

As described above, an embodiment of the present invention includes a repeat of basic shapes connected to one another in the vertical or horizontal direction. This arrangement facilitates design of a vertical electrode and a horizontal electrode, and makes it possible to carry out, for example, an automatic creation and an automatic correction of an electrode. The above arrangement further allows a photolithographic mask for use in production of a touch panel and touch panel products to be inspected by a repeated image processing. The above arrangement thus also facilitates the production of a touch panel.

The arrangement illustrated in FIG. 45 also poses the following problem: In the case where the conductive X pads 63 and the conductive Y pads 68 are each formed of fine wires extending in oblique directions that are not parallel to the Y axis or the X axis, it is impossible to form a uniform grid since (i) the conductive X lines 64 need to be parallel to the Y axis, and (ii) the conductive Y lines 69 need to be parallel to the X axis.

Figure 17:
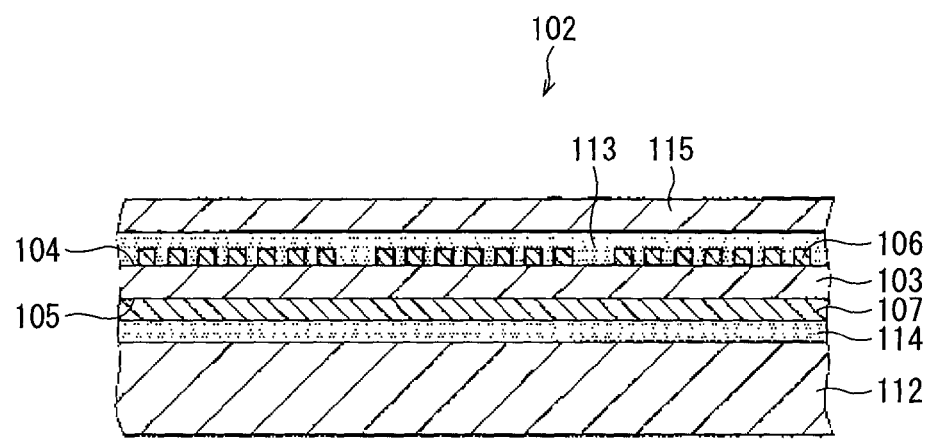
FIG. 17 is a cross-sectional view illustrating a structure of a touch panel included in the touch sensor system.

The touch sensor panel 102 of Embodiment 7 can be produced by either forming vertical electrodes 106 and horizontal electrodes 107 on respective surfaces of a single sheet (substrate 103) as illustrated in FIG. 17, or combining (i) a sheet on which vertical electrodes 106 are formed with (ii) a sheet on which horizontal electrodes 107 are formed. Either case involves the possibility that due to positioning accuracy or combining accuracy, the resulting positional relationship between the vertical electrodes 106 and the horizontal electrodes 107 is subtly shifted from the positional relationship disclosed in Embodiment 7. This necessitates determining positioning accuracy or combining accuracy for the touch panel production in correspondence with a required accuracy of detecting a touch position.

(Variations)

Figure 21:
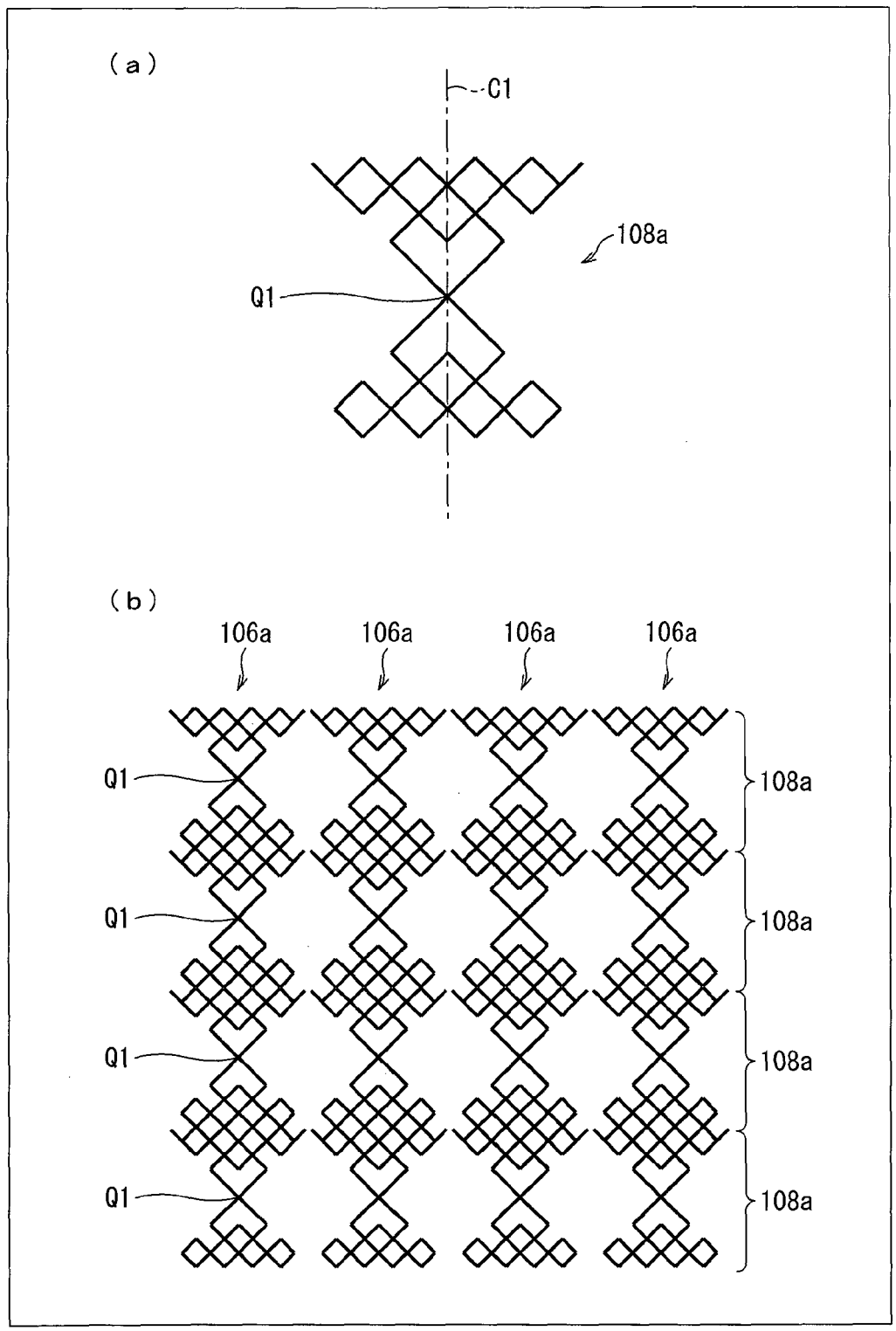
FIG. 21 (*a*) is a diagram illustrating a first basic shape of a vertical electrode included as a variation in the touch panel, and (*b*) is a diagram illustrating an arrangement of vertical electrodes according to the variation.

(*a*) of FIG. 21 is a diagram illustrating a first basic shape 108*a* of a vertical electrode 106*a* included as a variation in the touch sensor panel 102. (*b*) of FIG. 21 is a diagram illustrating an arrangement of vertical electrodes 106*a* according to the variation. Each first basic shape 108*a* is so arranged that the wiring path for fine wires in the upper half is connected to the wiring path for fine wires in the lower half at a junction Q1 narrowed to the width of a single fine wire. Each first basic shape 108*a* has line symmetry with respect to a vertical center line C1.

Figure 22:
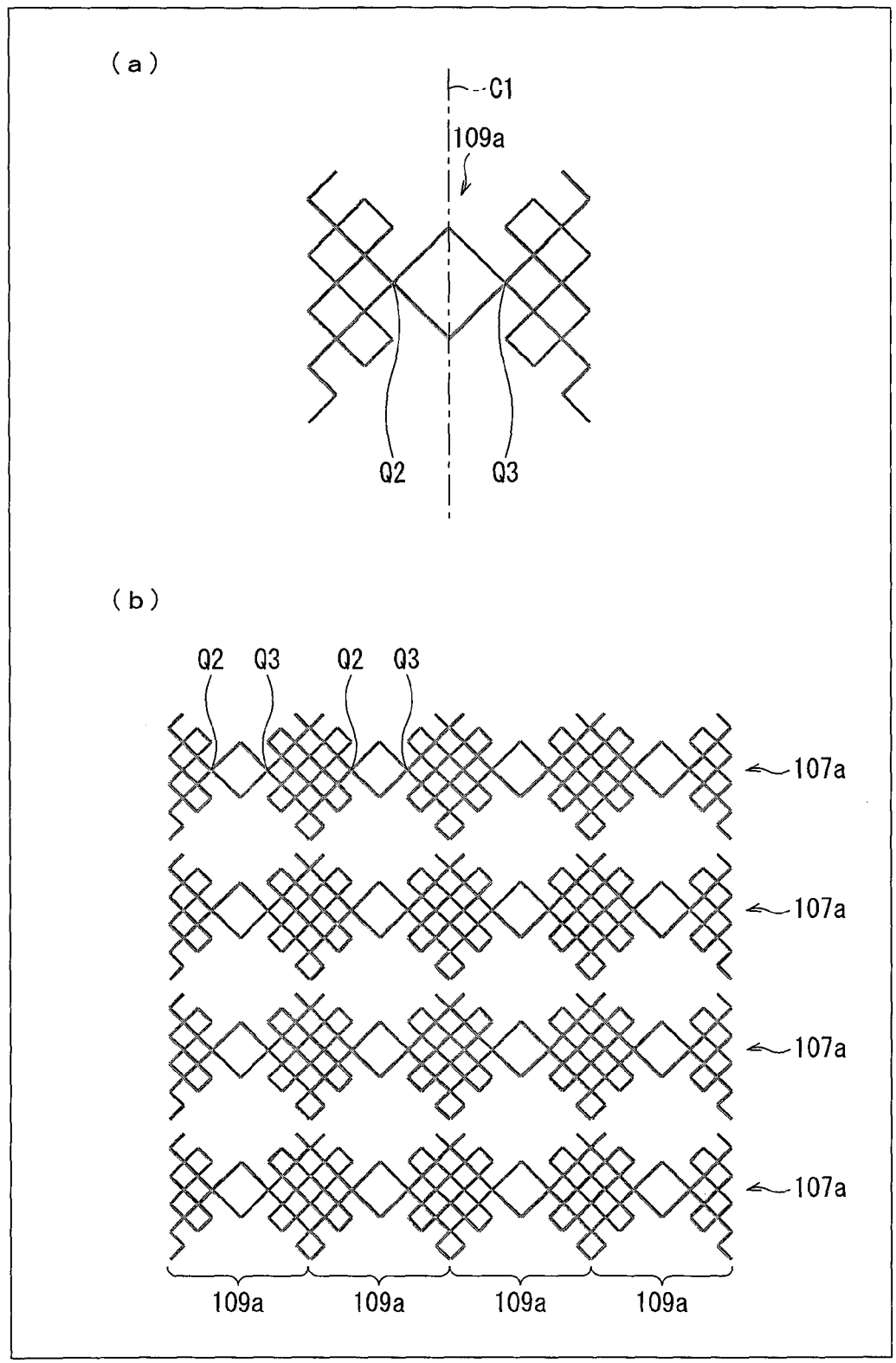
FIG. 22 (*a*) is a diagram illustrating a second basic shape of a horizontal electrode included as a variation in the touch panel, and (*b*) is a diagram illustrating an arrangement of horizontal electrodes according to the variation.

(*a*) of FIG. 22 is a diagram illustrating a second basic shape 109*a* of a horizontal electrode 107*a* included as a variation in the touch sensor panel 102. (*b*) of FIG. 22 is a diagram illustrating an arrangement of horizontal electrodes 107*a* according to the variation. Each second basic shape 109*a* is so arranged that (i) the wiring path for fine wires in a left portion is connected to the wiring path for fine wires in a central portion at a junction Q2 narrowed to the width of a single fine wire and that (ii) the wiring path for fine wires in the central portion is connected to the wiring path for fine wires in a right portion at a junction Q3 narrowed to the width of a single fine wire. Each second basic shape 109*a* has line symmetry with respect to the vertical center line C1.

Figure 23:
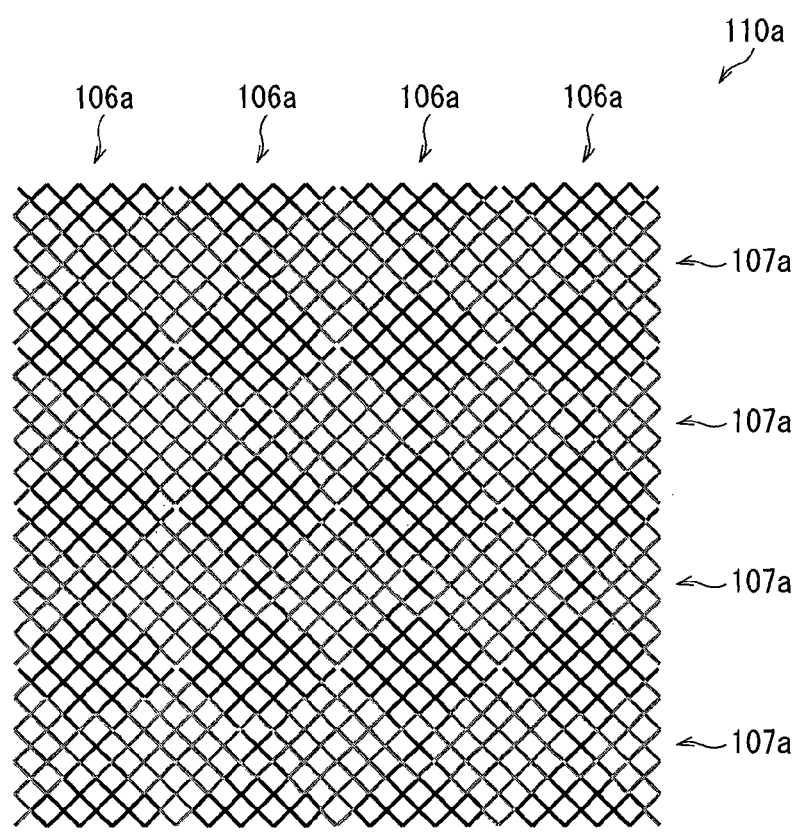
FIG. 23 is a diagram illustrating a uniform grid including the vertical electrodes according to the variation and the horizontal electrode according to the variation.

FIG. 23 is a diagram illustrating a uniform grid 110*a* including the vertical electrodes 106*a* as a variation and the horizontal electrodes 107*a* as a variation. As in the grid 110 illustrated in FIG. 20, the vertical electrodes 106*a* and the horizontal electrodes 107*a* are so disposed that as viewed in the direction perpendicular to the substrate 103 (see FIG. 17), the vertical electrodes 106*a* include no segment coincident with the horizontal electrodes 107*a*. The vertical electrodes 106*a* and the horizontal electrodes 107*a* are disposed uniformly to form a grid 110*a* with no gap. The grid 110*a* has an outline in a rectangular shape.

The respective arrangements of the vertical electrodes 106*a*, the horizontal electrodes 107*a*, and the grid 110*a* illustrated in FIGS. 21 through 23 achieve advantages similar to those achieved by the respective arrangements of the vertical electrodes 106, the horizontal electrodes 107, and the grid 110 illustrated in FIGS. 18 through 20.

Figure 24:
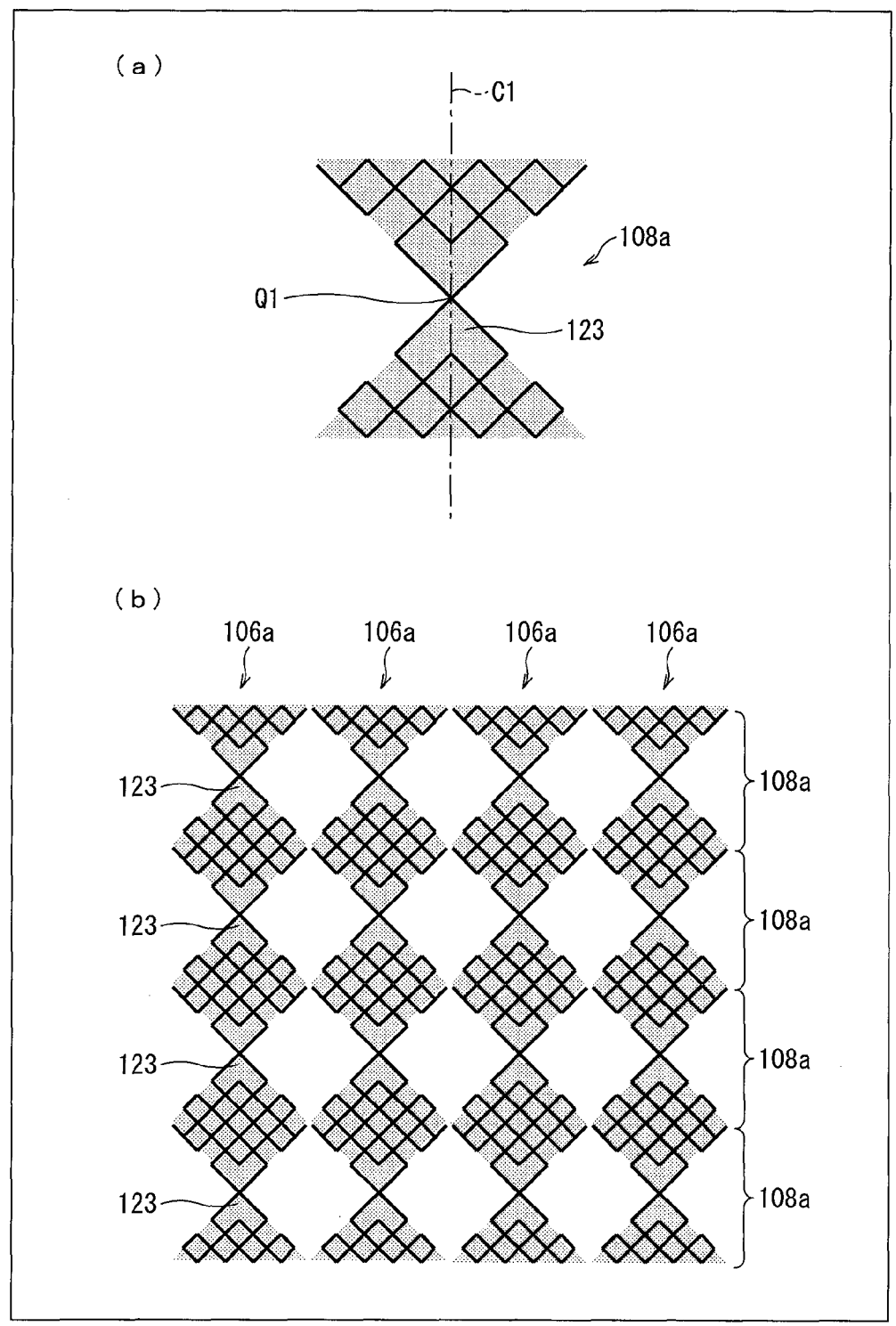
FIG. 24 (*a*) is a diagram illustrating a configuration of a first basic shape of a vertical electrode according to the variation, the first basic shape being filled with a transparent electrode material, and (*b*) is a diagram illustrating vertical electrodes according to the variation, the vertical electrodes being filled with the transparent electrode material.
Figure 25:
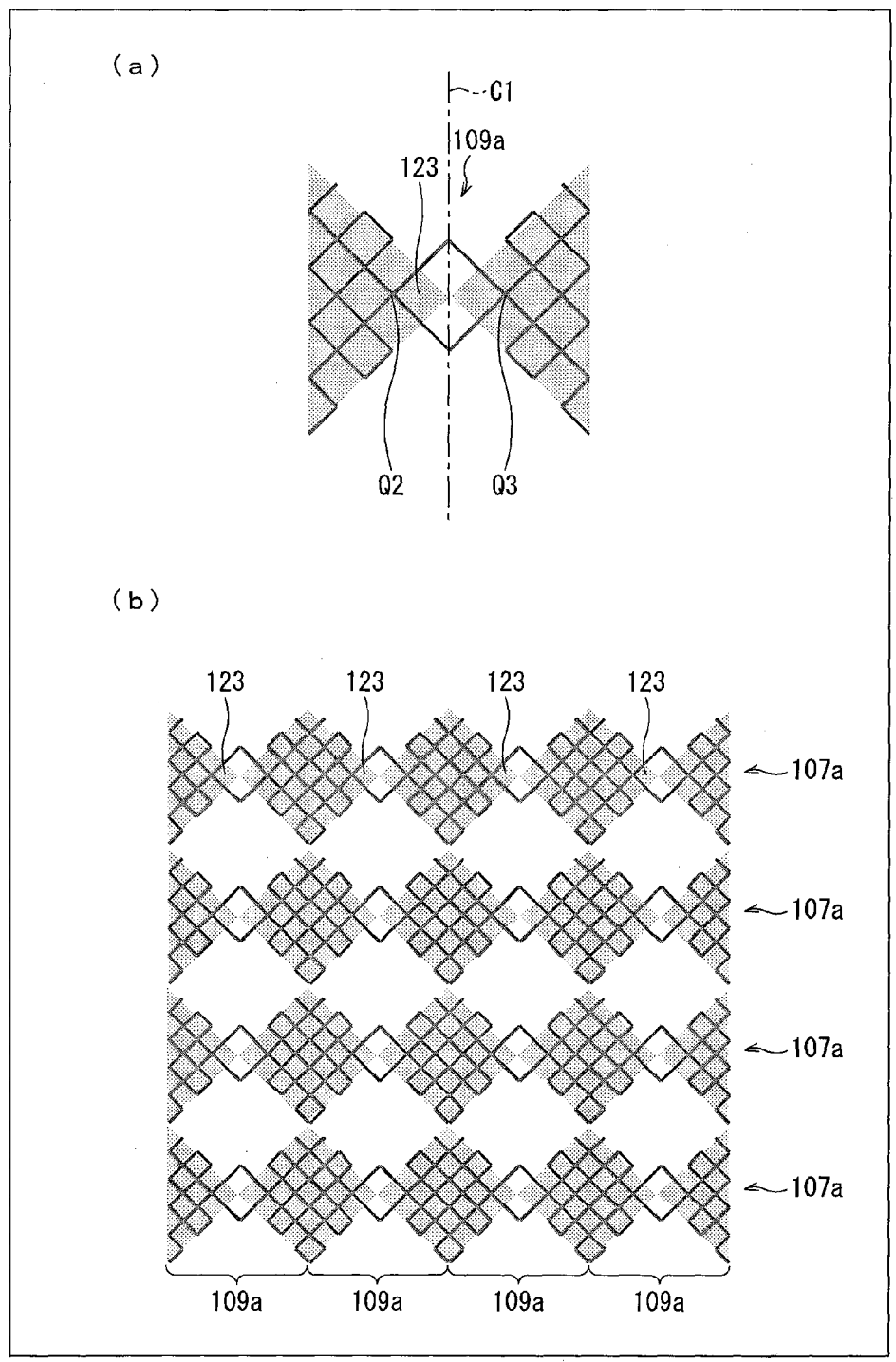
FIG. 25 (*a*) is a diagram illustrating a configuration of a second basic shape of a horizontal electrode according to the variation, the second basic shape being filled with a transparent electrode material, and (*b*) is a diagram illustrating horizontal electrodes according to the variation, the horizontal electrodes being filled with the transparent electrode material.

(*a*) of FIG. 24 is a diagram illustrating a configuration of a first basic shape 108*a* of a vertical electrode 106*a* as a variation, the first basic shape 108*a* being filled with a transparent electrode material 123. (*b*) of FIG. 24 is a diagram illustrating the vertical electrodes 106*a* as a variation, the vertical electrodes 106*a* being filled with the transparent electrode material 123. (*a*) of FIG. 25 is a diagram illustrating a configuration of a second basic shape 109*a* of a horizontal electrode 107*a* as a variation, the second basic shape 109*a* being filled with the transparent electrode material 123. (*b*) of FIG. 25 is a diagram illustrating the horizontal electrodes 107*a* as a variation, the horizontal electrodes 107*a* being filled with the transparent electrode material 123.

In the case where the vertical electrodes 106*a*, each including the first basic shapes 108*a*, are filled with the transparent electrode material 123 to its contour as illustrated in FIG. 24, the vertical electrodes 106*a* each have an even lower resistance value. In the case where the horizontal electrodes 107*a*, each including the second basic shapes 109*a*, are filled with the transparent electrode material 123 substantially to its contour as illustrated in FIG. 25, the horizontal electrodes 107a each have an even lower resistance value. The transparent electrode material 123 can be made of, for example, an ITO film or graphene.

The above arrangement can further reduce the width of the fine wires, and thus reduce visibility of the fine wires. In the case where the fine wires each have a width of, for example, 0.5 mm or larger, a viewer, when close to a screen of a display device including the touch panel, visibly recognizes the fine wires.

Figure 26:
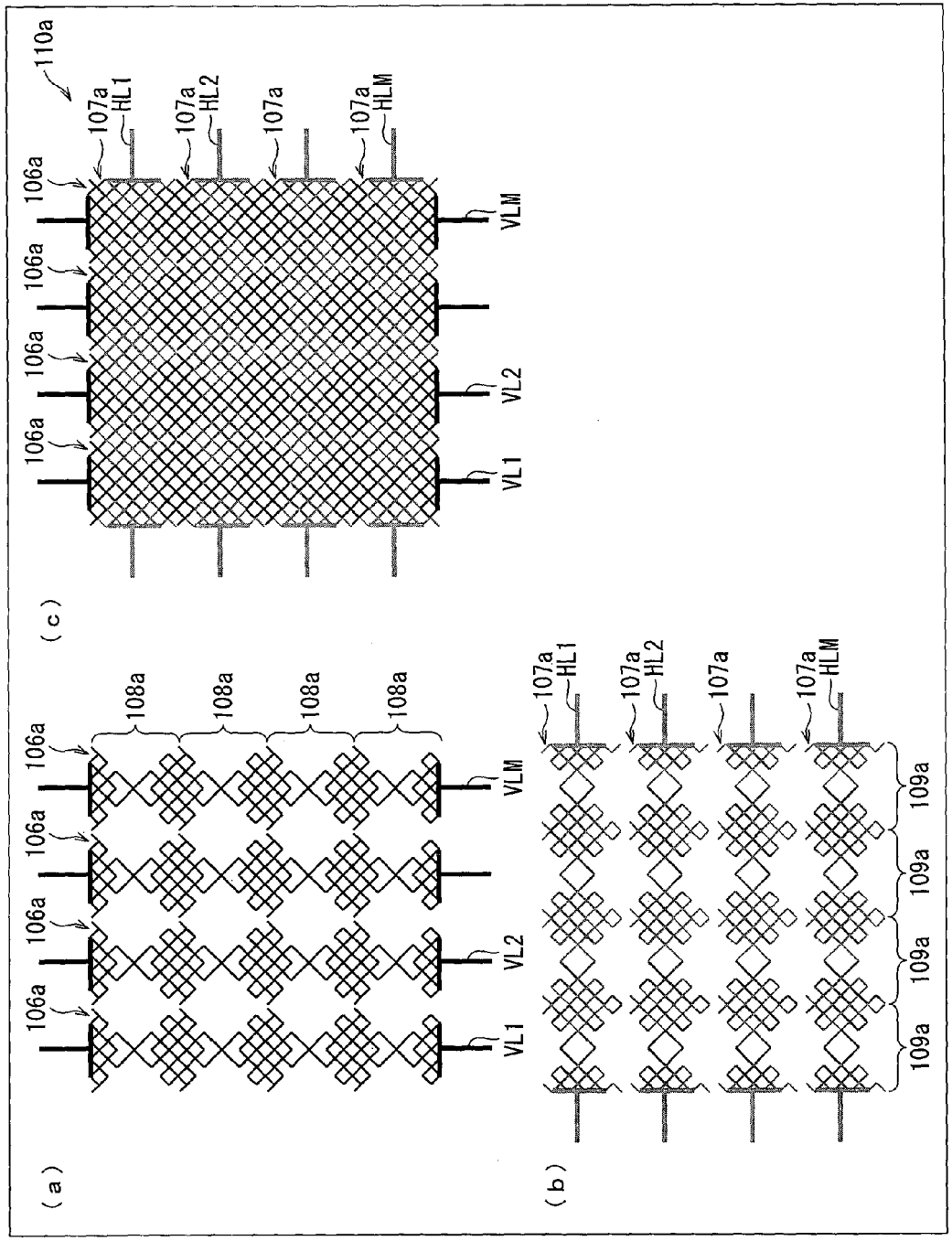
FIG. 26 (*a*) is a diagram illustrating an arrangement of the vertical electrodes according to the variation, the vertical electrodes being connected to respective address lines, (*b*) is a diagram illustrating an arrangement of the horizontal electrodes according to the variation, the horizontal electrodes being connected to respective address lines, and (*c*) is a diagram illustrating a grid including the vertical electrodes connected to the respective address lines and the horizontal electrodes connected to the respective address lines.

(*a*) of FIG. 26 is a diagram illustrating an arrangement of the vertical electrodes 106*a*, as a variation, connected to the respective address lines VL1 to VLM. (*b*) of FIG. 26 is a diagram illustrating an arrangement of the horizontal electrodes 107*a*, as a variation, connected to the respective address lines HL1 to HLM. (*c*) of FIG. 26 is a diagram illustrating a grid 110*a* including (i) the vertical electrodes 106*a* connected to the respective address lines VL1 to VLM and (ii) the horizontal electrodes 107*a* connected to the respective address lines HL1 to HLM.

The grid 110*a*, which includes the vertical electrodes 106*a* and the horizontal electrodes 107*a*, has a rectangular outline and no zigzag shape as in the grid 110. This arrangement thus makes it possible to (i) easily join, directly to the horizontal electrodes 107*a*, the respective address lines HL1 to HLM for driving the horizontal electrodes 107*a*, and (ii) easily join, directly to the vertical electrodes 106*a*, the respective address lines VL1 to VLM for reading out signals from the vertical electrodes 106*a*.

Embodiment 8

Configuration of Vertical Electrodes 106*b*

Figure 27:
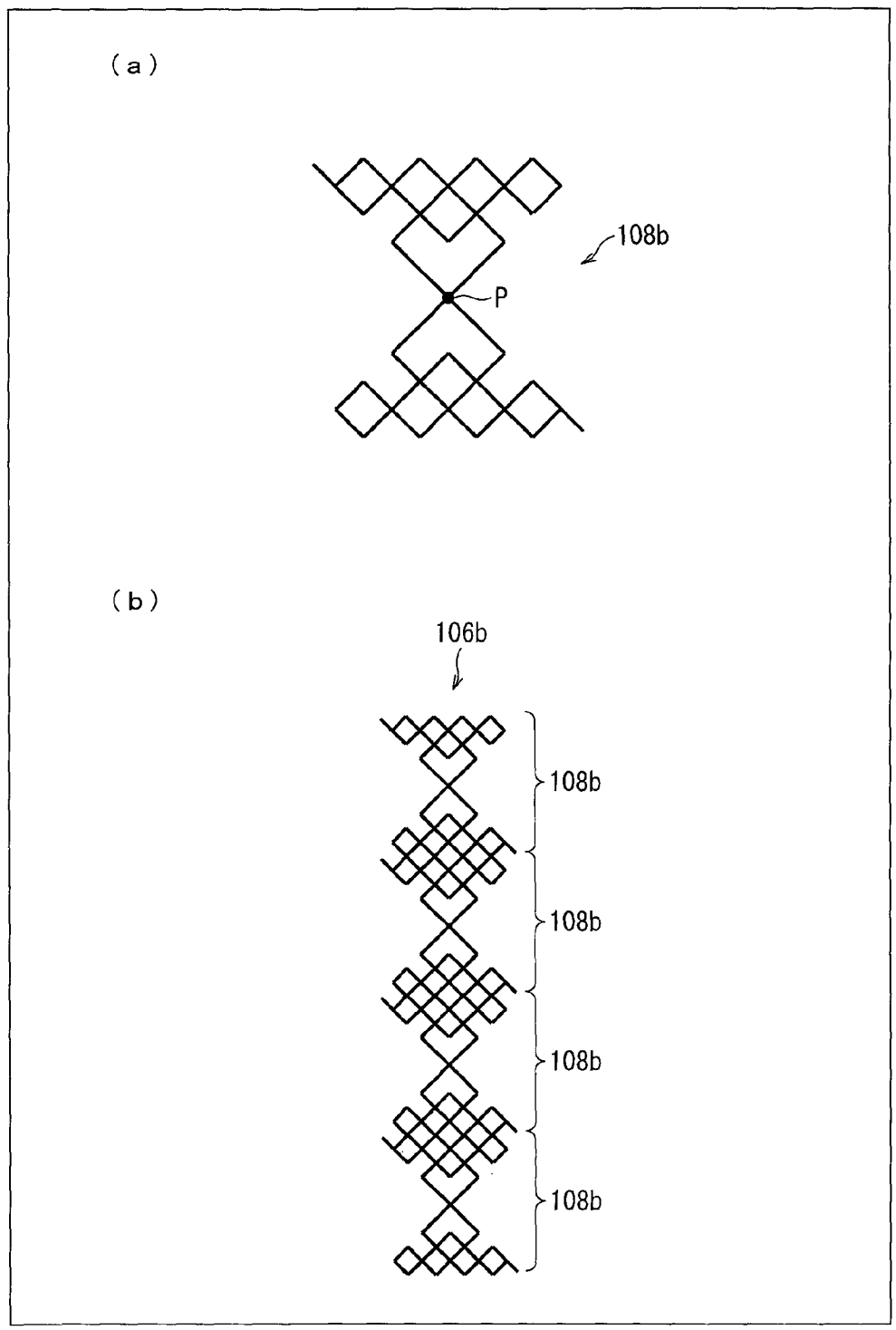
FIG. 27 (*a*) is a diagram illustrating a first basic shape of a vertical electrode included in a touch panel of Embodiment 2, and (*b*) is a diagram illustrating an arrangement of vertical electrodes.

(*a*) of FIG. 27 is a diagram illustrating a first basic shape 108*b* of a vertical electrode 106*b* included in a touch panel of Embodiment 8. (*b*) of FIG. 27 is a diagram illustrating a configuration of a vertical electrode 106*b*. The vertical electrodes 106*b* are, as mentioned above with reference to FIG. 17, provided on the first surface 104 of the substrate 103. Each vertical electrode 106*b* includes a sequence of a repeat of first basic shapes 108*b* each formed of fine wires, the first basic shapes 108*b* being connected to one another in the vertical direction. Each first basic shape 108*b* has point symmetry with respect to a center point P, and consists only of (i) a fine wire inclined at an oblique angle of 45 degrees and (ii) a fine wire inclined at an angle of negative 45 degrees. The vertical electrodes 106*b* are provided on the first surface 104 (see FIG. 17) of the substrate 103 and arranged at predetermined intervals (for example, with a pitch of approximately 7 mm) in the horizontal direction.

(Configuration of Horizontal Electrodes 107*b*)

Figure 28:
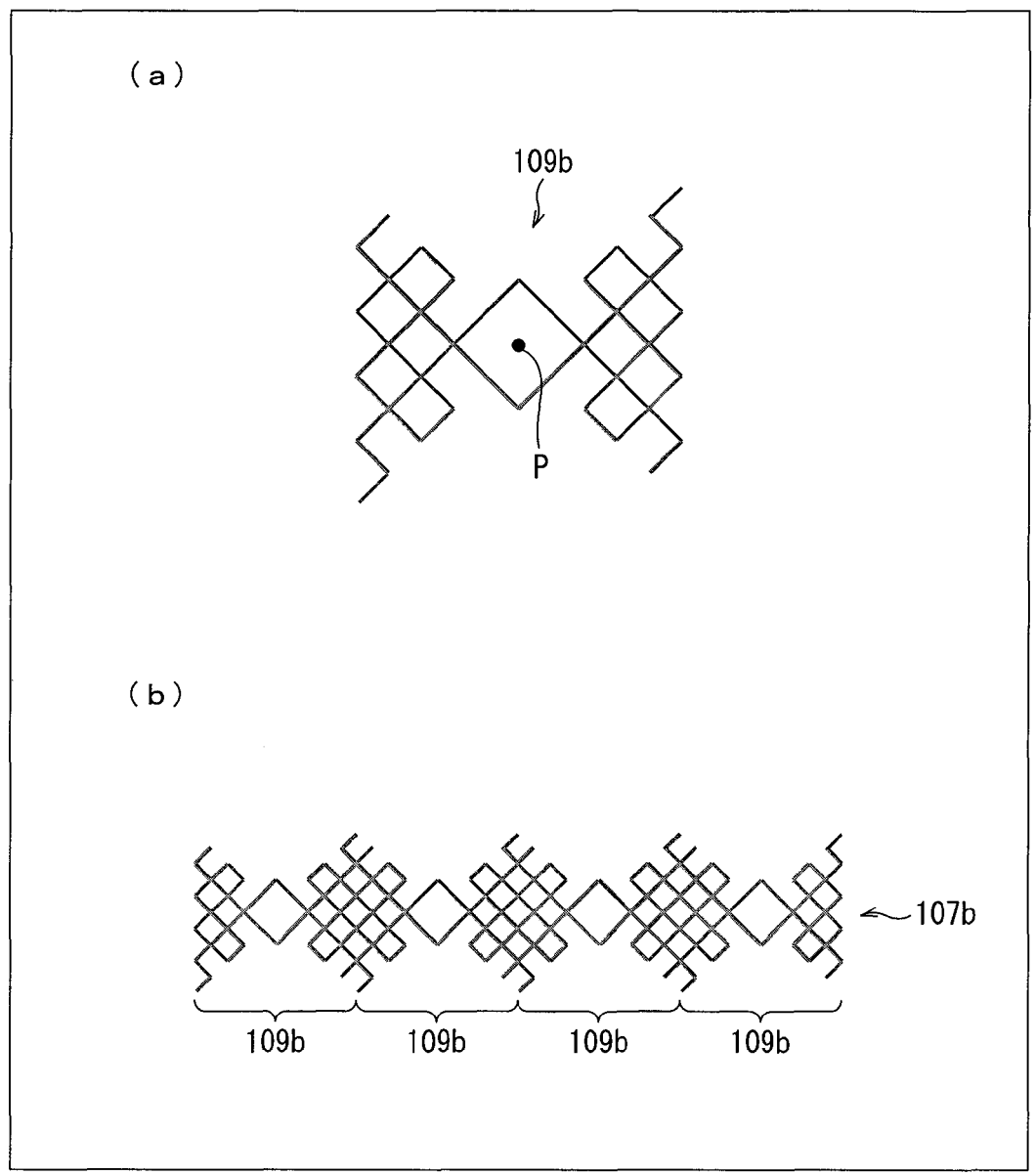
FIG. 28 (*a*) is a diagram illustrating a second basic shape of a horizontal electrode included in the touch panel of Embodiment 8, and (*b*) is a diagram illustrating an arrangement of horizontal electrodes.

(*a*) of FIG. 28 is a diagram illustrating a second basic shape 109*b* of a horizontal electrode 107*b* included in the touch panel of Embodiment 8. (*b*) of FIG. 28 is a diagram illustrating a configuration of a horizontal electrode 107*b*. The horizontal electrodes 107*b* are, as mentioned above with reference to FIG. 17, provided on the second surface 105 of the substrate 103. Each horizontal electrode 107*b* includes a sequence of a repeat of second basic shapes 109*b* each formed of fine wires illustrated in (*a*) of FIG. 28, the second basic shapes 109*b* being connected to one another in the horizontal direction. Each second basic shape 109*b* has point symmetry with respect to the center point P, and similarly to the first basic shapes 108*b*, consists only of (i) a fine wire inclined at an oblique angle of 45 degrees and (ii) a fine wire inclined at an angle of negative 45 degrees. The horizontal electrodes 107*b* are provided on the second surface 105 of the substrate 103 and arranged at predetermined intervals (for example, with a pitch of approximately 7 mm) in the vertical direction.

Embodiment 9

Configuration of Vertical Electrodes 106*c*

Figure 29:
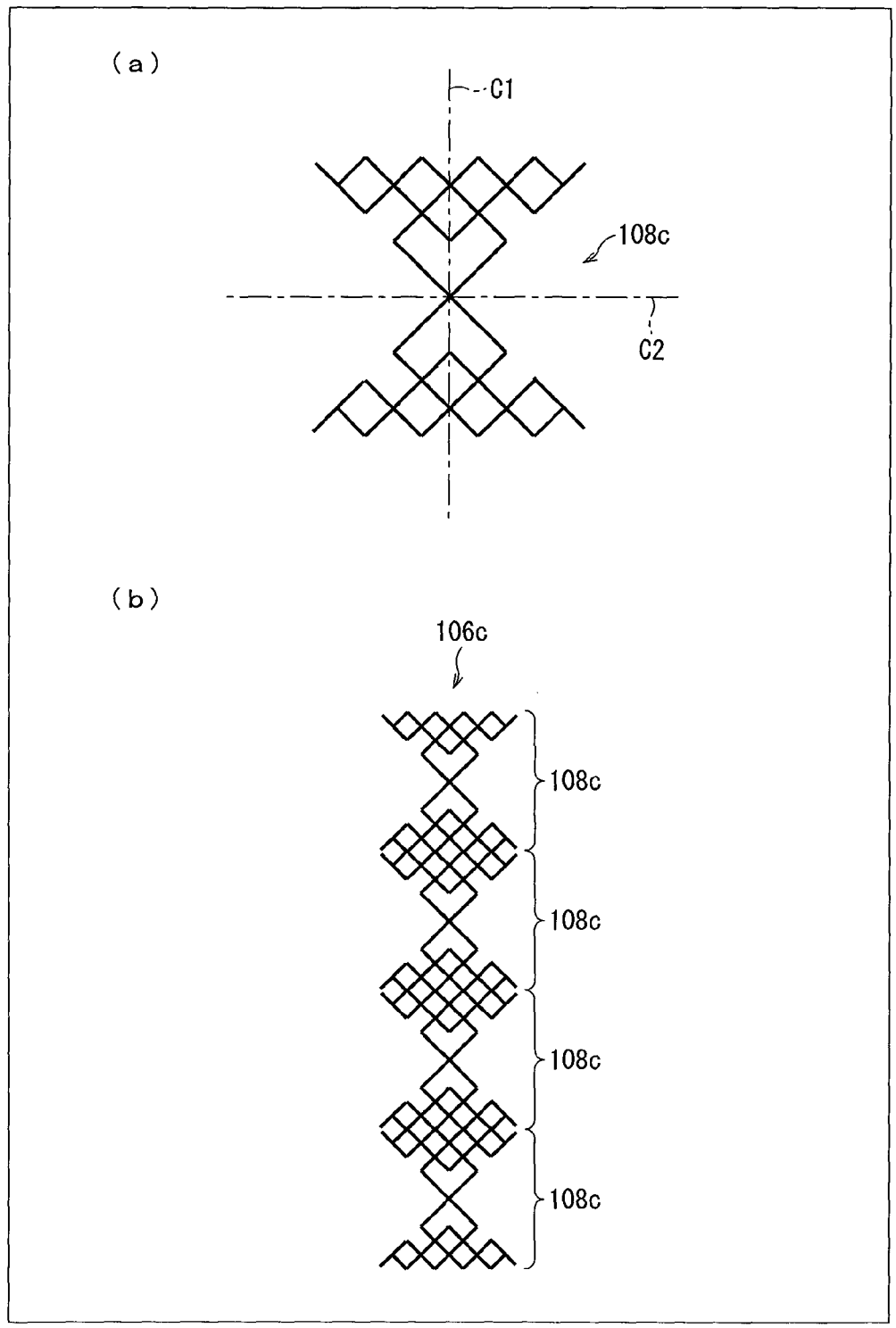
FIG. 29 (*a*) is a diagram illustrating a first basic shape of a vertical electrode included in a touch panel of Embodiment 9, and (*b*) is a diagram illustrating an arrangement of vertical electrodes.

(*a*) of FIG. 29 is a diagram illustrating a first basic shape 108*c* of a vertical electrode 106*c* included in a touch panel of Embodiment 9. (*b*) of FIG. 29 is a diagram illustrating a configuration of a vertical electrode 106*c*. The vertical electrodes 106*c* are provided on the first surface 104 of the substrate 103 illustrated in FIG. 17. Each vertical electrode 106*c* includes a sequence of a repeat of first basic shapes 108*c* each formed of fine wires, the first basic shapes 108*b* being connected to one another in the vertical direction. Each first basic shape 108*c* has line symmetry with respect to (i) a vertical center line C1 and (ii) a horizontal center line C2, and consists only of (i) a fine wire inclined at an oblique angle of 45 degrees and (ii) a fine wire inclined at an angle of negative 45 degrees. The vertical electrodes 106*c* are provided on the first surface 104 (see FIG. 17) of the substrate 103 and arranged at predetermined intervals (for example, with a pitch of approximately 7 mm) in the horizontal direction.

(Configuration of Horizontal Electrodes 107*c*)

Figure 30:
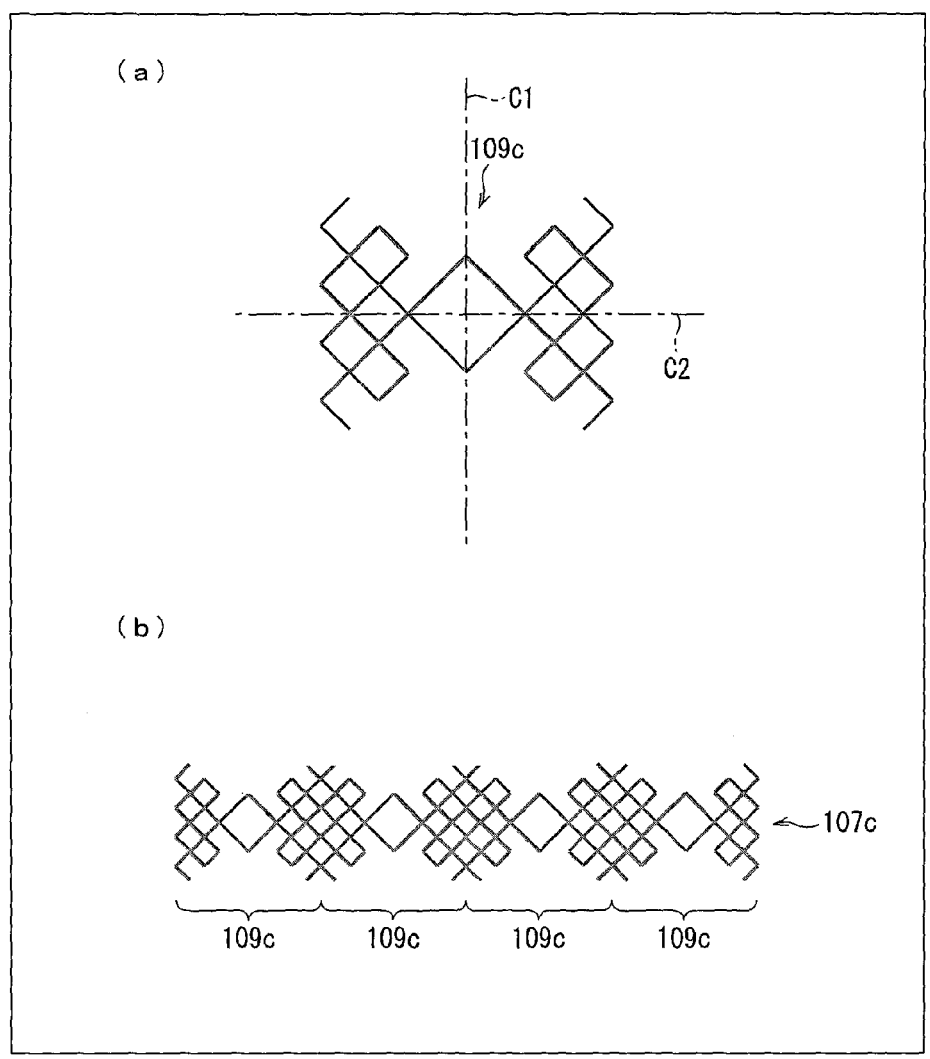
FIG. 30 (*a*) is a diagram illustrating a second basic shape of a horizontal electrode included in the touch panel of Embodiment 9, and (*b*) is a diagram illustrating an arrangement of horizontal electrodes.

(*a*) of FIG. 30 is a diagram illustrating a second basic shape 109*c* of a horizontal electrode 107*c* included in the touch panel of Embodiment 9. (*b*) of FIG. 30 is a diagram illustrating a configuration of a horizontal electrode 107*c*. The horizontal electrodes 107*c* are provided on the second surface 105 of the substrate 103 illustrated in FIG. 17. Each horizontal electrode 107*c* includes a sequence of a repeat of second basic shapes 109*c* each formed of fine wires, the second basic shapes 109*b* being connected to one another in the horizontal direction. Each second basic shape 109*c* has line symmetry with respect to (i) the vertical center line C1 and (ii) the horizontal center line C2, and consists only of (i) a fine wire inclined at an oblique angle of 45 degrees and (ii) a fine wire inclined at an angle of negative 45 degrees. The horizontal electrodes 107*c* are provided on the second surface 105 of the substrate 103 and arranged at predetermined intervals (for example, with a pitch of approximately 7 mm) in the vertical direction.

(Advantage Achieved by Symmetry of Vertical Electrodes and Horizontal Electrodes)

The conventional arrangement illustrated in FIG. 43 includes vertical electrodes 71 and horizontal electrodes 1072 none of which has center-line symmetry or center-point symmetry. Thus, a capacitive touch sensor having an electrode distribution illustrated in FIG. 43 lacks positional symmetry in a capacitance change caused by an object having a small touch area. This problematically makes it impossible to carry out a symmetric position correction during a touch-position detection, and thus requires a complicated algorithm for increasing the position detection precision. This problem leads to an increase in the amount of necessary computation, circuit complexity, and a memory usage amount, and results in an increase in, for example, power consumption and cost.

In contrast, vertical electrodes or horizontal electrodes having line symmetry or point symmetry allow a similar symmetry to occur in a capacitance change caused by an object, such as a pen, that has a small touch area. Utilizing this symmetry in a capacitance change allows a symmetric position correction to be carried out during a touch-position detection, and thus increases the position detection precision.

As described above, to solve the problem with the position detection precision, an embodiment of the present invention includes an arrangement of diamond shapes each formed by fine lines and having symmetry. This arrangement allows a large capacitive touch sensor having a size of 30 inches or larger to highly precisely carry out a position detection involving use of an object, such as a pen, that has a small touch area.

Embodiment 10

Figure 31:
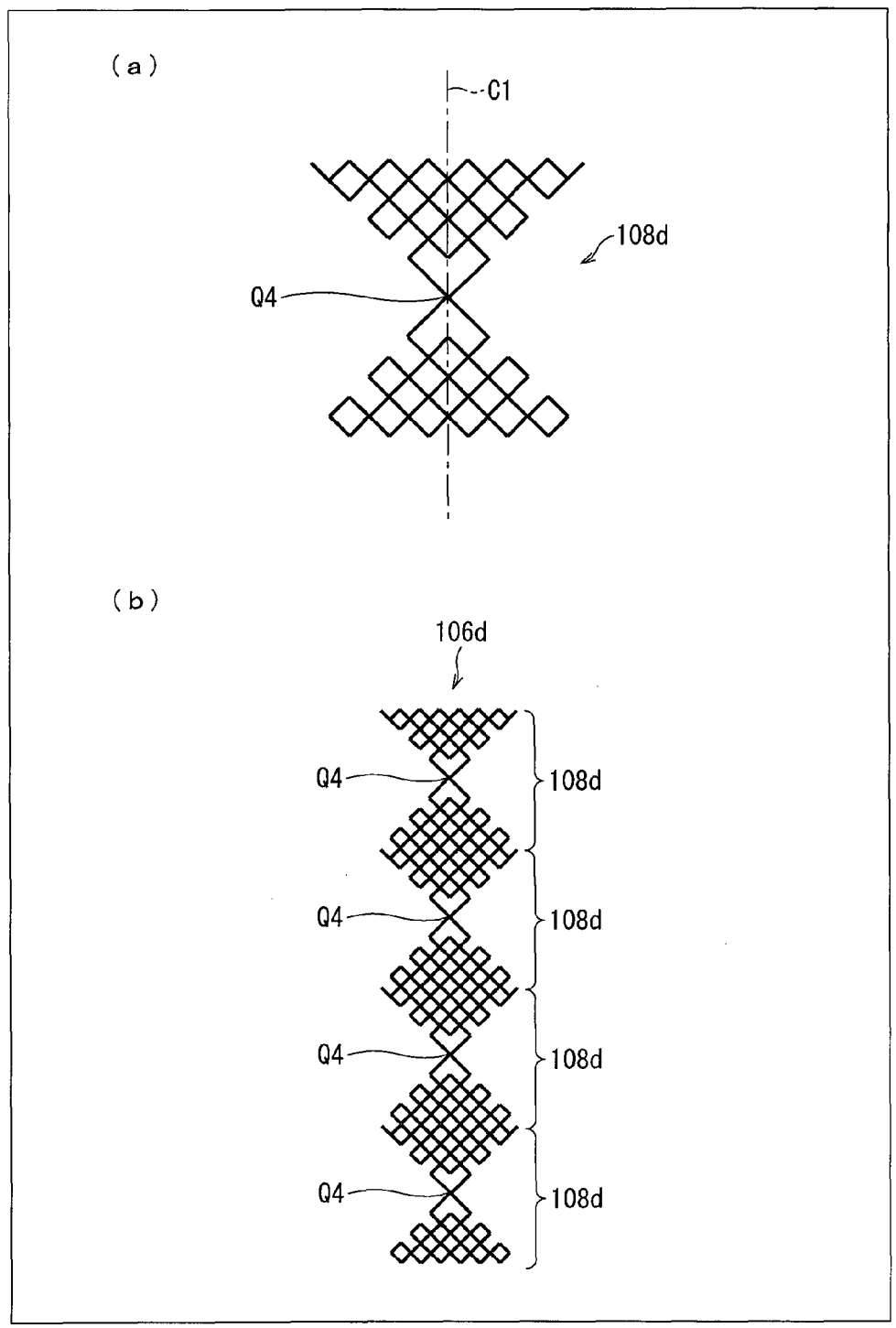
FIG. 31 (*a*) is a diagram illustrating a first basic shape of a vertical electrode included in a touch panel of Embodiment 10, and (*b*) is a diagram illustrating an arrangement of vertical electrodes.

Arrangement of Vertical Electrodes 106d (a) of FIG. 31 is a diagram illustrating a first basic shape 108d of a vertical electrode 106d included in a touch panel of Embodiment 10. (b) of FIG. 31 is a diagram illustrating a configuration of a vertical electrode 106d. The vertical electrodes 106d each correspond to a vertical electrode 106a (see FIG. 21) except for a grid pitch that is 7/5 times larger. Each first basic shape 108d is so arranged that the wiring path for fine wires in the upper half is connected to the wiring path for fine wires in the lower half at a junction Q4 narrowed to the width of a single fine wire. Each first basic shape 108d has line symmetry with respect to a vertical center line C1.

Figure 32:
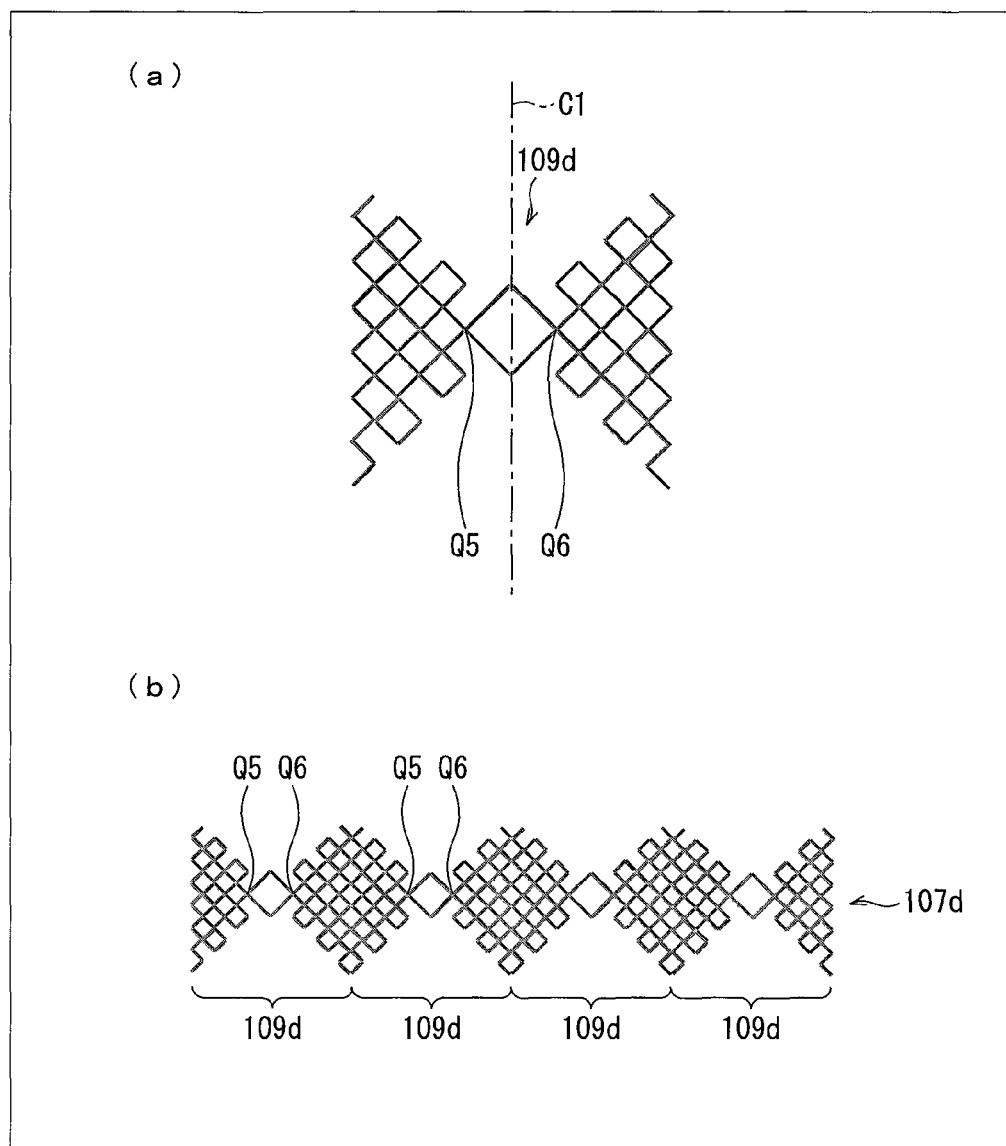
FIG. 32 (*a*) is a diagram illustrating a second basic shape of a horizontal electrode included in the touch panel of Embodiment 10, and (*b*) is a diagram illustrating an arrangement of horizontal electrodes.

(a) of FIG. 32 is a diagram illustrating a second basic shape 109d of a horizontal electrode 107d included in the touch panel of Embodiment 10. (b) of FIG. 32 is a diagram illustrating a configuration of a horizontal electrode 107d. The horizontal electrodes 107d each correspond to a horizontal electrode 107a (see FIG. 22) except for a grid pitch that is 7/5 times larger. Each second basic shape 109d is so arranged that (i) the wiring path for fine wires in a left portion is connected to the wiring path for fine wires in a central portion at a junction Q5 narrowed to the width of a single fine wire and that (ii) the wiring path for fine wires in the central portion is connected to the wiring path for fine wires in a right portion at a junction Q6 narrowed to the width of a single fine wire. Each second basic shape 109d has line symmetry with respect to the vertical center line C1.

Embodiment 11

Figure 33:
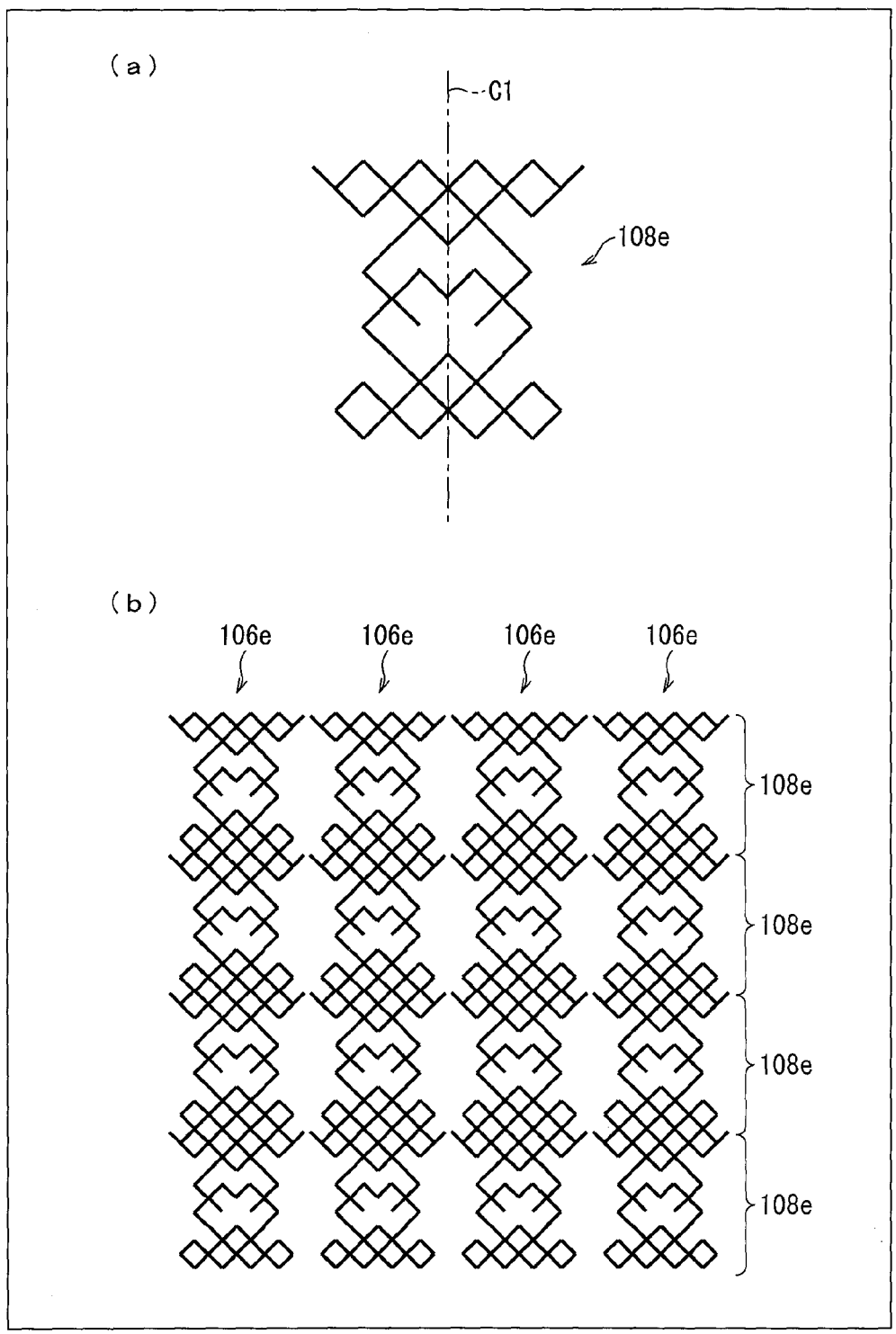
FIG. 33 (*a*) is a diagram illustrating a first basic shape of a vertical electrode included in a touch panel of Embodiment 11, and (*b*) is a diagram illustrating an arrangement of vertical electrodes.

Arrangement of Vertical Electrodes 106e (a) of FIG. 33 is a diagram illustrating a first basic shape 108e of a vertical electrode 106e included in a touch panel of Embodiment 11. (b) of FIG. 33 is a diagram illustrating a configuration of a vertical electrode 106e. The vertical electrodes 106e each include a sequence of a repeat of first basic shapes 108e each formed of fine wires, the first basic shapes 108e being connected to one another in the vertical direction. Each first basic shape 108e has line symmetry with respect to a vertical center line C1.

Each first basic shape 108e is so arranged that (i) the wiring path for fine wires in the upper half is connected to the wiring path for fine wires in the lower half not at a point narrowed to the width of a single fine wire and that (ii) the fine wires in the upper half are instead connected in the vertical direction to the fine wires in the lower half at two or more points along any horizontal line.

(Arrangement of Horizontal Electrodes 107e)

Figure 34:
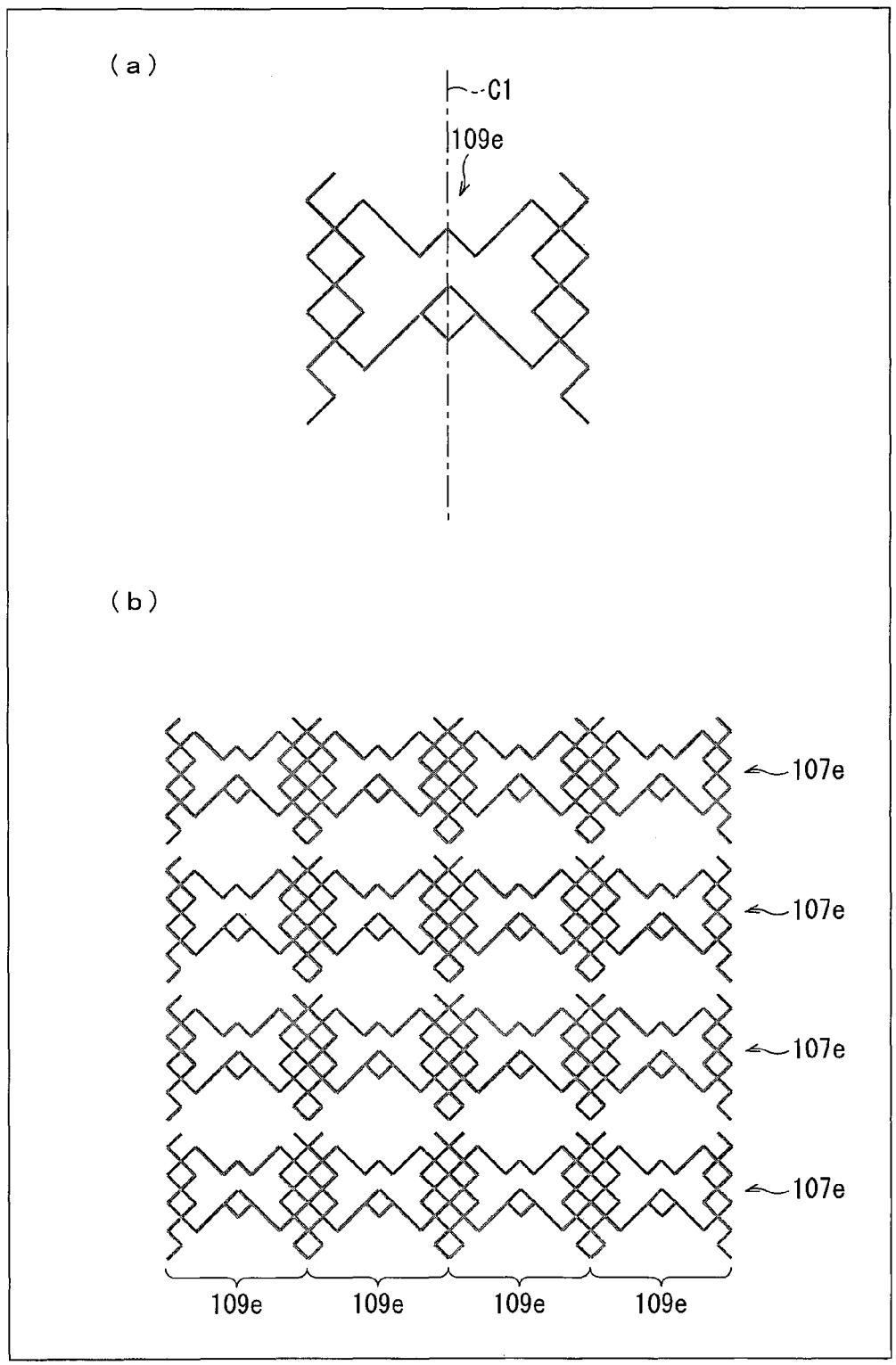
FIG. 34 (*a*) is a diagram illustrating a second basic shape of a horizontal electrode included in the touch panel of Embodiment 11, and (*b*) is a diagram illustrating an arrangement of horizontal electrodes.

(a) of FIG. 34 is a diagram illustrating a second basic shape 109e of a horizontal electrode 107e included in the touch panel of Embodiment 11. (b) of FIG. 34 is a diagram illustrating a configuration of a horizontal electrode 107e. The horizontal electrodes 107e each include a sequence of a repeat of second basic shapes 109e each formed of fine wires, the second basic shapes 109e being connected to one another in the horizontal direction. Each second basic shape 109e has line symmetry with respect to the vertical center line C1.

Each second basic shape 109e is so arranged that (i) the wiring path for fine wires in a left portion is connected to the wiring path for fine wires in a right portion not at a point narrowed to the width of a single fine wire and that (ii) the fine wires in the left portion are instead connected in the horizontal direction to the fine wires in the right portion at two or more points along any vertical line.

(Configuration of Grid 110e)

Figure 35:
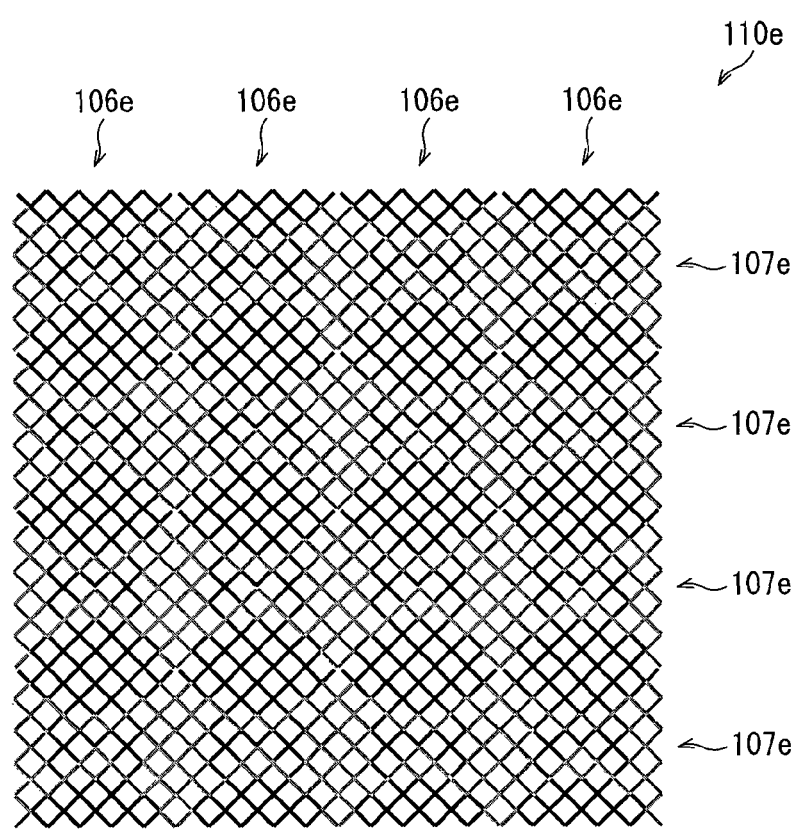
FIG. 35 is a diagram illustrating a uniform grid including the vertical electrodes and the horizontal electrode.

FIG. 35 is a diagram illustrating a uniform grid 110e including the vertical electrodes 106e and the horizontal electrodes 107e. The vertical electrodes 106e and the horizontal electrodes 107e are so disposed that as viewed in the direction perpendicular to the substrate 103 (see FIG. 17), the vertical electrodes 106e include no segment coincident with the horizontal electrodes 107e. The vertical electrodes 106e and the horizontal electrodes 107e are disposed uniformly to form a grid 110e with no gap. The grid 110e has an outline in a rectangular shape.

(Arrangement of Vertical Electrodes 106f)

Figure 36:
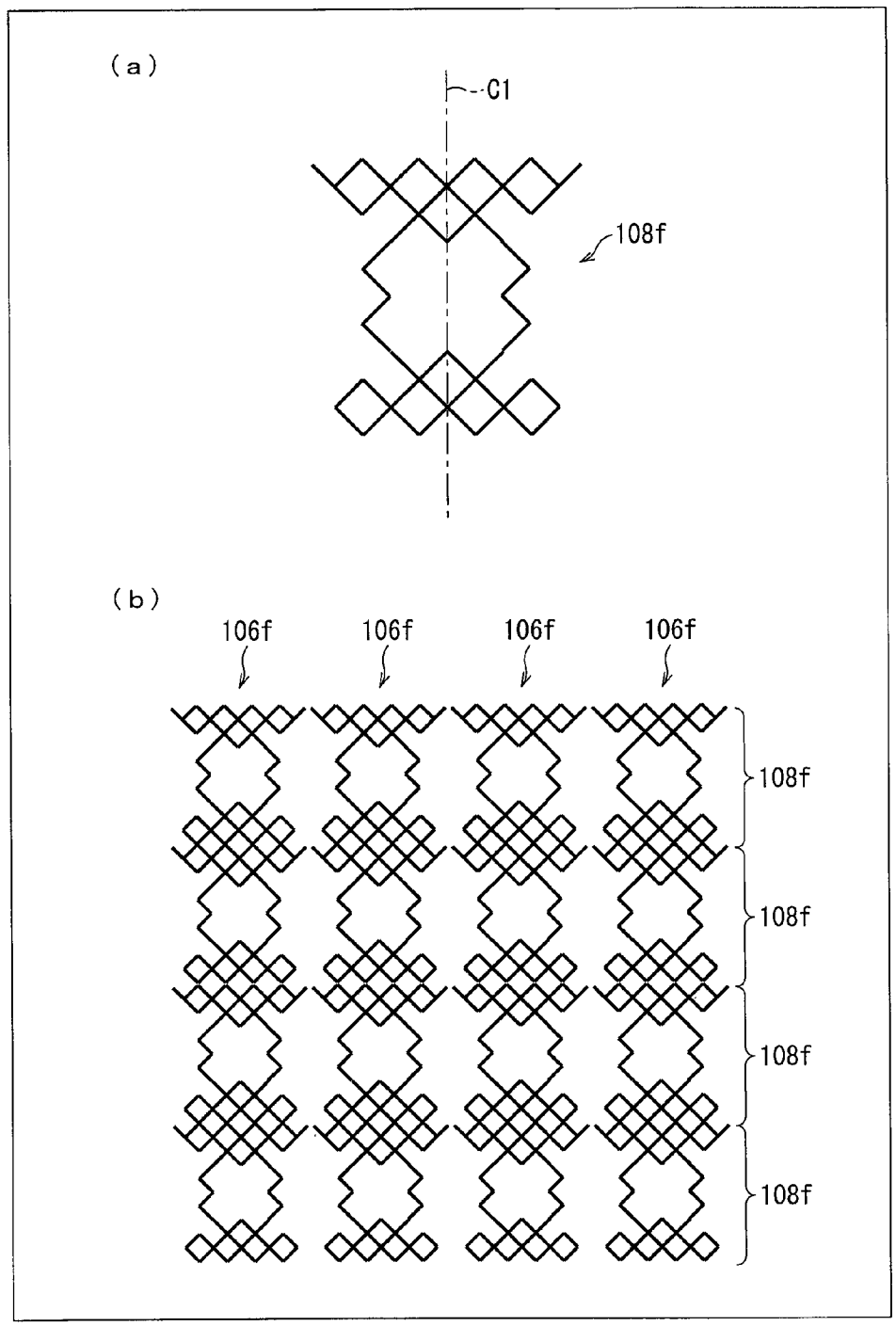
FIG. 36 (*a*) is a diagram illustrating a first basic shape of another vertical electrode included in the touch panel of Embodiment 11, and (*b*) is a diagram illustrating an arrangement of such other vertical electrodes.

(a) of FIG. 36 is a diagram illustrating a first basic shape 108f of another vertical electrode 106f included in the touch panel of Embodiment 11. (b) of FIG. 36 is a diagram illustrating a configuration of such another vertical electrode 106f. The vertical electrodes 106f each include a sequence of a repeat of first basic shapes 108f each formed of fine wires, the first basic shapes 108f being connected to one another in the vertical direction. Each first basic shape 108f has line symmetry with respect to a vertical center line C1.

As in the basic shapes 108e, each first basic shape 108f is so arranged that (i) the wiring path for fine wires in the upper half is connected to the wiring path for fine wires in the lower half not at a point narrowed to the width of a single fine wire and that (ii) the fine wires in the upper half are instead connected in the vertical direction to the fine wires in the lower half at two or more points along any horizontal line.

(Arrangement of Horizontal Electrodes 107f)

Figure 37:
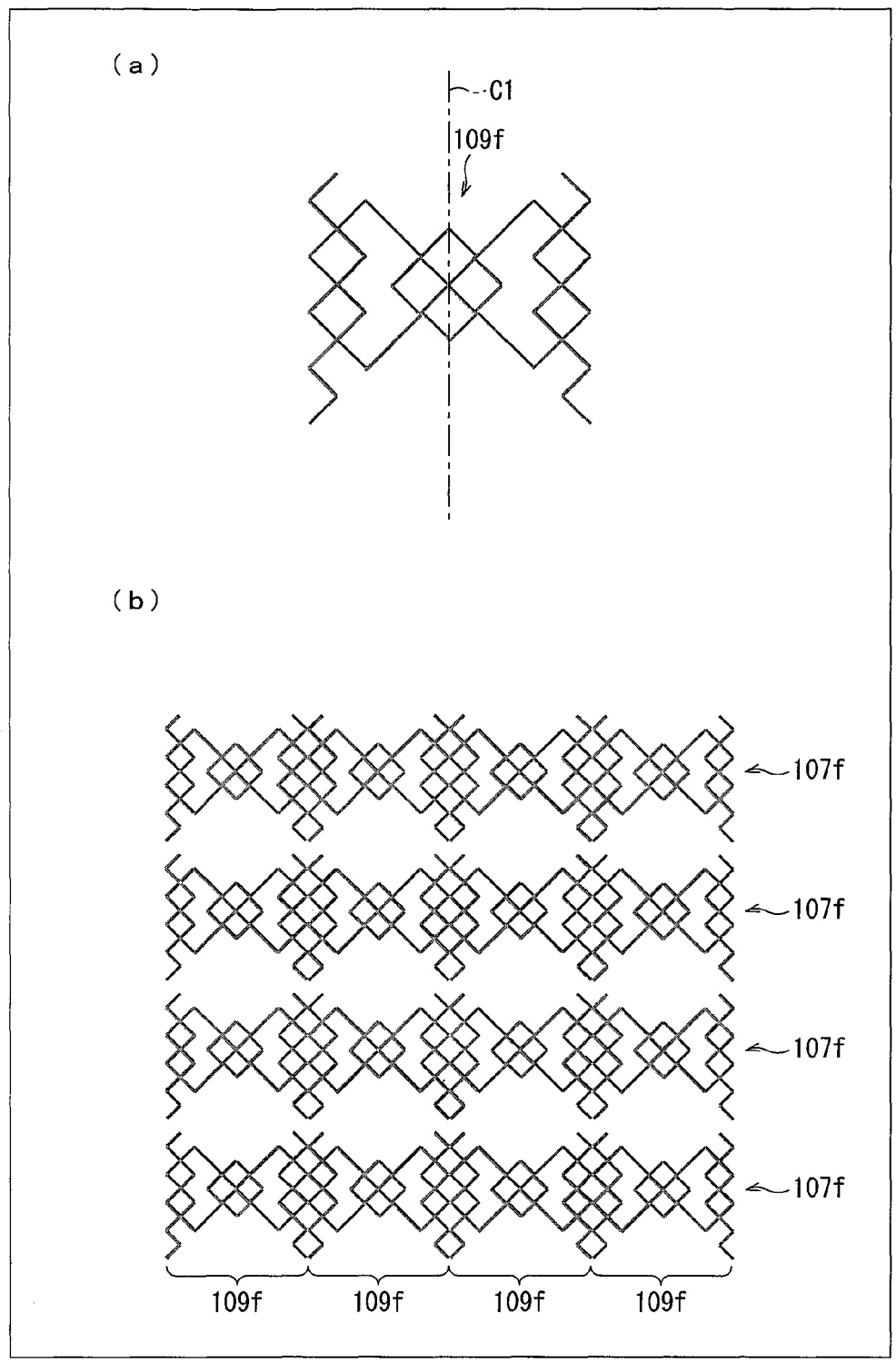
FIG. 37 (*a*) is a diagram illustrating a second basic shape of another horizontal electrode included in the touch panel of Embodiment 11, and (*b*) is a diagram illustrating an arrangement of such other horizontal electrodes.

(a) of FIG. 37 is a diagram illustrating a second basic shape 109f of another horizontal electrode 107f included in the touch panel of Embodiment 11. (b) of FIG. 37 is a diagram illustrating a configuration of such another horizontal electrode 107f. The horizontal electrodes 107f each include a sequence of a repeat of second basic shapes 109f each formed of fine wires, the second basic shapes 109f being connected to one another in the horizontal direction. Each second basic shape 109f has line symmetry with respect to the vertical center line C1.

Each second basic shape 109e is so arranged that (i) the wiring path for fine wires in a left portion is connected to the wiring path for fine wires in a right portion not at a point narrowed to the width of a single fine wire and that (ii) the fine wires in the left portion are instead connected in the horizontal direction to the fine wires in the right portion at two or more points along any vertical line.

The arrangement illustrated in FIG. 43 poses another inherent problem: The vertical electrodes 71 of (a) of FIG. 43 and the horizontal electrodes 1072 of (b) of FIG. 43 each have a point at which a wiring path is connected to another, the point being narrowed to the width of a single fine wire. If a fine wire is broken at such a point, narrowed to the width of a single fine wire, during production of a touch sensor panel, electric current is prevented from flowing through any of the connected electrodes. Thus, production involving the possibility of a broken fine wire problematically decreases the yield of the touch sensor panel.

In contrast, an embodiment of the present invention is so arranged that (i) none of the first basic shapes 108e and 108f and the second basic shapes 109e and 109f includes a point at which a wiring path is connected to another, the point being narrowed to the width of a single fine wire and that (ii) fine wires are instead connected to each other at two or more points along any vertical or horizontal line. Thus, even if one fine wire is broken during production, the remaining fine wire maintains connection. This arrangement can advantageously prevent disconnection in the vertical electrodes 106e and 106f and the horizontal electrodes 107e and 107f.

(Configurations of First Basic Shape 108g and Second Basic Shape 109g as Variation)

(a) of FIG. 38 is a diagram illustrating a first basic shape 108g as a variation. (b) of FIG. 38 is a diagram illustrating a second basic shape 109g as a variation.

Each first basic shape 108g is so arranged that (i) the wiring path for fine wires in the upper half is connected to the wiring path for fine wires in the lower half not at a point narrowed to the width of a single fine wire and that (ii) the fine wires in the upper half are instead connected in the vertical direction to the fine wires in the lower half at two or more points along any horizontal line. Each first basic shape 108g has point symmetry with respect to a center point P.

Each second basic shape 109g is so arranged that (i) the wiring path for fine wires in a left portion is connected to the wiring path for fine wires in a right portion not at a point narrowed to the width of a single fine wire and that (ii) the fine wires in the left portion are instead connected in the horizontal direction to the fine wires in the right portion at two or more points along any vertical line. Each second basic shape 109g has point symmetry with respect to the center point P.

(Configurations of First Basic Shape 108h and Second Basic Shape 109h as Another Variation)

Figure 39:
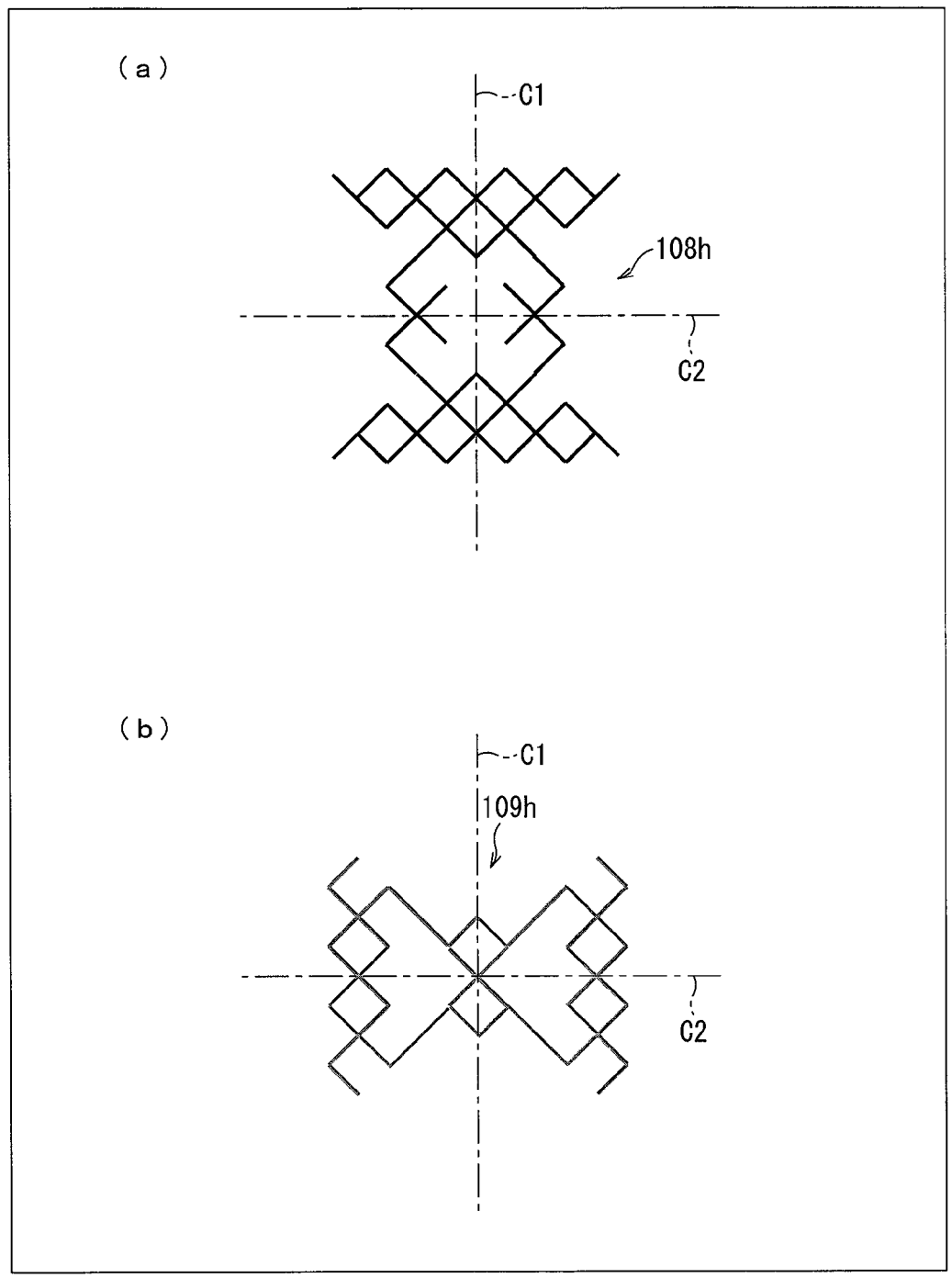
FIG. 39 (*a*) is a diagram illustrating a first basic shape of a vertical electrode included as another variation in the touch panel, and (*b*) is a diagram illustrating a second basic shape of a horizontal electrode included as another variation in the touch panel.

(a) of FIG. 39 is a diagram illustrating a first basic shape 108h as another variation. (b) of FIG. 39 is a diagram illustrating a second basic shape 109h as another variation.

Each first basic shape 108h is so arranged that (i) the wiring path for fine wires in the upper half is connected to the wiring path for fine wires in the lower half not at a point narrowed to the width of a single fine wire and that (ii) the fine wires in the upper half are instead connected in the vertical direction to the fine wires in the lower half at two or more points along any horizontal line. Each first basic shape 108h has line symmetry with respect to a vertical center line C1 and a horizontal center line C2.

Each second basic shape 109h is so arranged that (i) the wiring path for fine wires in a left portion is connected to the wiring path for fine wires in a right portion not at a point narrowed to the width of a single fine wire and that (ii) the fine wires in the left portion are instead connected in the horizontal direction to the fine wires in the right portion at two or more points along any vertical line. Each second basic shape 109h has line symmetry with respect to the vertical center line C1 and the horizontal center line C2.

Embodiment 12

Configuration of Electronic Blackboard 150

Figure 40:
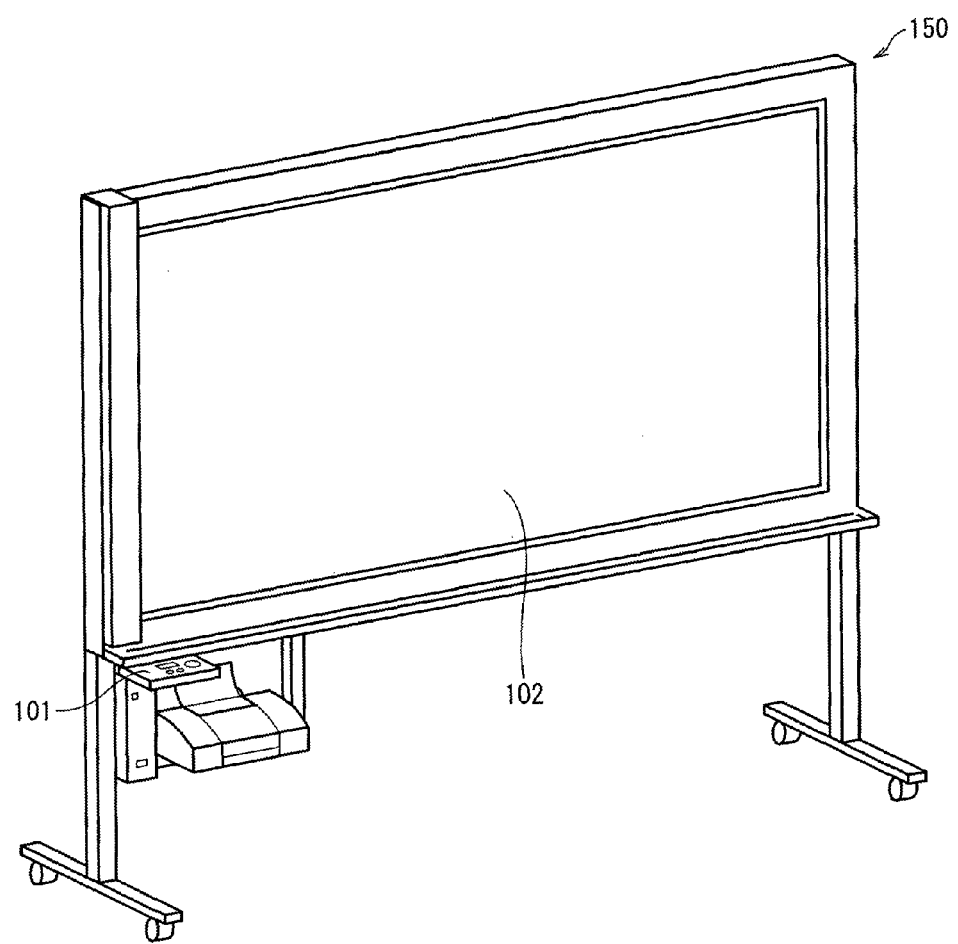
FIG. 40 is a diagram illustrating an appearance of an electronic blackboard of Embodiment 12.
Figure 41:
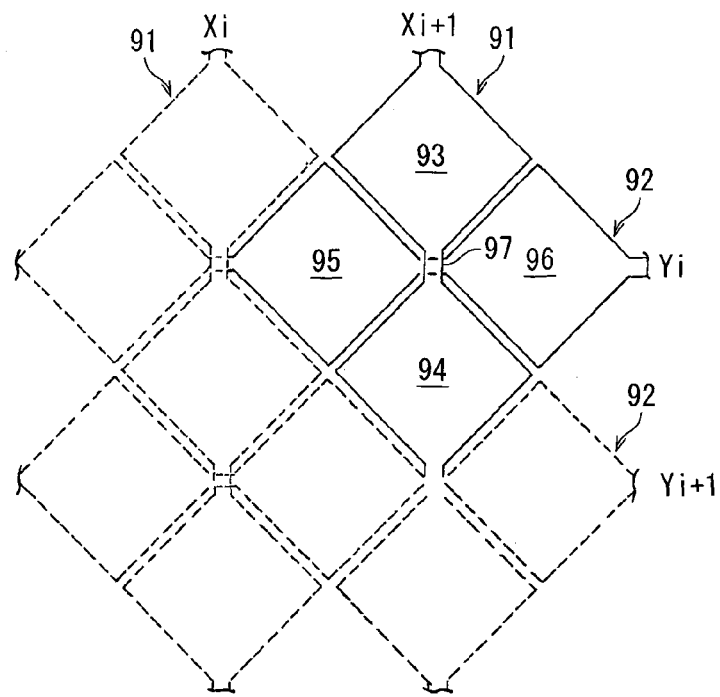
FIG. 41 is a diagram illustrating an arrangement of vertical electrodes and horizontal electrodes in a conventional capacitive touch sensor panel.

FIG. 40 is a diagram illustrating an appearance of an electronic blackboard 50 (information input-output device) of Embodiment 12. The electronic blackboard 150 includes a touch sensor system 101 of an embodiment of the present invention, the touch sensor system 101 in turn including a touch sensor panel 102 of an embodiment of the present invention. The touch sensor panel 102 is, for example, approximately 80 inches in size.

(Other Expressions of the Present Invention)

In order to solve the above problem, a linear system coefficient estimating method of the present invention includes the steps of: (A) (a) inputting, on a basis of M code sequences di (=di1, di2, . . . , diN, where i=1, . . . , M) which are orthogonal to one another and each of which has a length N, M inputs Xk (k=1, . . . , M) to a system which has a linear input and output and to which the M inputs Xk (k=1, . . . , M) are to be inputted, the system being represented by $$F(X1, \ldots, XM) = \sum_{i=1}^{M} (Ci \times Xi),$$

and (b) outputting N outputs s=(s1, s2, . . . , sN)=(F (di1, d21, . . . , dM1), F (d12, d22, . . . , dM2), . . . , F (d1N, d2N, . . . , dMN)); and (B) estimating, on a basis of an inner product operation of the outputs s and the code sequences di, a coefficient Ck corresponding to a k-th input Xk.

With the above feature, the linear system coefficient estimating method inputs M inputs Xk (k=1, . . . , M) on the basis of M code sequences di (=di1, di2, . . . , diN, where i=1, . . . , M) which are orthogonal to one another and each of which has a length N and outputs N outputs s=(s1, s2, . . . , sN)=(F (d11, d21, . . . , dM1), F (d12, d22, . . . , dM2), . . . , F (d1N, d2N, . . . , dMN)). The linear system coefficient estimating method thus estimates a coefficient Ck of the linear system by simultaneously inputting all the M inputs. The linear system coefficient estimating method consequently (i) eliminates the need to sequentially select one of M inputs and scan it for an input as in conventional arrangements and (ii) even with an increase in the number M of inputs, does not shorten a process time for obtaining a coefficient value of the linear system. The linear system coefficient estimating method thus maintains a good detection accuracy and achieves a good resolution and a high-speed operation.

Another linear system coefficient estimating method of the present invention includes the steps of: (A) (a) inputting, on a basis of M code sequences di (=di1, di2, . . . , diN, where i=M) which are orthogonal to one another and each of which has a length N, M inputs Xk (k=1, . . . , M) to each of a first system and a second system each of which has a linear input and output and to each of which the M inputs Xk (k=1, . . . , M) are to be inputted, the first and second systems being represented by $$F1(X1, \ldots, XM) = \sum_{i=1}^{M} (C1i \times Xi)$$

$$F2(X1, \ldots, XM) = \sum_{i=1}^{M} (C2i \times Xi),$$

and (b) outputting N outputs sFirst=(s11, s12, . . . , s1N)= (F1 (d11, d21, . . . , dM1), F1 (d12, d22, . . . , dM2), . . . , F1 (d1N, d2N, . . . , dMN)) from the first system and N outputs sSecond=(s21, s22, . . . , s2N)=(F2 (d11, d21, . . . , dM1), F2 (d12, d22, . . . , dM2), . . . , F2 (d1N, d2N, . . . , dMN)) from the second system; and (B) estimating (a) on a basis of a first inner product operation of the outputs sFirst and the code sequences di, a coefficient C1k of the first system which coefficient C1k corresponds to a k1-th input Xk and (b) on a basis of a second inner product operation of the outputs sSecond and the code sequences di, a coefficient C2k of the second system which coefficient C2k corresponds to a k2-th input Xk.

With the above feature, the linear system coefficient estimating method inputs M inputs xk (k=1, ..., M) on the basis of M code sequences di (=di1, di2, ..., diN, where i=1, ..., M) which are orthogonal to one another and each of which has a length N, and outputs N outputs sFirst=(s11, s12, ..., s1N)=(F1 (d11, d21, ..., dM1), F1 (d12, d22, ..., dM2), ..., F1 (d1N, d2N, ..., dMN)) from the first system and N outputs sSecond=(s21, s22, ..., s2N)=(F2 (d11, d21, ..., dM1), F2 (d12, d22, ..., dM2), ..., F2 (d1N, d2N, ..., dMN)) from the second system. The linear system coefficient estimating method thus estimates a coefficient C1k of the first system and a coefficient C2k of the second system by simultaneously inputting all the M inputs. The linear system coefficient estimating method consequently (i) eliminates the need to sequentially select one of M inputs and scan it for an input as in conventional arrangements and (ii) even with an increase in the number M of inputs, does not shorten a process time for obtaining coefficient values of the first and second linear systems. The linear system coefficient estimating method thus maintains a good detection accuracy and achieves a good resolution and a high-speed operation.

A linear device column value estimating method of the present invention includes the steps of: (A) (a) driving, on a basis of M code sequences di (=di1, di2, ..., diN, where i=1, ..., M) which are orthogonal to one another and each of which has a length N, M drive lines in parallel for each of (I) a first linear device column C (i=1, ..., M) formed between the M drive lines and a first sense line and (II) a second linear device column C2i (i=1, ..., M) formed between the M drive lines and a second sense line, and thus (b) outputting N outputs sFirst=(s11, s12, ..., s1N) from the first linear device column and N outputs sSecond=(s21, s22, ..., s2N) from the second linear device column; and (B) estimating (a) on a basis of a first inner product operation of the outputs sFirst and the code sequences di, a first linear device value in the first linear device column which first linear device value corresponds to a k1-th drive line and (b) on a basis of a second inner product operation of the outputs sSecond and the code sequences di, a second linear device value in the second linear device column which second linear device value corresponds to a k2-th drive line.

With the above feature, the linear device column value estimating method (a) drives M drive lines in parallel on the basis of M code sequences di (=di1, di2, ..., diN, where i=1, ..., M) which are orthogonal to one another and each of which has a length N, and (b) outputs N outputs sFirst=(s11, s12, ..., s1N) from the first linear device column and N outputs sSecond=(s21, s22, ..., s2N) from the second linear device column. The linear device column value estimating method thus estimates (a) a first linear device value in the first linear device column and (b) a second linear device value in the second linear device column by simultaneously driving all the M drive lines. The linear device column value estimating method consequently (i) eliminates the need to sequentially select one of M drive lines and scan it for an input as in conventional arrangements, and (ii) extends a process time for obtaining a first linear device value in the first linear device column and a second linear device value in the second linear device column. The linear device column value estimating method thus maintains a good detection accuracy and achieves a good resolution and a high-speed operation.

A capacitance detecting method of the present invention includes the steps of: (A) (a) driving, on a basis of code sequences di (=di1, di2, ..., diN, where i=1, ..., M) which are orthogonal to one another and include elements each being either +1 or −1 and each of which has a length N, M drive lines in parallel for each of (I) a first capacitance column C1i (i=1, ..., M) formed between the M drive lines and a first sense line and (II) a second capacitance column C2i (i=1, ..., M) formed between the M drive lines and a second sense line, so that a voltage +V is applied for an element of +1 in the code sequences and that a voltage −V is applied for an element of −1 in the code sequences, and thus (b) outputting outputs sFirst=(s11, s12, ..., s1N) from the first capacitance column and outputs sSecond=(s21, s22, ..., s2N) from the second capacitance column; and (B) estimating (a) on a basis of a first inner product operation of the outputs sFirst and the code sequences di, a first capacitance value in the first capacitance column which first capacitance value corresponds to a k1-th drive line and (b) on a basis of a second inner product operation of the outputs sSecond and the code sequences di, a second capacitance value in the second capacitance column which second capacitance value corresponds to a k2-th drive line.

With the above feature, the capacitance detecting method (a) drives, on the basis of code sequences di (=di1, di2, ..., diN, where i=1, ..., M) which are orthogonal to one another and include elements each being either +1 or −1 and each of which has a length N, M drive lines in parallel so that a voltage +V is applied for an element of +1 in the code sequences and that a voltage −V is applied for an element of −1 in the code sequences, and (b) outputs outputs sFirst=(s11, s12, ..., s1N) from the first capacitance column and outputs sSecond=(s21, s22, ..., s2N) from the second capacitance column. The capacitance detecting method thus estimates, by simultaneously driving all the M drive lines, (a) a first capacitance value in the first capacitance column which first capacitance value corresponds to the k1-th drive line and (b) a second capacitance value in the second capacitance column which second capacitance value corresponds to the k2-th drive line. The capacitance detecting method consequently (i) eliminates the need to sequentially select one of M drive lines and scan it for an input as in conventional arrangements, and (ii) extends a process time for obtaining (a) a first capacitance value in the first capacitance column which first capacitance value corresponds to the k1-th drive line and (b) a second capacitance value in the second capacitance column which corresponds to the k2-th drive line. The capacitance detecting method thus maintains a good detection accuracy and achieves a good resolution and a high-speed operation.

Further, the capacitance detecting method drives all the M drive lines in parallel each at either a voltage +V or a voltage −V in accordance with the code sequences. The capacitance detecting method thus (i) increases an amount of information contained in output signals from a capacitance column and (ii) improves a S/N ratio, as compared to the arrangement of Patent Literature 2, which groups the drive lines for driving in accordance with code sequences. The capacitance detecting method simply carries out a single-stage operation as compared to the arrangement of Patent Literature 2, which carries out a two-stage operation, and is consequently advantageous in achieving a high-speed operation.

An integrated circuit of the present invention includes: a drive section for (a) driving, on a basis of code sequences di (=di1, di2, ..., diN, where i=1, ..., M) which are orthogonal to one another and include elements each being either +1 or −1 and each of which has a length. N, M drive lines in parallel for each of (I) a first capacitance column C1i (i=1, ..., M) formed between the M drive lines and a first sense line and (II) a second capacitance column C2i (i=1, ..., M) formed between the M drive lines and a second sense line, so that a voltage +V is applied for an element of +1 in the code sequences and that a voltage −V is applied for an element of −1 in the code sequences, and thus (b) outputting outputs sFirst=(s11, s12, ..., s1N) from the first capacitance column and outputs sSecond=(s21, s22, ..., s2N) from the second capacitance column; and an estimation section for estimating (a) on a basis of a first inner product operation of the outputs sFirst and the code sequences di, a first capacitance value in the first capacitance column which first capacitance value corresponds to a k1-th drive line and (b) on a basis of a second inner product operation of the outputs sSecond and the code sequences di, a second capacitance value in the second capacitance column which second capacitance value corresponds to a k2-th drive line.

With the above feature, the drive section (a) drives, on the basis of code sequences di (=di1, di2, ..., diN, where i=1, ..., M) which are orthogonal to one another and include elements each being either +1 or −1 and each of which has a length N, M drive lines in parallel so that a voltage +V is applied for an element of +1 in the code sequences and that a voltage −V is applied for an element of −1 in the code sequences, and thus (b) outputs outputs sFirst=(s11, s12, ..., s1N) from the first capacitance column and outputs sSecond=(s21, s22, ..., s2N) from the second capacitance column. The integrated circuit thus estimates, by driving all the M drive lines, (a) a first capacitance value in the first capacitance column which first capacitance value corresponds to the k1-th drive line and (b) a second capacitance value in the second capacitance column which second capacitance value corresponds to the k2-th drive line. The integrated circuit for use in a capacitance detecting method consequently (i) eliminates the need to sequentially select one of M drive lines and scan it for an input as in conventional arrangements, and (ii) extends a process time for estimating (a) a first capacitance value in the first capacitance column which first capacitance value corresponds to the k1-th drive line and (b) a second capacitance value in the second capacitance column which corresponds to the k2-th drive line. The capacitance detecting method thus maintains a good detection accuracy and achieves a good resolution and a high-speed operation.

Further, the capacitance detecting method drives all the M drive lines in parallel each at either a voltage +V or a voltage −V in accordance with the code sequences. The capacitance detecting method thus (i) increases an amount of information contained in output signals from a capacitance column and (ii) improves a S/N ratio, as compared to the arrangement of Patent Literature 2, which groups the drive lines for driving in accordance with code sequences. The capacitance detecting method simply carries out a single-stage operation as compared to the arrangement of Patent Literature 2, which carries out a two-stage operation, and is consequently advantageous in achieving a high-speed operation.

A touch sensor system of the present invention includes: a sensor panel including (I) a first capacitance column C1i (i=1, ..., M) formed between M drive lines and a first sense line and (II) a second capacitance column C2i (i=1, ..., M) formed between the M drive lines and a second sense line; and an integrated circuit for controlling the sensor panel, the integrated circuit including: a drive section for (a) driving, on a basis of code sequences di (=di1, di2, ..., diN, where i=1, ..., M) which are orthogonal to one another and include elements each being either +1 or −1 and each of which has a length N, the M drive lines in parallel for each of (I) the first capacitance column C1i (i=1, ..., M) and (II) the second capacitance column C2i (i=1, ..., M) so that a voltage +V is applied for an element of +1 in the code sequences and that a voltage −V is applied for an element of −1 in the code sequences, and thus (b) outputting outputs sFirst=(s11, s12, ..., s1N) from the first capacitance column and outputs sSecond=(s21, s22, ..., s2N) from the second capacitance column; and an estimation section for estimating (a) on a basis of a first inner product operation of the outputs sFirst and the code sequences di, a first capacitance value in the first capacitance column which first capacitance value corresponds to a k1-th drive line and (b) on a basis of a second inner product operation of the outputs sSecond and the code sequences di, a second capacitance value in the second capacitance column which second capacitance value corresponds to a k2-th drive line.

With the above feature, the drive section (a) drives, on the basis of code sequences di (=di1, di2, ..., diN, where i=1, ..., M) which are orthogonal to one another and include elements each being either +1 or −1 and each of which has a length N, M drive lines in parallel so that a voltage +V is applied for an element of +1 in the code sequences and that a voltage −V is applied for an element of −1 in the code sequences, and thus (b) outputs outputs sFirst=(s11, s12, ..., s1N) from the first capacitance column and outputs sSecond=(s21, s22, ..., s2N) from the second capacitance column. The touch sensor system thus estimates, by driving all the M drive lines, (a) a first capacitance value in the first capacitance column which first capacitance value corresponds to the k1-th drive line and (b) a second capacitance value in the second capacitance column which second capacitance value corresponds to the k2-th drive line. The touch sensor system consequently (i) eliminates the need to sequentially select one of M drive lines and scan it for an input as in conventional arrangements, and (ii) extends a process time for estimating (a) a first capacitance value in the first capacitance column which first capacitance value corresponds to the k1-th drive line and (b) a second capacitance value in the second capacitance column which corresponds to the k2-th drive line. The capacitance detecting method thus maintains a good detection accuracy and achieves a good resolution and a high-speed operation.

Further, the capacitance detecting method drives all the M drive lines in parallel each at either a voltage +V or a voltage −V in accordance with the code sequences. The capacitance detecting method thus (i) increases an amount of information contained in output signals from a capacitance column and (ii) improves a S/N ratio, as compared to the arrangement of Patent Literature 2, which groups the drive lines for driving in accordance with code sequences. The capacitance detecting method simply carries out a single-stage operation as compared to the arrangement of Patent Literature 2, which carries out a two-stage operation, and is consequently advantageous in achieving a high-speed operation.

An electronic device of the present invention includes: the touch sensor system of the present invention; and a display panel which either is placed on the sensor panel included in the touch sensor system or contains the sensor panel.

With the above feature, the drive section (a) drives, on the basis of code sequences di (=di1, di2, ..., diN, where i=1, ..., M) which are orthogonal to one another and include elements each being either +1 or −1 and each of which has a length N, M drive lines in parallel so that a voltage +V is applied for an element of +1 in the code sequences and that a voltage −V is applied for an element of −1 in the code sequences, and thus (b) outputs outputs sFirst=(s11, s12, ..., s1N) from the first capacitance column and outputs sSecond=(s21, s22, ..., s2N) from the second capacitance column. The touch sensor system thus estimates, by driving all the M drive lines, (a) a first capacitance value in the first capacitance column which first capacitance value corresponds to the k1-th drive line and (b) a second capacitance value in the second capacitance column which second capacitance value corresponds to the k2-th drive line. The electronic device including the touch sensor system consequently (i) eliminates the need to sequentially select one of M drive lines and scan it for an input as in conventional arrangements, and (ii) extends a process time for estimating (a) a first capacitance value in the first capacitance column which first capacitance value corresponds to the k1-th drive line and (b) a second capacitance value in the second capacitance column which corresponds to the k2-th drive line. The capacitance detecting method thus maintains a good detection accuracy and achieves a good resolution and a high-speed operation.

Further, the capacitance detecting method drives all the M drive lines in parallel each at either a voltage +V or a voltage −V in accordance with the code sequences. The capacitance detecting method thus (i) increases an amount of information contained in output signals from a capacitance column and (ii) improves a S/N ratio, as compared to the arrangement of Patent Literature 2, which groups the drive lines for driving in accordance with code sequences. The capacitance detecting method simply carries out a single-stage operation as compared to the arrangement of Patent Literature 2, which carries out a two-stage operation, and is consequently advantageous in achieving a high-speed operation.

A capacitance detecting method of the present invention includes the steps of: (A) (a) driving, on a basis of code sequences di (=di1, di2, . . . , diN, where i=1, . . . , M) which are orthogonal to one another and Include elements each being either +1 or −1 and each of which has a length N, M drive lines in parallel for each of (I) a first capacitance column Ci1 (i=1, . . . , M) formed between the M drive lines and a first sense line and (II) a second capacitance column Ci2 (i=1, . . . , M) formed between the M drive lines and a second sense line, and thus (b) outputting, to an analog integrator, outputs sFirst=(s11, s12, . . . , s1N) from the first capacitance column and outputs sSecond=(s21, s22, . . . , s2N) from the second capacitance column; and (B) estimating (a) on a basis of a first inner product operation of the outputs sFirst and the code sequences di, a first capacitance value in the first capacitance column which first capacitance value corresponds to a k1-th drive line and (b) on a basis of a second inner product operation of the outputs sSecond and the code sequences di, a second capacitance value in the second capacitance column which second capacitance value corresponds to a k2-th drive line, the step (A) driving, when the analog integrator is reset, the M drive lines at a first voltage represented by a voltage Vref and driving, when the outputs sFirst and sSecond from the first and second capacitance columns are sampled, the M drive lines at (i) a second voltage for an element of +1 in the code sequences, the second voltage being represented by a voltage (Vref+V), and (ii) a third voltage for an element of −1 in the code sequences, the third voltage being represented by a voltage (Vref−V).

The above feature makes it possible to drive the drive lines in parallel with use of a simple configuration on the basis of code sequences.

A capacitance detecting method of the present invention includes the steps of: (A) (a) driving, on a basis of code sequences di (=di1, di2, . . . , diN, where i=1, . . . , M) which are orthogonal to one another and include elements each being either +1 or −1 and each of which has a length N, M drive lines in parallel for each of (I) a first capacitance column Ci1 (i=1, . . . , M) formed between the M drive lines and a first sense line and (II) a second capacitance column Ci2 (i=1, . . . , M) formed between the M drive lines and a second sense line, and thus (b) outputting, to an analog integrator, outputs sFirst=(s11, s12, . . . , s1N) from the first capacitance column and outputs sSecond=(s21, s22, . . . , s2N) from the second capacitance column; and (B) estimating (a) on a basis of a first inner product operation of the outputs sFirst and the code sequences di, a first capacitance value in the first capacitance column which first capacitance value corresponds to a k1-th drive line and (b) on a basis of a second inner product operation of the outputs sSecond and the code sequences di, a second capacitance value in the second capacitance column which second capacitance value corresponds to a k2-th drive line, the step (A), for an element of +1 in the code sequences, driving the drive lines at (i) a first voltage when the analog integrator is reset and (ii) a second voltage when the outputs sFirst and sSecond from the first and second capacitance columns are sampled and, for an element of −1 in the code sequences, driving the drive lines at (i) the second voltage when the analog integrator is reset and (ii) the first voltage when the outputs sFirst and sSecond from the first and second capacitance columns are sampled.

The above feature makes it possible to achieve a higher signal intensity and thus increase an electric charge stored in a capacitance.

A capacitance detecting method of the present invention includes the steps of: (A) (a) driving, on a basis of code sequences di (=di1, di2, . . . , diN, where i=1, . . . , M) which are orthogonal to one another and include elements each being either +1 or −1 and each of which has a length N, M drive lines in parallel for each of (I) a first capacitance column Ci1 (i=1, . . . , M) formed between the M drive lines and a first sense line and (II) a second capacitance column Ci2 (i=1, . . . , M) formed between the M drive lines and a second sense line, and thus (b) outputting, to an analog integrator, outputs sFirst=(s11, s12, . . . , s1N) from the first capacitance column and outputs sSecond=(s21, s22, . . . , s2N) from the second capacitance column; and (B) estimating (a) on a basis of a first inner product operation of the outputs sFirst and the code sequences di, a first capacitance value in the first capacitance column which first capacitance value corresponds to a k1-th drive line and (b) on a basis of a second inner product operation of the outputs sSecond and the code sequences di, a second capacitance value in the second capacitance column which second capacitance value corresponds to a k2-th drive line, the capacitance detecting method further including, before the step (A), the step of: (C) (a) driving, when the analog integrator is reset and when the outputs sFirst and sSecond from the first and second capacitance columns are sampled, the drive lines at a first voltage so that the outputs sFirst and sSecond from the first and second capacitance columns are outputted to the analog integrator, (b) reading out, from the analog integrator, the outputs sFirst and sSecond from the first and second capacitance columns as first offset outputs and second offset outputs, respectively, and (c) storing the first and second offset outputs in a memory.

The above feature makes it possible to cancel an offset caused by an analog integrator.

An integrated circuit of the present invention includes: a drive section for (a) driving, on a basis of code sequences di (=di1, di2, . . . , diN, where i=1, . . . , M) which are orthogonal to one another and include elements each being either +1 or −1 and each of which has a length N, M drive lines in parallel for each of (I) a first capacitance column Ci1 (i=1, . . . , M) formed between the M drive lines and a first sense line and (II) a second capacitance column Ci2 (i=1, . . . , M) formed between the M drive lines and a second sense line, and thus (b) outputting, to an analog integrator, outputs sFirst=(s11, s12, . . . , s1N) from the first capacitance column and outputs sSecond=(s21, s22, ..., s2N) from the second capacitance column; and an estimation section for estimating (a) on a basis of a first inner product operation of the outputs sFirst and the code sequences di, a first capacitance value in the first capacitance column which first capacitance value corresponds to a k1-th drive line and (b) on a basis of a second inner product operation of the outputs sSecond and the code sequences di, a second capacitance value in the second capacitance column which second capacitance value corresponds to a k2-th drive line, the drive section, for an element of +1 in the code sequences, driving the drive lines at (i) a first voltage when the analog integrator is reset and (ii) a second voltage when the outputs sFirst and sSecond from the first and second capacitance columns are sampled and, for an element of −1 in the code sequences, driving the drive lines at (i) the second voltage when the analog integrator is reset and (ii) the first voltage when the outputs sFirst and sSecond from the first and second capacitance columns are sampled.

The above feature makes it possible to achieve a higher signal intensity and thus increase an electric charge stored in a capacitance.

An integrated circuit of the present invention includes: a drive section for (a) driving, on a basis of code sequences di (=di1, di2, ..., diN, where i=1, ..., M) which are orthogonal to one another and include elements each being either +1 or −1 and each of which has a length N, M drive lines in parallel for each of (I) a first capacitance column Ci1 (i=1, ..., M) formed between the M drive lines and a first sense line and (II) a second capacitance column Ci2 (i=1, ..., M) formed between the M drive lines and a second sense line, and thus (b) outputting, to an analog integrator, outputs sFirst=(s11, s12, ..., s1N) from the first capacitance column and outputs sSecond=(s21, s22, ..., s2N) from the second capacitance column; and an estimation section for estimating (a) on a basis of a first inner product operation of the outputs sFirst and the code sequences di, a first capacitance value in the first capacitance column which first capacitance value corresponds to a k1-th drive line and (b) on a basis of a second inner product operation of the outputs sSecond and the code sequences di, a second capacitance value in the second capacitance column which second capacitance value corresponds to a k2-th drive line, the drive section, before outputting the outputs sFirst and sSecond from the first and second capacitance columns to the analog integrator, (a) driving, when the analog integrator is reset and when the outputs sFirst and sSecond from the first and second capacitance columns are sampled, the drive lines at a first voltage so that the outputs sFirst and sSecond from the first and second capacitance columns are outputted to the analog integrator, (b) reading out, from the analog integrator, the outputs sFirst and sSecond from the first and second capacitance columns as first offset outputs and second offset outputs, respective, and (c) storing the first and second offset outputs in a memory.

The above feature makes it possible to cancel an offset caused by an analog integrator.

A touch sensor system of the present invention includes: a sensor panel including (I) a first capacitance column Ci1 (i=1, ..., M) formed between M drive lines and a first sense line and (II) a second capacitance column Ci2 (i=1, ..., M) formed between the M drive lines and a second sense line; and an integrated circuit for controlling the sensor panel, the integrated circuit including: a drive section for (a) driving, on a basis of code sequences di (=di1, di2, ..., diN, where i=1, ..., M) which are orthogonal to one another and include elements each being either +1 or −1 and each of which has a length N, the M drive lines in parallel for each of (I) the first capacitance column Ci1 (i=1, ..., M) and (II) the second capacitance column Ci2 (i=1, ..., M), and thus (b) outputting, to an analog integrator, outputs sFirst=(s11, s12, ..., s1N) from the first capacitance column and outputs sSecond=(s21, s22, ..., s2N) from the second capacitance column; and an estimation section for estimating (a) on a basis of a first inner product operation of the outputs sFirst and the code sequences di, a first capacitance value in the first capacitance column which first capacitance value corresponds to a k1-th drive line and (b) on a basis of a second inner product operation of the outputs sSecond and the code sequences di, a second capacitance value in the second capacitance column which second capacitance value corresponds to a k2-th drive line, the drive section, for an element of +1 in the code sequences, driving the drive lines at (i) a first voltage when the analog integrator is reset and (ii) a second voltage when the outputs sFirst and sSecond from the first and second capacitance columns are sampled and, for an element of −1 in the code sequences, driving the drive lines at (i) the second voltage when the analog integrator is reset and (ii) the first voltage when the outputs sFirst and sSecond from the first and second capacitance columns are sampled.

The above feature makes it possible to achieve a higher signal intensity and thus increase an electric charge stored in a capacitance.

A touch sensor system of the present invention includes: a sensor panel including (I) a first capacitance column Ci1 (i=1, ..., M) formed between M drive lines and a first sense line and (II) a second capacitance column Ci2 (i=1, ..., M) formed between the M drive lines and a second sense line; and an integrated circuit for controlling the sensor panel, the integrated circuit including: a drive section for (a) driving, on a basis of code sequences di (=di1, di2, ..., diN, where i=1, ..., M) which are orthogonal to one another and include elements each being either +1 or −1 and each of which has a length N, the M drive lines in parallel for each of (I) the first capacitance column Ci1 (i=1, ..., M) and (II) the second capacitance column Ci2 (i=1, ..., M), and thus (b) outputting, to an analog integrator, outputs sFirst=(s11, s12, ..., s1N) from the first capacitance column and outputs sSecond=(s21, s22, ..., s2N) from the second capacitance column; and an estimation section for estimating (a) on a basis of a first inner product operation of the outputs sFirst and the code sequences di, a first capacitance value in the first capacitance column which first capacitance value corresponds to a k1-th drive line and (b) on a basis of a second inner product operation of the outputs sSecond and the code sequences di, a second capacitance value in the second capacitance column which second capacitance value corresponds to a k2-th drive line, the drive section, before outputting the outputs sFirst and sSecond from the first and second capacitance columns to the analog integrator, (a) driving, when the analog integrator is reset and when the outputs sFirst and sSecond from the first and second capacitance columns are sampled, the drive lines at a first voltage so that the outputs sFirst and sSecond from the first and second capacitance columns are outputted to the analog integrator, (b) reading out, from the analog integrator, the outputs sFirst and sSecond from the first and second capacitance columns as first offset outputs and second offset outputs, respective, and (c) storing the first and second offset outputs in a memory.

The above feature makes it possible to cancel an offset caused by an analog integrator.

An electronic device of the present invention includes: a touch sensor system of the present invention; and a display panel which either is placed on the sensor panel included in the touch sensor system or contains the sensor panel.

A capacitance detecting method of the present invention includes the steps of: (A) (a) driving, on a basis of code sequences di (=di1, di2, . . . , diN, where i=1, . . . , M) which are orthogonal to one another and include elements each being either +1 or −1 and each of which has a length N, M drive lines in parallel for each of (I) a first capacitance column Ci1 (i=1, . . . , M) formed between the M drive lines and a first sense line and (II) a second capacitance column Ci2 (i=1, . . . , M) formed between the M drive lines and a second sense line, so that a voltage +V is applied for an element of +1 in the code sequences and that a voltage −V is applied for an element of −1 in the code sequences, and thus (b) outputting, to an analog integrator, outputs sFirst=(s11, s12, . . . , s1N) from the first capacitance column and outputs sSecond=(s21, s22, . . . , s2N) from the second capacitance column; and (B) estimating (a) on a basis of a first inner product operation of the outputs sFirst and the code sequences di, a first capacitance value in the first capacitance column which first capacitance value corresponds to a k1-th drive line and (b) on a basis of a second inner product operation of the outputs sSecond and the code sequences di, a second capacitance value in the second capacitance column which second capacitance value corresponds to a k2-th drive line, the step (A), to prevent saturation of the analog integrator, switching a gain of the analog integrator in accordance with an absolute value of a sum total of corresponding elements present in the code sequences along a column direction.

The above feature makes it possible to prevent saturation of an analog integrator.

A capacitance detecting method of the present invention includes the steps of: (A) (a) driving, on a basis of code sequences di (=di1, di2, . . . , diN, where i=1, . . . , M) which are orthogonal to one another and include elements each being either +1 or −1 and each of which has a length N, M drive lines in parallel for each of (I) a first capacitance column Ci1 (i=1, . . . , M) formed between the M drive lines and a first sense line and (II) a second capacitance column Ci2 (i=1, . . . , M) formed between the M drive lines and a second sense line, so that a voltage +V is applied for an element of +1 in the code sequences and that a voltage −V is applied for an element of −1 in the code sequences, and thus (b) outputting, to an analog integrator, outputs sFirst=(s11, s12, . . . , s1N) from the first capacitance column and outputs sSecond=(s21, s22, . . . , s2N) from the second capacitance column; and (B) estimating (a) on a basis of a first inner product operation of the outputs sFirst and the code sequences di, a first capacitance value in the first capacitance column which first capacitance value corresponds to a k1-th drive line and (b) on a basis of a second inner product operation of the outputs sSecond and the code sequences di, a second capacitance value in the second capacitance column which second capacitance value corresponds to a k2-th drive line, the step (A), to prevent saturation of the analog integrator, dividing, in accordance with an absolute value of a sum total of corresponding elements present in the code sequences along a column direction, a column of the code sequences into a plurality of columns so as to divide the driving of the M drive lines into a plurality of drivings.

The above feature makes it possible to prevent saturation of an analog integrator.

A capacitance detecting method of the present invention includes the steps of: (A) (a) driving, on a basis of code sequences di (=di1, di2, . . . , diN, where i=1, . . . , M) which are orthogonal to one another and include elements each being +1 or −1 and each of which has a code length N=M, the code sequences di corresponding to respective rows of a $2^n$-dimensional Hadamard matrix created by Sylvester method, (M=$2^n$) drive lines in parallel for each of (I) a first capacitance column Ci1 (i=1, . . . , M) formed between the (M=$2^n$) drive lines and a first sense line and (II) a second capacitance column Ci2 (i=1, . . . , M) formed between the (M=$2^n$) drive lines and a second sense line, so that a voltage +V is applied for an element of +1 in the code sequences and that a voltage −V is applied for an element of −1 in the code sequences, and thus (b) outputting, to an analog integrator, outputs sFirst=(s11, s12, . . . , s1N) from the first capacitance column and outputs sSecond=(s21, s22, . . . , s2N) from the second capacitance column; and (B) estimating (a) on a basis of a first inner product operation of the outputs sFirst and the code sequences di, a first capacitance value in the first capacitance column which first capacitance value corresponds to a k1-th drive line and (b) on a basis of a second inner product operation of the outputs sSecond and the code sequences di, a second capacitance value in the second capacitance column which second capacitance value corresponds to a k2-th drive line, the step (A), to prevent saturation of the analog integrator, dividing a first column of the code sequences into a plurality of columns so as to divide a driving for the first column of the code sequences into a plurality of drivings.

The above feature makes it possible to prevent saturation of an analog integrator.

A capacitance detecting method of the present invention includes the steps of: (A) (a) driving, on a basis of first code sequences di (=di1, di2, . . . , diN, where i=1, . . . , M) which are orthogonal to one another and include elements each being +1 or −1 and each of which has a code length N>M, the first code sequences di corresponding to respective rows of a $2^n$-dimensional (where M<$2^n$) Hadamard matrix created by Sylvester method, M drive lines in parallel for each of (I) a first capacitance column Ci1 (i=1, . . . , M) formed between the M drive lines and a first sense line and (II) a second capacitance column Ci2=M) formed between the M drive lines and a second sense line, so that a voltage +V is applied for an element of +1 in the first code sequences and that a voltage −V is applied for an element of −1 in the first code sequences, and thus (b) outputting, to an analog integrator, outputs sFirst=(s11, s12, . . . , s1N) from the first capacitance column and outputs sSecond=(s21, s22, . . . , s2N) from the second capacitance column; and (B) estimating (a) on a basis of a first inner product operation of the outputs sFirst and the first code sequences di, a first capacitance value in the first capacitance column which first capacitance value corresponds to a k1-th drive line and (b) on a basis of a second inner product operation of the outputs sSecond and the first code sequences di, a second capacitance value in the second capacitance column which second capacitance value corresponds to a k2-th drive line, the step (A) dividing a particular column of the first code sequences into a plurality of columns, the particular column having an absolute value of a sum total of corresponding elements present in the first code sequences along a column direction which absolute value exceeds a threshold Num for saturation of the analog integrator, so as to divide a driving for the particular column into a plurality of drivings.

The above feature makes it possible to prevent saturation of an analog integrator in a driving based on a $2^n$-dimensional (where M<$2^{n-1}$) Hadamard matrix.

The linear system coefficient estimating method of the present invention inputs M inputs Xk (k=1, . . . , M) on the basis of M code sequences di (=di1, di2, . . . , diN, where i=1, . . . , M) which are orthogonal to one another and each of which has a length N and outputs N outputs s=(s1, s2, . . . , sN)=(F (d11, d21, . . . , dM1), F (d12, d22, . . . , dM2), . . . , F (d1N, d2N, . . . , dMN)). The linear system coefficient estimating method thus estimates a coefficient Ck of the linear system by simultaneously inputting all the M inputs. The linear system coefficient estimating method consequently (i) eliminates the need to sequentially select one of M inputs and scan it for an input as in conventional arrangements and (ii) even with an increase in the number M of inputs, does not shorten a process time for obtaining a coefficient value of the linear system. The linear system coefficient estimating method thus maintains a good detection accuracy and achieves a good resolution and a high-speed operation.

The linear device column value estimating method of the present embodiment may preferably be arranged such that the code sequences di (=di1, di2, ..., diN, where i=1, ..., M) include elements each of which is either +V or −V.

The above arrangement makes it possible to drive each drive line by applying to it either a voltage +V or a voltage −V.

The capacitance detecting method of the present embodiment may preferably be arranged such that the step (B) includes carrying out, for each parallel driving based on the code sequences di, of addition or subtraction in accordance with a code which addition or subtraction is necessary for the first and second inner product operations.

The above arrangement carries out an inner product operation for each parallel driving. The capacitance detecting method thus not only (i) allows pipeline processing and consequently carries out an operation within a short period of time, but also (ii) reduces an amount of memory necessary to carry out an operation, as compared to an arrangement which carries out an inner product operation for each of N parallel drivings corresponding to the length of the code sequences.

The capacitance detecting method may preferably be arranged such that the step (A) outputs the outputs sFirst from the first capacitance column to a first analog integrator and the outputs sSecond from the second capacitance column to a second analog integrator; and the step (B) carries out (I) the first inner product operation by subjecting the outputs sFirst, which have been outputted to the first analog integrator, to an AD conversion in an AD converter and (II) the second inner product operation by subjecting the outputs sSecond, which have been outputted to the second analog integrator, to an AD conversion in the AD converter.

The above arrangement provides analog integrators in parallel for the respective sense lines, and thus increases a speed of detecting all the capacitances provided in a matrix.

The capacitance detecting method may preferably be arranged such that the step (A) first outputs the outputs sFirst from the first capacitance column to an analog integrator and second outputs the outputs sSecond from the second capacitance column to the analog integrator; and the step (B) carries out (I) the first inner product operation by subjecting the outputs sFirst, which have been outputted to the analog integrator, to an AD conversion in an AD converter and (II) the second inner product operation by subjecting the outputs sSecond, which have been outputted to the analog integrator, to an AD conversion in the AD converter.

The above arrangement allows a single analog integrator to carry out the estimating, and thus makes it possible to detect the capacitances with use of a simpler configuration.

The capacitance detecting method may preferably be arranged such that the step (A) outputs the outputs sFirst from the first capacitance column to a first analog integrator and the outputs sSecond from the second capacitance column to a second analog integrator; and the step (B) carries out (I) the first inner product operation by subjecting the outputs sFirst, which have been outputted to the first analog integrator, to an AD conversion in a first AD converter and (II) the second inner product operation by subjecting the outputs sSecond, which have been outputted to the second analog integrator, to an AD conversion in a second AD converter.

The above arrangement provides both analog integrators and AD converters in parallel for the respective sense lines, and thus further increases the speed of detecting all the capacitances provided in a matrix.

The capacitance detecting method of the present embodiment may preferably be arranged such that the step (B) estimates (a) the first capacitance value on a basis of a third inner product operation of (I) a result obtained by subtracting, from the outputs sFirst, the first offset outputs stored in the memory and (II) the code sequences di and (b) the second capacitance value on a basis of a fourth inner product operation of (I) a result obtained by subtracting, from the outputs sSecond, the second offset outputs stored in the memory and (II) the code sequences di.

The above arrangement makes it possible to cancel an offset caused by an analog integrator.

The capacitance detecting method of the present embodiment may preferably be arranged such that the step (C) (I) repeats a plurality of times an operation of (a) driving, when the analog integrator is reset and when the outputs sFirst and sSecond from the first and second capacitance columns are sampled, the drive lines at the first voltage so that the outputs sFirst and sSecond from the first and second capacitance columns are outputted to the analog integrator and (b) reading out, from the analog integrator, the outputs sFirst and sSecond from the first and second capacitance columns as the first offset outputs and the second offset outputs, respectively, and (II) averages a plurality of sets of the first and second offset outputs read out and then stores in the memory a result of the averaging.

The above arrangement makes it possible to store offset outputs in a memory after reducing a noise component contained in an offset caused by an analog integrator.

The capacitance detecting method of the present embodiment may preferably be arranged such that the step (B) estimates (a) the first capacitance value on a basis of a third inner product operation of (I) a first digital value obtained by an AD conversion of the outputs sFirst and (II) the code sequences di and (b) the second capacitance value on a basis of a fourth inner product operation of (I) a second digital value obtained by an AD conversion of the outputs sSecond and (II) the code sequences di; and the step (B) switches weighting for each of the first and second digital values in accordance with the absolute value of a sum total of corresponding elements present in the code sequences along the column direction.

The above arrangement makes it possible to cause a gain obtained on a path from an analog integrator through to the inner product computing section to be constant for each driving based on the code sequences.

The capacitance detecting method of the present embodiment may preferably be arranged such that a column having an absolute value of a sum total of corresponding elements present in the first code sequences along a column direction which absolute value exceeds a threshold Num for saturation of the analog integrator corresponds to at least one of a first column, a $(2^{n-1}+1)$ column, a $(2^{n-1}+2^{n-2}+1)$ column, and a $(2^{n-1}-2^{n-2}+1)$ column of the $2^n$-dimensional Hadamard matrix.

The above arrangement makes it possible to prevent, with use of a simple algorithm, saturation of an analog integrator in a driving based on a $2^n$-dimensional (where $M<2^n$) Hadamard matrix.

The capacitance detecting method of the present embodiment may preferably be arranged such that where [x] represents an integer part of x, the step (A), in a case where the first column of the $2^n$-dimensional Hadamard matrix exceeds the threshold Num, first (a) sequentially drives [M/Num] sets each including NuM drive lines from a first drive line through to a Num×[M/Num]-th drive line and then (b) drives in parallel drive lines corresponding to a remainder of the (M/Num); the step (A), in a case where the $(2^{n-1}+1)$ column of the Hadamard matrix exceeds the threshold Num, first (a) drives in parallel a drive line on a row based on a $(2^{n-1}-(M-2^{n-1}))$-th row through a drive line on an M-th row, second (b) sequentially drives [row based on a $(2^{n-1}-(M-2^{n-1})-1)$-th row/Num] sets each including NuM drive lines from the drive line on a first row through to a drive line on the row based on a $(2^{n-1}-(M-2^{n-1})-1)$-th row, and third (c) drives in parallel drive lines corresponding to a remainder of the (row based on a $(2^{n-1}-(M-2^{n-1})-1)$-th row/Num); and the step (A), in a case where the $(2^{n-1}+2^{n-2}+1)$ column of the Hadamard matrix exceeds the threshold Num, first (a) simultaneously drives in parallel the drive line on the first row through a drive line on a $(2^{n-1})$-th row, second (b) drives in parallel a drive line on a row based on a $((2^{n-1}+2^{n-2})-(M-(2^{n-1}+2^{n-2})))$-th row through a drive line on the M-th row, third (c) sequentially drives [(row based on $(((2^{n-1}+2^{n-2})-(M-(2^{n-1}+2^{n-2}))))-(2^{n-1}+1)$/Num] sets each including NuM drive lines from a drive line on a $(2^{n-1}+1)$-th row through to the drive line on the row based on the $((2^{n-1}+2^{n-2})-(M-(2^{n-1}+2^{n-2})))$-th row, and fourth (d) drives in parallel drive lines corresponding to a remainder of the ((row based on $(((2^{n-1}+2^{n-2})-(M-(2^{n-1}+2^{n-2})))))-(2^{n-1}+1)$/Num).

The above arrangement makes it possible to prevent, with use of a simple algorithm, saturation of an analog integrator in a driving based on a $2^n$-dimensional (where $M<2^n$) Hadamard matrix.

The capacitance detecting method of the present embodiment may preferably further include: the step of: creating, by switching rows, second code sequences based on the Hadamard matrix, wherein: the step (A) drives the M drive lines in parallel on a basis of the second code sequences.

A capacitive touch sensor panel of the present invention includes: a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction; a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction; and an insulator provided between the vertical electrode surface and the horizontal electrode surface so as to insulate the plurality of vertical electrodes and the plurality of horizontal electrodes from each other, the plurality of vertical electrodes and the plurality of horizontal electrodes (i) being disposed so that, as viewed in a direction perpendicular to the vertical electrode surface, the plurality of vertical electrodes include no segment coincident with the plurality of horizontal electrodes and (ii) forming a uniform grid having no gap.

The above arrangement disposes (I) a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction and (II) a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction so that (i) as viewed in a direction perpendicular to the vertical electrode surface, the plurality of vertical electrodes include no segment coincident with the plurality of horizontal electrodes and that (ii) the plurality of vertical electrodes and the plurality of horizontal electrodes form a uniform grid having no gap. Thus, preparing an electrode distribution with (i) the vertical electrodes, (ii) the horizontal electrodes, and (iii) an insulating film sandwiched therebetween forms a uniform grid having no visible gap. Such an electrode distribution, as placed on a display device, can prevent moire and the like from occurring.

A capacitive touch sensor system of the present invention includes: a touch sensor panel of the present invention.

An information input-output device of the present invention includes: the touch sensor system of the present invention.

A capacitive touch sensor panel of the present invention is arranged such that a plurality of vertical electrodes and a plurality of horizontal electrodes are so disposed that (i) as viewed in the direction perpendicular to the vertical electrode surface, the plurality of vertical electrodes include no segment coincident with the plurality of horizontal electrodes and that (ii) the plurality of vertical electrodes and the plurality of horizontal electrodes form a uniform grid having no gap. Thus, the capacitive touch sensor panel, as placed on a display device, can prevent moire and the like from occurring.

The capacitive touch sensor panel of the present embodiment may preferably be arranged such that the fine wire included in the first basic shapes and the fine wire included in the second basic shapes each extend in an oblique direction.

According to the above arrangement, the fine wire included in the first basic shapes and the fine wire included in the second basic shapes are each inclined with respect to a black matrix of the display. The above arrangement thus reduces the possibility of moire occurring.

The capacitive touch sensor panel of the present embodiment may preferably be arranged such that the grid has a rectangular outline.

According to the above arrangement, the vertical electrodes and the horizontal electrodes form a grid having a rectangular outline as viewed in the direction perpendicular to the vertical electrode surface. The above arrangement thus makes it possible to easily join, directly to respective portions corresponding to sides of the rectangular outline of the uniform grid having no gap, (i) address lines for driving the horizontal electrodes or the vertical electrodes and (ii) address lines for reading out signals from the vertical electrodes or the horizontal electrodes.

The capacitive touch sensor panel of the present embodiment may preferably be arranged such that the first basic shapes and the second basic shapes each have line symmetry with respect to a vertical center line extending in the vertical direction.

With the above arrangement, the first basic shapes and the second basic shapes each have a symmetric shape. The above arrangement can thus improve accuracy of reading coordinates on the basis of a change to a capacitance distribution which change is caused by a touch input involving use of a pen.

The capacitive touch sensor panel of the present embodiment may preferably be arranged such that the first basic shapes and the second basic shapes each have point symmetry.

With the above arrangement, the first basic shapes and the second basic shapes each have a symmetric shape. The above arrangement can thus improve accuracy of reading coordinates on the basis of a change to a capacitance distribution which change is caused by a touch input involving use of a pen.

The capacitive touch sensor panel of the present embodiment may preferably be arranged such that the first basic shapes and the second basic shapes each have line symmetry with respect to (i) a vertical center line extending in the vertical direction and (ii) a horizontal center line extending in the horizontal direction.

With the above arrangement, the first basic shapes and the second basic shapes each have a symmetric shape. The above arrangement can thus improve accuracy of reading coordinates on the basis of a change to a capacitance distribution which change is caused by a touch input involving use of a pen.

The capacitive touch sensor panel of the present embodiment may preferably be arranged such that the first basic shapes are each internally connected in the vertical direction at two or more fine-wire points; and the second basic shapes are each internally connected in the horizontal direction at two or more fine-wire points.

With the above arrangement, adjacent ones of the first basic shapes are connected to each other at two or more fine-wire points, while adjacent ones of the second basic shapes are also connected to each other at two or more fine-wire points. Thus, even if one fine wire is broken during production, the remaining fine wire can prevent total disconnection.

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

INDUSTRIAL APPLICABILITY

The present invention is applicable to a method for estimating or detecting a coefficient, a device value, or a capacitance in a linear system configured in a matrix. The present invention is further applicable to an integrated circuit, a touch sensor system, and an electronic device each operating in accordance with the method. The present invention is also applicable to a fingerprint detection system.

The present invention is applicable to a capacitive touch sensor panel including (i) a plurality of vertical electrodes provided on a vertical electrode surface and arranged at predetermined intervals in a horizontal direction, (ii) a plurality of horizontal electrodes provided on a horizontal electrode surface, which is parallel to the vertical electrode surface, and arranged at predetermined intervals in a vertical direction, and (iii) an insulator provided between the vertical electrode surface and the horizontal electrode surface to insulate the vertical electrodes from the horizontal electrodes. The present invention is further applicable to a capacitive touch sensor system including the above capacitive touch sensor panel and to an information input-output device.

REFERENCE SIGNS LIST

1 touch sensor system
2 sensor panel
3 integrated circuit
4 drive section
5 estimation section
6, 6A analog integrator
7 switch
8 AD converter
9 inner product computing section
10 RAM
11 application processing section
12 mobile telephone
13 display panel
14 display control circuit
15 CPU
16 ROM
17 RAM
18 microphone
19 loud speaker
20 operation key
21 camera
101 touch sensor system (capacitive touch sensor system)
102 touch panel (capacitive touch sensor panel)
103 substrate (insulator)
104 surface (vertical electrode surface)
105 surface (horizontal electrode surface)
106 vertical electrode
107 horizontal electrode
108 basic shape (first basic shape)
109 basic shape (second basic shape)
110 grid
412 display
113, 114 transparent adhesive
115 cover film
116 driver
117 sense amplifier
118 timing generator
119 AD converter
120 capacitance distribution calculating section
121 touch recognizing section
122 capacitance value distribution detecting circuit
150 electronic blackboard (information input-output device)
C1 vertical center line
C2 horizontal center line
P center point

The invention claimed is:

1. A touch sensor system comprising:
a touch sensor panel,
the touch sensor panel including:
a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction;
a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction;
an insulator provided between the vertical electrode surface and the horizontal electrode surface so as to insulate the plurality of vertical electrodes and the plurality of horizontal electrodes from each other; and
a plurality of capacitances provided at respective intersections of the plurality of vertical electrodes with the plurality of horizontal electrodes,
the plurality of vertical electrodes and the plurality of horizontal electrodes (i) being disposed so that, as viewed in a direction perpendicular to the vertical electrode surface, the plurality of vertical electrodes include no segment coincident with the plurality of horizontal electrodes and (ii) forming a uniform grid having no gap, the fine wire included in the first basic shapes and the fine wire included in the second basic shapes each extending in an oblique direction, the grid having a rectangular outline; and an integrated circuit for controlling the touch sensor panel, the integrated circuit including:

a drive section for (i) driving the plurality of vertical electrodes in parallel for each of the plurality of capacitances, and thus (ii) outputting, along the plurality of horizontal electrodes, linear sums of respective electric charges stored in the plurality of capacitances; and an estimating section for estimating respective capacitance values of the plurality of capacitances along the plurality of horizontal electrodes on a basis of an inner product operation of (i) the linear sums of the electric charges, the linear sums being outputted along the plurality of horizontal electrodes, and (ii) the code sequences di.

2. The linear device estimating method touch sensor system according to claim 1, wherein:
the code sequences di include elements each of which is either +V or −V.

3. An electronic device, comprising:
the touch sensor system recited in claim 1; and
a display panel which either is placed on the touch sensor panel included in the touch sensor system or contains the touch sensor panel.

4. A touch sensor system comprising:
a touch sensor panel,
the touch sensor panel including:
a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction;
a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction;
an insulator provided between the vertical electrode surface and the horizontal electrode surface so as to insulate the plurality of vertical electrodes and the plurality of horizontal electrodes from each other; and
a plurality of capacitances provided at respective intersections of the plurality of vertical electrodes with the plurality of horizontal electrodes,
the plurality of vertical electrodes and the plurality of horizontal electrodes (i) being disposed so that, as viewed in a direction perpendicular to the vertical electrode surface, the plurality of vertical electrodes include no segment coincident with the plurality of horizontal electrodes and (ii) forming a uniform grid having no gap, the fine wire included in the first basic shapes and the fine wire included in the second basic shapes each extending in an oblique direction, the grid having a rectangular outline; and
an integrated circuit for controlling the touch sensor panel, the integrated circuit including:
a drive section for (i) driving the plurality of vertical electrodes in parallel for each of the plurality of capacitances, on a basis of code sequences di which include elements each being either +1 or −1, so that a voltage +V is applied for an element of +1 in the code sequences and that a voltage −V is applied for an element of −1 in the code sequences, and thus (ii) outputting, along the plurality of horizontal electrodes, linear sums of respective electric charges stored in the plurality of capacitances; and an estimating section for estimating respective capacitance values of the plurality of capacitances along the plurality of horizontal electrodes on a basis of an inner product operation of (i) the linear sums of the electric charges, the linear sums being outputted along the plurality of horizontal electrodes, and (ii) the code sequences di.

5. An electronic device, comprising:
the touch sensor system recited in claim 4; and
a display panel which either is placed on the touch sensor panel included in the touch sensor system or contains the touch sensor panel.

6. A touch sensor system comprising:
a touch sensor panel,
the touch sensor panel including:
a plurality of vertical electrodes (i) each including a repeat of first basic shapes connected to one another in a vertical direction, the first basic shapes each including a fine wire, (ii) provided on a vertical electrode surface, and (iii) arranged at a predetermined interval in a horizontal direction;
a plurality of horizontal electrodes (i) each including a repeat of second basic shapes connected to one another in the horizontal direction, the second basic shapes each including a fine wire, (ii) provided on a horizontal electrode surface parallel to the vertical electrode surface, and (iii) arranged at a predetermined interval in the vertical direction;
an insulator provided between the vertical electrode surface and the horizontal electrode surface so as to insulate the plurality of vertical electrodes and the plurality of horizontal electrodes from each other; and
a plurality of capacitances provided at respective intersections of the plurality of vertical electrodes with the plurality of horizontal electrodes,
the plurality of vertical electrodes and the plurality of horizontal electrodes (i) being disposed so that, as viewed in a direction perpendicular to the vertical electrode surface, the plurality of vertical electrodes include no segment coincident with the plurality of horizontal electrodes and (ii) forming a uniform grid having no gap, the fine wire included in the first basic shapes and the fine wire included in the second basic shapes each extending in an oblique direction, the grid having a rectangular outline; and
an integrated circuit for controlling the touch sensor panel, the integrated circuit including:
a drive section for (i) driving the plurality of vertical electrodes in parallel for each of the plurality of capacitances, on a basis of code sequences di which include elements each being either +1 or −1 and thus (ii) outputting, to an analog integrator along the plurality of horizontal electrodes, linear sums of respective electric charges stored in the plurality of capacitances; and an estimating section for estimating respective capacitance values of the plurality of capacitances along the plurality of horizontal electrodes on a basis of an inner product operation of (i) the linear sums of the electric charges, the linear sums being outputted along the plurality of horizontal electrodes, and (ii) the code sequences di,
the drive section driving, for an element of +1 in the code sequences, the plurality of vertical electrodes at (i) a first voltage when the analog integrator is reset and at (ii) a second voltage when the linear sums of the electric charges are sampled, and, for an element of −1 in the code sequences, the plurality of vertical electrodes at (i) the second voltage when the analog integrator is reset, and (ii) the first voltage when the linear sums of the electric charges are sampled.

7. An electronic device, comprising:

the touch sensor system recited in claim 6; and a display panel which either is placed on the sensor panel included in the touch sensor system or contains the sensor panel.

* * * * *